US010333430B2

(12) United States Patent
Wang et al.

(10) Patent No.: US 10,333,430 B2
(45) Date of Patent: Jun. 25, 2019

(54) ROBUST TRIBOELECTRIC NANOGENERATOR BASED ON ROLLING ELECTRIFICATION

(71) Applicant: Georgia Tech Research Corporation, Atlanta, GA (US)

(72) Inventors: Zhong Lin Wang, Marietta, GA (US); Long Lin, Atlanta, GA (US); Yannan Xie, Atlanta, GA (US); Zong-Hong Lin, Atlanta, GA (US); Gang Cheng, Atlanta, GA (US); Hengyu Guo, Atlanta, GA (US); Jun Chen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 548 days.

(21) Appl. No.: 14/952,857

(22) Filed: Nov. 25, 2015

(65) Prior Publication Data

US 2016/0149518 A1    May 26, 2016

Related U.S. Application Data

(60) Provisional application No. 62/084,085, filed on Nov. 25, 2014.

(51) Int. Cl.
*H02N 1/04* (2006.01)
*F03B 13/14* (2006.01)
*H02N 1/00* (2006.01)

(52) U.S. Cl.
CPC .............. *H02N 1/04* (2013.01); *F03B 13/14* (2013.01); *F03B 13/148* (2013.01); *F05B 2220/706* (2013.01); *F05B 2220/709* (2013.01); *F05B 2280/4005* (2013.01); *F05B 2280/5011* (2013.01); *Y02E 10/28* (2013.01); *Y02E 10/38* (2013.01)

(58) Field of Classification Search
CPC .................................. H02N 1/04; H02N 1/00
See application file for complete search history.

(56) References Cited

U.S. PATENT DOCUMENTS

| | | | | |
|---|---|---|---|---|
| 3,086,131 A * | 4/1963 | Ballentine | ................ | H02N 1/04 310/310 |
| 4,789,802 A * | 12/1988 | Miyake | .................... | H02N 1/08 310/308 |
| 4,990,813 A * | 2/1991 | Paramo | .................... | H02N 1/04 310/308 |
| 8,174,163 B2 * | 5/2012 | Despesse | ............... | H02N 1/004 310/309 |
| 9,412,553 B2 * | 8/2016 | Camara | .................. | H01J 35/06 |

(Continued)

*Primary Examiner* — Edgardo San Martin
(74) *Attorney, Agent, or Firm* — Troutman Sanders LLP; Ryan A. Schneider

(57) ABSTRACT

A generator for converting mechanical energy or hydropower or wind energy into electrical energy is disclosed. The generator includes a first member and a second member in contact with the first member to generate triboelectric charges. The second member rolls against the first member to generate a flow of electrons between two electrodes. Another embodiment of the generator includes two electrodes, and a member in contact with the two electrodes to generate triboelectric charges. The member rolls against the electrodes to generate a flow of electrons between the two electrodes.

41 Claims, 68 Drawing Sheets

(56) References Cited

U.S. PATENT DOCUMENTS

| | | | |
|---|---|---|---|
| 2004/0232801 A1* | 11/2004 | Jerale | H02N 1/04 310/309 |
| 2011/0050181 A1* | 3/2011 | Post | H02N 1/04 320/166 |
| 2014/0292138 A1* | 10/2014 | Wang | H02N 1/04 310/300 |
| 2016/0365808 A1* | 12/2016 | Kim | H02N 1/04 |
| 2017/0331396 A1* | 11/2017 | Byun | H02N 1/04 |
| 2017/0359001 A1* | 12/2017 | Wang | H02N 1/04 |

\* cited by examiner

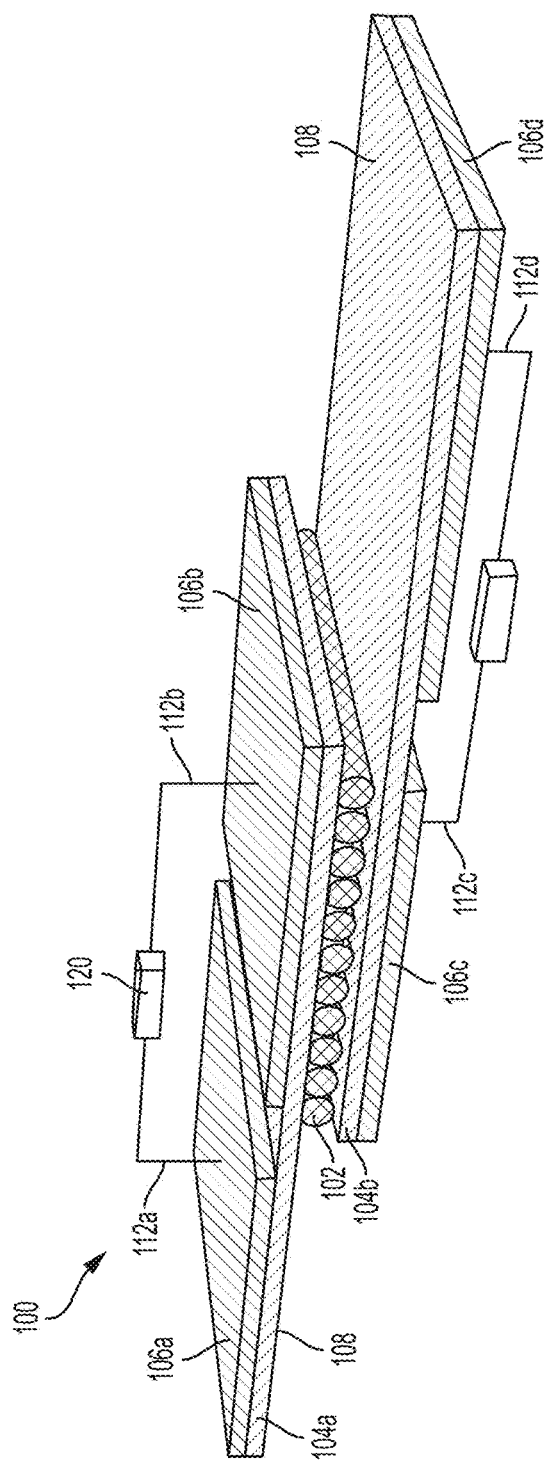
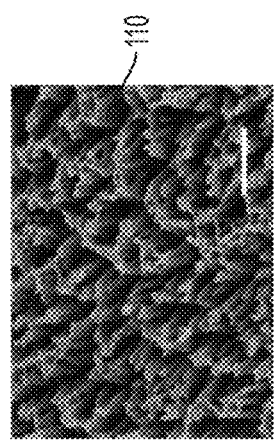
FIG. 1A
FIG. 1B

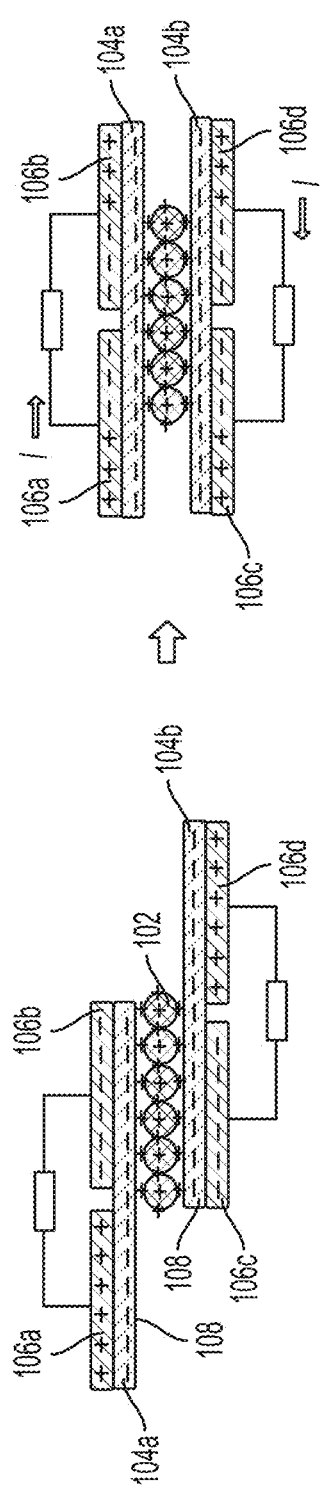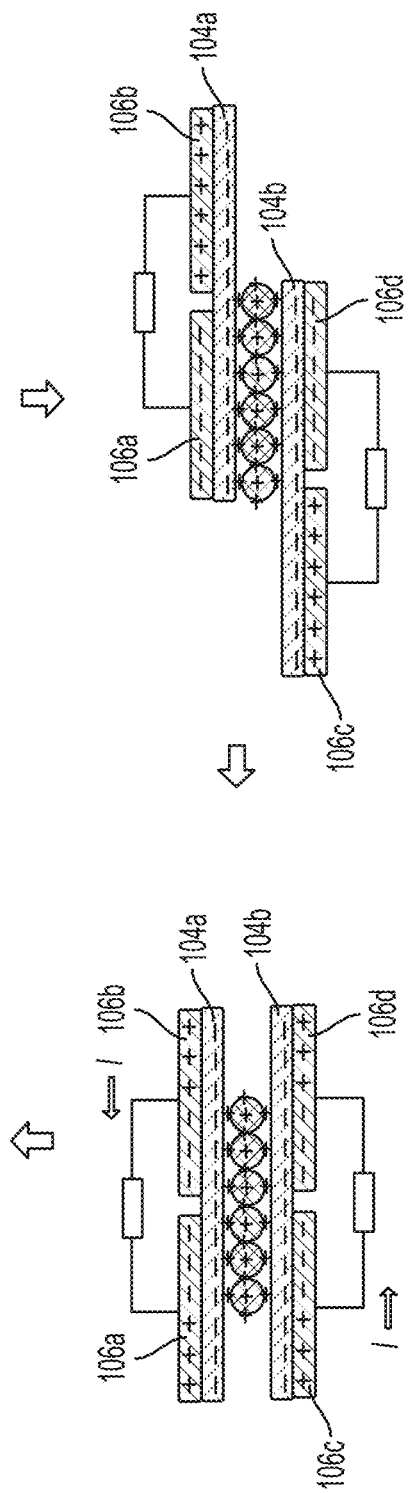

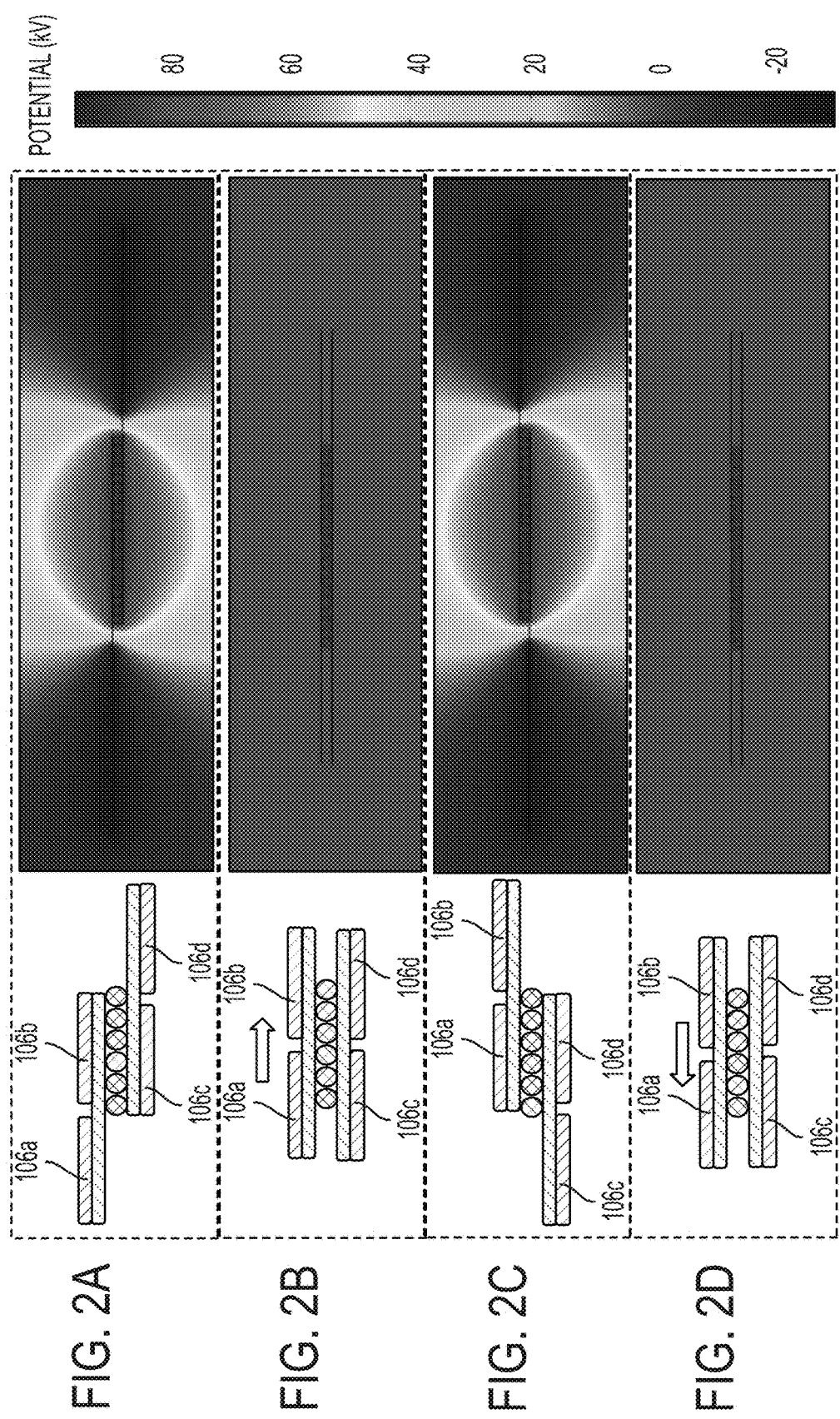

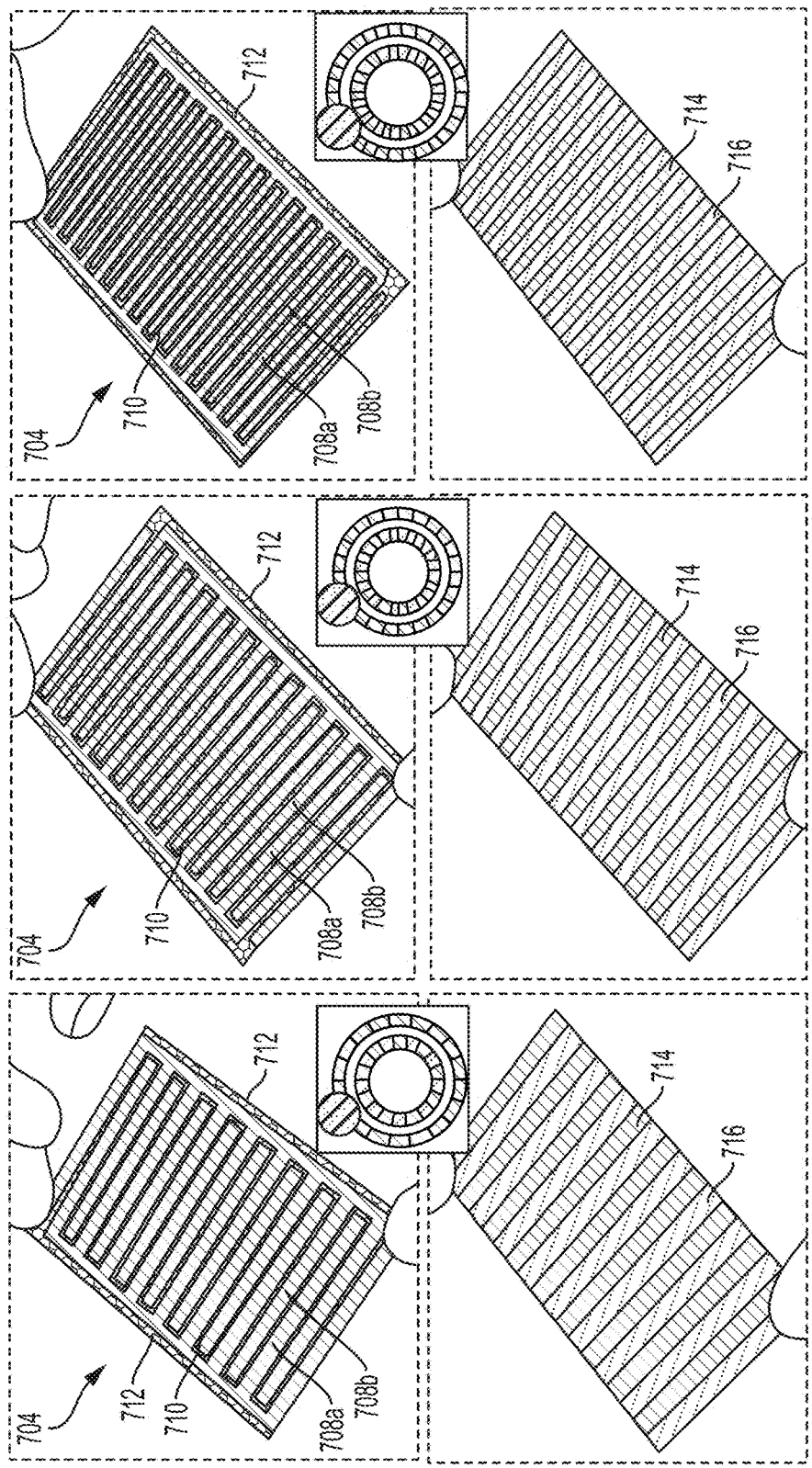

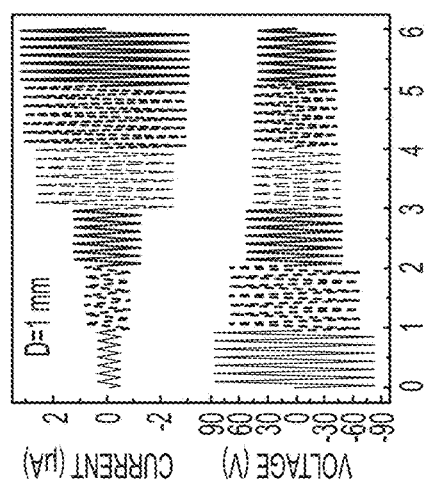
FIG. 17A
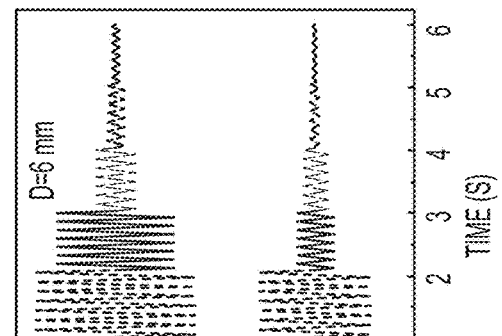
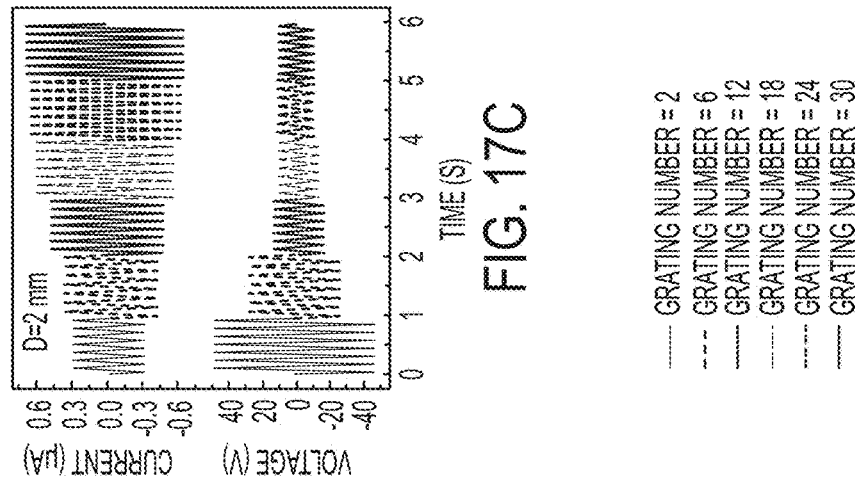
FIG. 17B
FIG. 17C
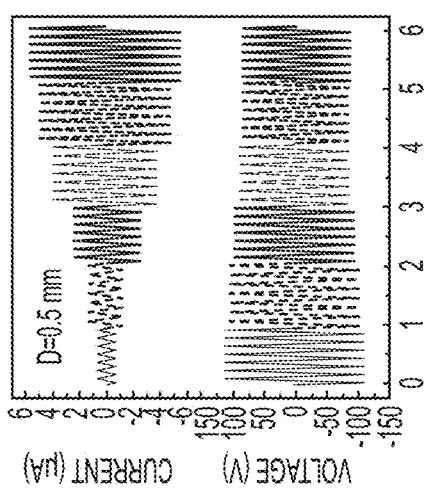
FIG. 17D
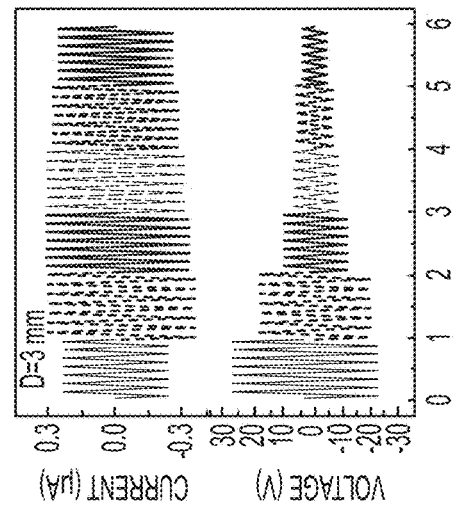
FIG. 17E

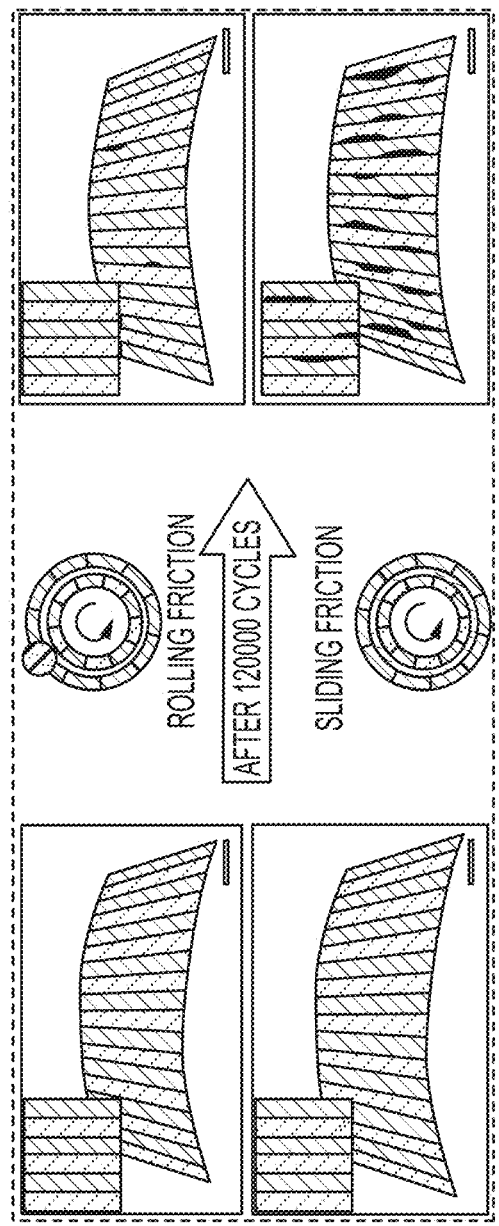

ROBUST TRIBOELECTRIC NANOGENERATOR BASED ON ROLLING ELECTRIFICATION

CROSS-REFERENCE TO RELATED APPLICATIONS

This application claims the benefit of U.S. Provisional Patent Application Ser. No. 62/084,085, filed Nov. 25, 2014, the entirety of which is hereby incorporated by reference.

STATEMENT OF GOVERNMENT INTEREST

This invention was made with government support under agreement No. DE-FG02-07ER46394, awarded by the Department of Energy and under agreement No. CMMI 0403671, awarded by the National Science Foundation. The government has certain rights in the invention.

TECHNICAL FIELD DISCLOSED

Embodiments of the disclosed technology generally relate to triboelectric nanogenerators. More particularly, the disclosed technology relates to triboelectric nanogenerators with rolling electrification mechanisms for harvesting mechanical energy.

BACKGROUND DISCLOSED

Energy harvesting from ambient environment is a green route in obtaining clean and sustainable electric energy. A triboelectric nanogenerator employs a coupling effect of triboelectrification and electrostatic induction for energy harvesting. Triboelectric nanogenerators of various working modes have been developed, including for example a sliding mode triboelectric nanogenerator based on an in-plane sliding friction. However, a common challenge faced by these devices is material abrasion and associated heat dissipation, which makes the devices vulnerable under long-term continuous working and causes a reduction in energy conversion efficiency. As a result, energy conversion efficiency, device durability and power output performance remain as critical issues.

There is a need for efficient and robust triboelectric nanogenerators with increased power output.

BRIEF SUMMARY DISCLOSED

The disclosed technology relates to energy harvesting. One aspect of the disclosed technology relates to a generator. The generator includes a first member and a second member in contact with the first member to generate triboelectric charges. The second member is rollable against the first member to generate a flow of electrons between two electrodes.

Another aspect of the disclosed technology relates to a generator having two electrodes and a member in contact with the two electrodes to generate triboelectric charges. The member is rollable against the electrodes to generate a flow of electrons between the two electrodes.

Yet another aspect of the disclosed technology relates to a generator having a pair of interdigitated electrodes. A first member is adjacent to the electrodes. A second member is in contact with the first member to generate triboelectric charges. The second member is rollable against the first member to generate a flow of electrons between the pair of interdigitated electrodes.

A further aspect of the disclosed technology relates to a generator for converting hydropower to electrical power. The generator includes a pair of interdigitated electrodes. A member lies on top of the interdigitated electrodes. The member generates triboelectric charges when contacted by water. As water flows across the member from a position aligned with one electrode to a position aligned with the other electrode, a flow of electrons is generated between the interdigitated electrodes.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology may be discussed relative to certain embodiments and figures, all embodiments of the disclosed technology can include one or more of the features discussed herein. While one or more embodiments may be discussed as having certain advantageous features, one or more of such features may also be used with the various embodiments of the disclosed technology discussed herein. In similar fashion, while exemplary embodiments may be discussed below as system or method embodiments, it is to be understood that such exemplary embodiments may be implemented in various devices, systems, and methods of the disclosed technology.

BRIEF DESCRIPTION OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed.

FIG. 1A provides a schematic illustration of a rolling triboelectric nanogenerator according to one aspect of the disclosed technology.

FIG. 1B provides a scanning electron microscopy (SEM) image of nanowires on the surface of a fluorinated ethylene propylene (FEP) film in the rolling triboelectric nanogenerator according to one aspect of the disclosed technology.

FIGS. 1C-F illustrate a working principle of the rolling triboelectric nanogenerator according to one aspect of the disclosed technology.

FIGS. 2A-D illustrate potential distributions across electrodes of the rolling triboelectric nanogenerator according to one aspect of the disclosed technology.

FIGS. 5A-D illustrate a schematic structure and output performance characteristics of another embodiment of the rolling triboelectric nanogenerator.

FIGS. 13A-F illustrate different grating configurations of the rolling friction enhanced free-standing triboelectric nanogenerator.

FIGS. 17A-E illustrate further electric output characteristics of the rolling friction enhanced free-standing triboelectric nanogenerator according to one aspect of the disclosed technology.

FIG. 23E illustrates changes in a surface under separate influences of rolling friction and sliding friction over numerous rotations.

DETAILED DESCRIPTION

Figure 3A:
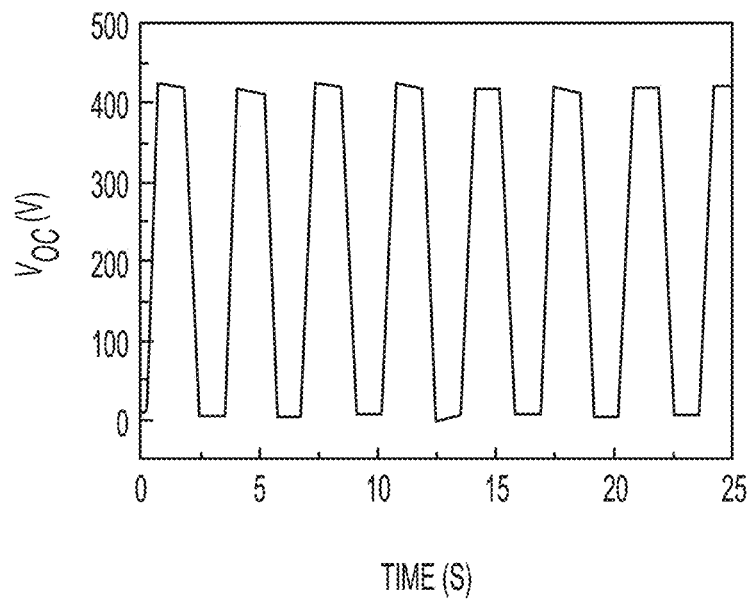
FIGS. 3A-I illustrate output performance characteristics of the rolling triboelectric nanogenerator according to one aspect of the disclosed technology.

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

1. Triboelectric Nanogenerator with Rods Rolling on a Planar Surface 1.1 Structure FIG. 1A is a schematic illustration of a rolling triboelectric nanogenerator (RTENG) 100 according to one embodiment of the disclosed technology. The RTENG 100 may include a first member 104a-b, a second member 102 in contact with the first member to generate triboelectric charges, and electrodes 106a-d.

The first member 104a-b and the second member 102 may have different triboelectric characteristics. For example, the two members may be made of materials having different triboelectric series ratings. For instance, the first member 104a-b may include a material with a relatively less negative triboelectric series rating, or with a propensity to gain electrons upon contact. Examples of suitable materials for the first member 104a-b may include, but not limited to, anyone or a combination of the following materials: polyethylene terephthalate (PET), poly(methyl methacrylate) (PMMA), polydimethylsiloxan (PDMS), polytetrafluoroethylene (PTFE), fluorinated ethylene propylene (FEP), poly (vinyl chloride) (PVC), polyimide, metal and alloy, among many other possibilities. The second member 102 may include a material with a relatively more negative triboelectric series rating, or with a propensity to lose electrons upon contact. Examples of suitable materials for the second member 102 may include, but not limited to, anyone or a combination of the following materials: polyurethane (PU), poly-oxydiphenylene-pyromellitimide, PDMS, conductive polymer, metal such as copper, aluminum and gold, and alloy such as steel, among many other possibilities. The electrodes 106a-d may include, but not limited to, anyone or a combination of the following materials: metal such as copper, gold, silver and aluminum, indium tin oxide (ITO) and conductive polymer, among many other possibilities.

The first member 104a-b may define a substantially planar configuration. In one embodiment, the first member 104a-b may include a first layer 104a and a second layer 104b that are parallel to each other. At least one of the two layers 104a-b may be laterally movable with respect to the other. The first layer 104a may be in contact with a first pair of electrodes 106a-b, and the second layer 104b may be in contact with a second pair of electrodes 106c-d.

The electrodes within each pair may be electrically coupled to each other. The electrodes 106a-d may be placed adjacent to the first member 104a-b.

The second member 102 may be disposed between the two layers 104a-b. As shown in FIG. 1A, the second member 102 may exhibit a substantially cylindrical configuration. As also shown in FIG. 1A, the second member 102 may include a plurality of substantially cylindrical members parallel to each other. The second member 102 may roll against the first member 104a-b to generate a flow of electrons between a pair of electrodes, e.g., between electrodes 106a and 106b, and between electrodes 106c and 106d.

In one embodiment, the second member 102 includes a group of cylinder-shaped steel rods 102 sandwiched by two layers of planar thin FEP films 104a and 104b. The two layers of FEP thin films may include a top layer FEP film (TL-FEP) 104a and a bottom layer FEP film (BL-FEP) 104b. During operation, the BL-FEP 104b may be securely attached onto a three-dimensional stage. The TL-FEP 104a may be driven by a linear motor to oscillate back and forth, which, in turn, initiates a rolling motion of the steel rods 102. For example, as the TL-FEP 104a moves from the left-hand end to the right-hand end of the BL-FEP 104b, each steel rod 102 may move from the left-hand part to the right-hand part of the BL-FEP 104b, until the TL-FEP 104a stops and starts to move back.

Each FEP thin film 104a-b may be deposited with two separated copper electrodes on its back side, respectively. Each film may define a first edge (e.g., a left edge) and a second edge (e.g., a right edge). For the top film, the TL-FEP 104a may be deposited with a first pair of electrodes, including a first electrode adjacent to the left edge, namely, a left-hand electrode (LE) 106a, and a second electrode adjacent to the right edge, namely, a right-hand electrode (RE) 106b. Similarly, for the bottom film, the BL-FEP 104b may be deposited with a second pair of electrodes, including a third electrode adjacent to the left edge, namely, a left-hand electrode (LE) 106c, and a fourth electrode adjacent to the right edge, namely, a right-hand electrode (RE) 106d.

In some embodiments, at least one of the first member 104a-b and the second member 102 may include nanostructures thereon. For instance, inner surfaces 108 of the FEP thin films 104a-b may have polymer nanowire structures 110 to increase triboelectric charge densities in rolling electrification. The polymer nanowire structures 110 may be created on the FEP thin films 104a-b by way of inductively coupled plasma (ICP) etching. FIG. 1B provides a scanning electron microscopy (SEM) image of the nanowire structures 110 formed on an inner surface 108 of an FEP thin film. In FIG. 1B, the scale bar is approximately 1 μm.

The RTENG 100 may have two sets of output terminals 112a-b and 112c-d. Each set of output terminals may work independently.

In one example, the RTENG 100 may have twenty steel rods 102 with a diameter of 2 mm sandwiched between the two FEP thin films 104a-b. The pair of FEP thin films 104a-b may each have a length of 85 mm and a thickness of 100 μm. Each pair of copper electrodes 106a-d on the back side of the FEP thin films 104a-b may be separated by a 5 mm gap. The steel rods 102 may have a triboelectric charge density of 60 μC/m².

1.2 Fabrication and Assembly

According to one embodiment, to fabricate polymer nanowire structures 110 on the surface of an FEP thin film 104a-b, the film may be first cleaned with menthol, isopropyl alcohol and de-ionized water in a consecutive order, and then blown dry with nitrogen gas. A 10 nm-thick gold thin film may be deposited onto the surface of the FEP thin film by way of sputtering (Unifilm Sputter). The gold thin film may serve as a mask for ICP etching. Ar, $O_2$, and $CF_4$ gases may be introduced into the ICP chamber at flow rates of 15.0, 10.0, and 30.0 sccm, respectively. One power source of 400 W may be used to generate a high density of plasma. Another power source of 100 W may be used to accelerate the plasma ions. The FEP thin film may be etched for 1~5 minutes under the above settings.

According to one embodiment, the following steps may be performed to assemble the RTENG 100. First, two 0.125"-thick PMMA sheets may be processed by laser cutting to form two rectangular cyclostyles each having a dimension of 85 mm×50 mm as supporting substrates. Two copper electrodes may be deposited on the backside of each FEP thin film that is prepared in the above mentioned process. A PMMA mask may be applied in the middle of each thin film between the two copper electrodes. The FEP thin films with electrodes may then be attached onto the two PMMA templates. For measurement purposes, each electrode may be connected to an electrical lead. Twenty steel rods each having a smooth surface may be placed between inner surfaces of two parallel FEP thin films, resulting in a low-friction contact when moving one FEP thin film relative to the other FEP thin film in a lateral direction.

1.3 Operating Principle

The RTENG 100 may convert kinetic energy of the rolling rods 102 into electric power. The rolling motion of the steel rods 102 between the FEP thin films 104a-b may introduce triboelectric charges on both surfaces, which, in turn, may result in a change of potential difference between each pair of electrodes 106a-d on the back of each FEP layer, driving electrons to flow through an external load 120. FIGS. 1C-F provides a step-by-step analysis of a charge transfer process to illustrating a working principle of the RTENG 100. The steel rods 102 and the FEP films 104a-b have different abilities in attracting electrons. For that reason, when the steel rods 102 contact each FEP film 104a-b, the inner surface 108 of each FEP film will have net negative charges, whereas the surface of the steel rods 102 will have net positive charges. The negative charges may be evenly distributed on each FEP surface 108. The electrodes 106a-d may have a symmetric layout. The negative charges may not lead to an electric output. Moving the positively-charged steel rods 102 along any FEP surface 108 may induce a potential difference between each pair of electrodes 106.

FIG. 1C illustrates an example of an initial state of the RTENG 100. At the initial state, the positively-charged steel rods 102 may be located beneath the right-hand electrode (RE) 106b associated with the TL-FEP 104a, and above the left-hand electrode (LE) 106c associated with the BL-FEP 104b. As a result, in the top layer, the RE 106b may have a higher electrical potential than the LE 106a, thus driving electrons to flow instantaneously from the LE 106a to the RE 106b to reach an equilibrium state. An opposite potential polarity may be observed in the bottom layer. For example, in the bottom layer, the potential of the LE 106c may be higher than that of the RE 106d. As the TL-FEP 104a slides towards the right-hand side along with the positively-charged steel rods 102, the potential difference between the RE 106b and the LE 106a in the top layer may gradually decrease until arriving at an equal potential condition as illustrated in FIG. 1D. As the TL-FEP 104a continues moving to the right, the electrical potential on the LE 106a may exceed that of the RE 106b. The potential difference between the LE 106a and the RE 106 may reach a maximum when the rods 102 reach the right-hand side of the BL-FEP 104b as illustrated in FIG. 1E.

In the next half cycle of motion, the TL-FEP 104a may move in an opposite lateral direction, e.g., from the right-hand side to the left-hand side. During this process, the potential difference between the LE 106a and the RE 106b may gradually decrease until it reaches zero when the TL-FEP 104a is aligned with the BL-FEP 104b as illustrated in FIG. 1F. As TL-FEP 104a continues moving to the left, the potential difference becomes negative. The cycle completes when the TL-FEP 104a reaches its original position as illustrated in FIG. 1C. The potential difference in the bottom pair of electrodes 106c-d may follow a reverse trend as compared to that of the top pair of electrodes 106a-b.

In terms of the short-circuit condition, the first half cycle of motion may cause the electrons to flow from the RE 106b to the LE 106a in the top layer, whereas the second half cycle of motion may cause the electrons to flow in a reverse direction, e.g., from the LE 106a to the RE 106b. Similarly, the short-circuit electrons in the bottom layer may flow in a direction opposite to that of the top layer.

FIGS. 2A-D illustrate variations of open-circuit potential distributions between one pair of electrodes in the same layer, e.g., electrodes 106a-b, throughout one cycle of motion. In this example, the potential distributions are calculated by a finite element method (FEM). In the example, the electric potential is defined as zero at infinity. FIGS. 2A-D correspond to the four different states in FIG. 1C-F, respectively. FIG. 2A illustrates the potential distribution when the rolling rods 102 are above the left part of the bottom layer. FIG. 2B illustrates the potential distribution when the rolling rods 102 roll towards the right part of the bottom layer. FIG. 2C illustrates the potential distribution when the rolling rods 102 are above the right part of the bottom layer. FIG. 2D illustrates the potential distribution when the rolling rods roll back to the left part of the bottom layer.

As shown in FIG. 2A, at the first state when the steel rods 102 are located beneath the RE 106b of the top layer, the potential of the RE 106b is much higher than that of the LE 106a. As the steel rods 102 roll to a middle position between the LE 106a and RE 106b as illustrated in FIG. 2B, an equal-potential state is achieved. The potential difference between the RE 106b and LE 106a becomes negative when the rolling rods 102 are located beneath the left-hand side of the top layer as illustrated in FIG. 2C. The equal-potential state is achieved again, when rolling rods 102 moves in a reverse direction, and return to the middle position between the two electrodes as illustrated in FIG. 2D, which is similar to the condition of FIG. 2B. As for electrodes 106c-d in the bottom layer, a potential difference of an opposite polarity but of the same magnitude may be observed. The potential difference may reach up to 100 kV, which is a strong force to drive a charge flow in the external load 120.

1.4 Output Performance

Referring back to FIG. 1A, the RTENG 100 may have two sets of output terminals, including a first set of output terminals 112a-b in the top layer, and a second set of output terminals 112c-d in the bottom layer. Each set of terminals may work well independently. FIGS. 3A-I illustrate output performance characteristics of the output terminals of the RTENG 100.

Figure 3B:
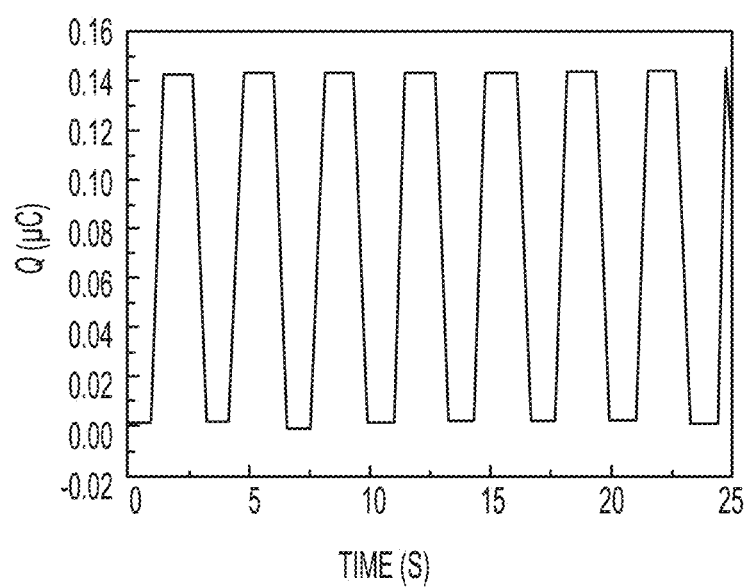
Figure 3C:
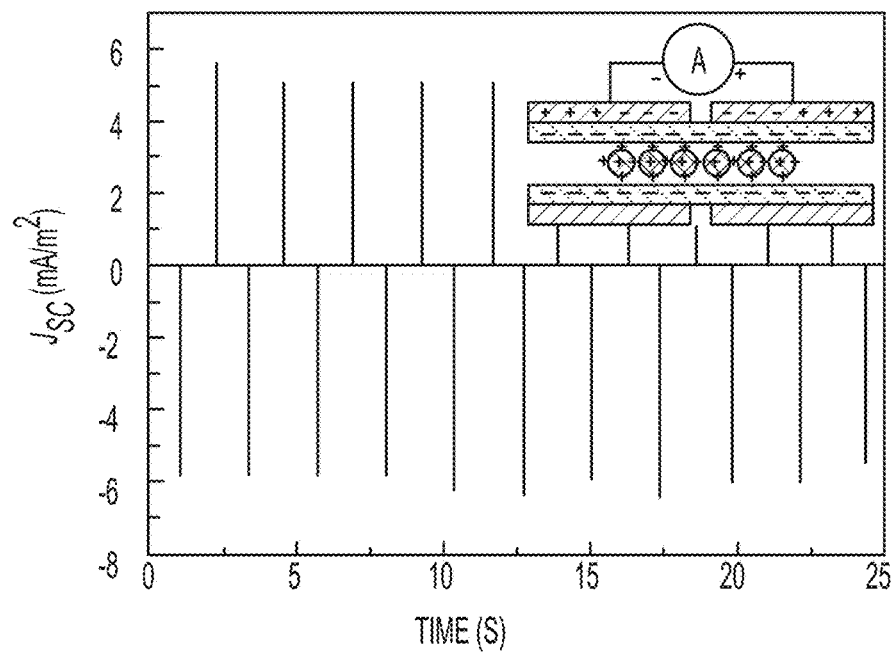
Figure 3D:
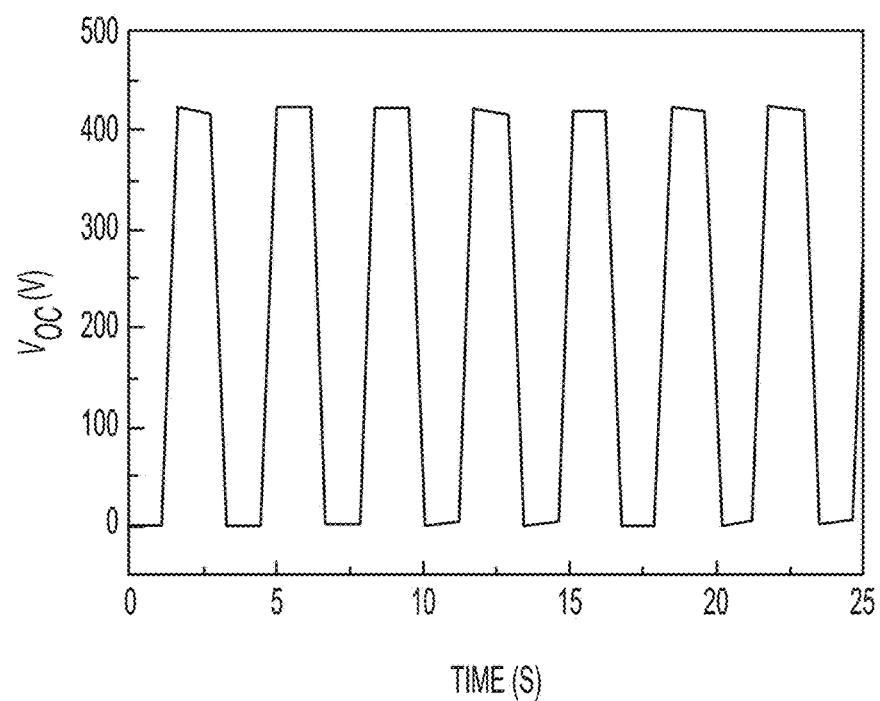
Figure 3E:
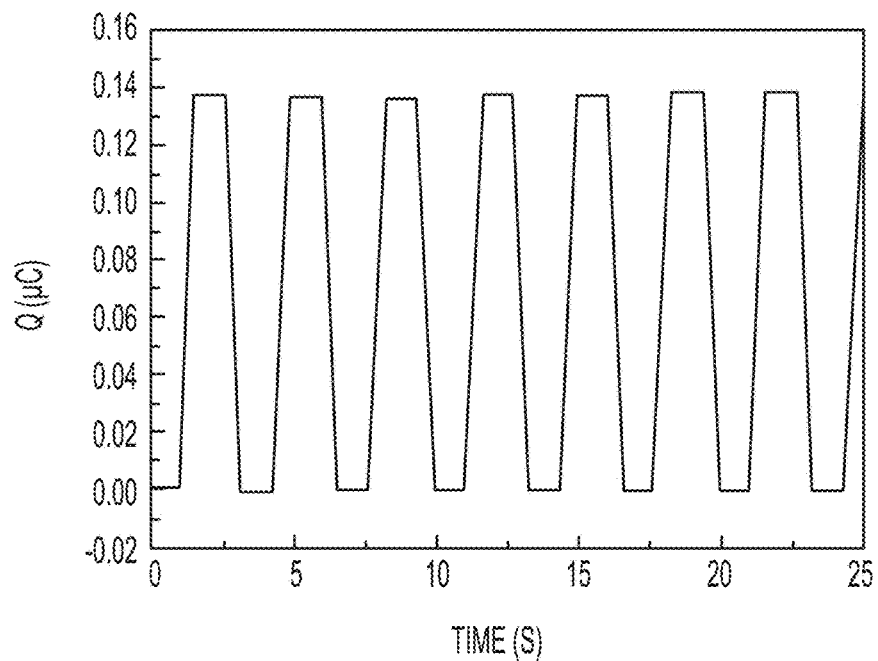

For example, FIGS. 3A-C respectively illustrate open-circuit voltage (Voc), amount of transferred charges (Q), and short-circuit current density (Jsc) measurements of the output terminals 112a-b in the top layer. The inset of FIG. 3C illustrate the connection polarity when measuring the short-circuit current. As shown in FIGS. 3A-C, despite the relatively low contact area between the rolling rods 102 and the planar surface 108 of the FEP film 104a, the top layer of the RTENG 100 may deliver high output performance, such as an open-circuit voltage Voc of 425 V, an instantaneous charge transfer Q of 0.145 µC, and a short-circuit current density Jsc of 5 mA/m$^2$.

Similar results may be observed for the output terminals 112c-d in the bottom layer. For example, FIGS. 3D-F respectively illustrate open-circuit voltage, amount of transferred charges, and short-circuit current density measurements of the bottom output terminals 112c-d of the RTENG 100. The inset of FIG. 3F illustrates the connection polarity when measuring the short-circuit current.

Figure 3F:
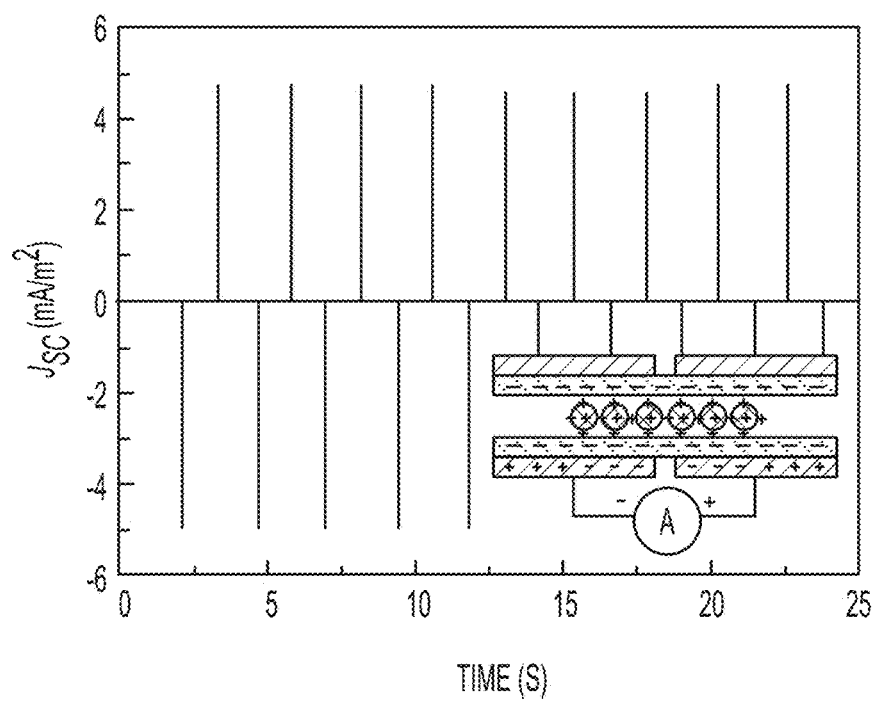

As shown in the insets of FIGS. 3C and 3F, when measuring the Jsc, both of the right electrodes are connected to the positive end of the measurement probe. These results indicate reverse polarity, which is consistent with the direction of charge flow as discussed above. Furthermore, the output current of the bottom layer may be more stable than that of the top layer, since the bottom electrodes are stationary, while the top electrodes undergo reciprocating movements with the TL-FEP 104a.

Figure 3G:
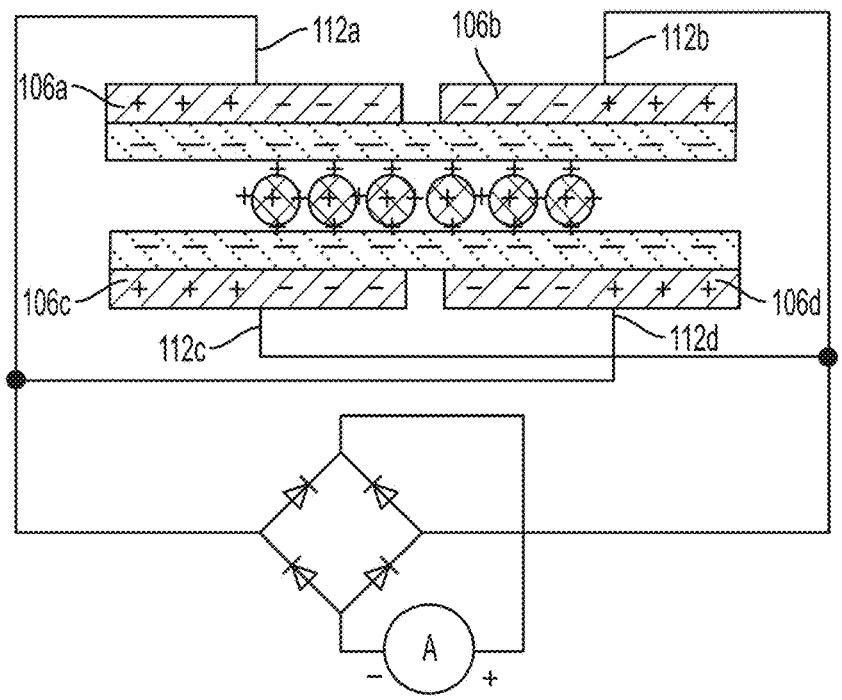

In one embodiment as illustrated in FIG. 3G, the two sets of output terminals 112a-d may be integrated and rectified to achieve a higher output current. As shown in FIG. 3G, the LE 106a of the top layer and the RE 106d of the bottom layer may be connected, and the RE 106b of the top layer and LE 106c of the bottom layer may be connected. As a result, the output currents from both the top and bottom output terminals 112a-d may be rectified.

Figure 3H:
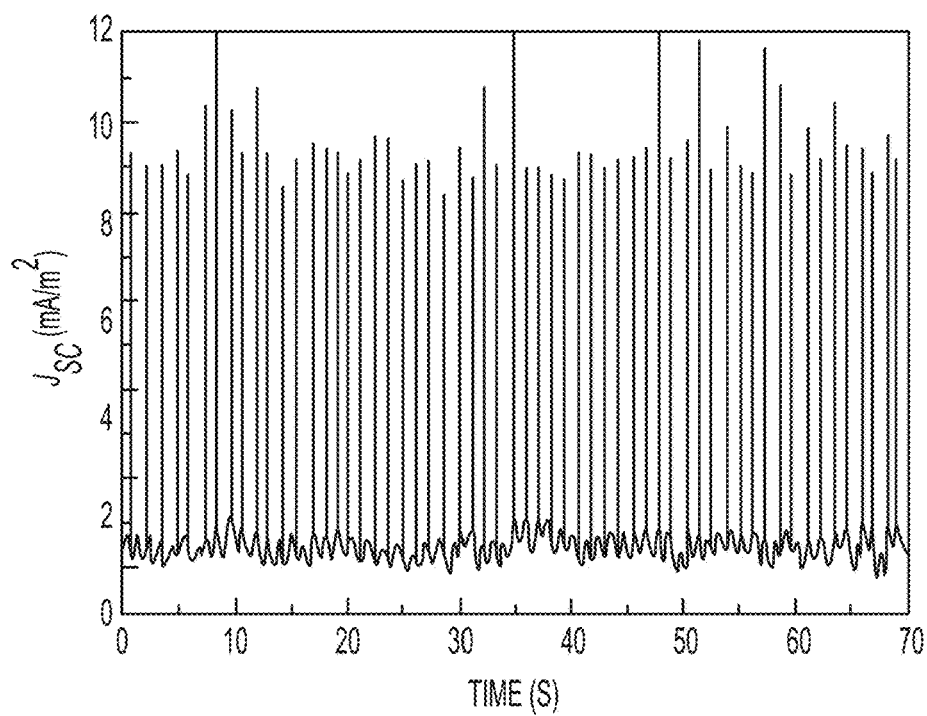
Figure 3I:
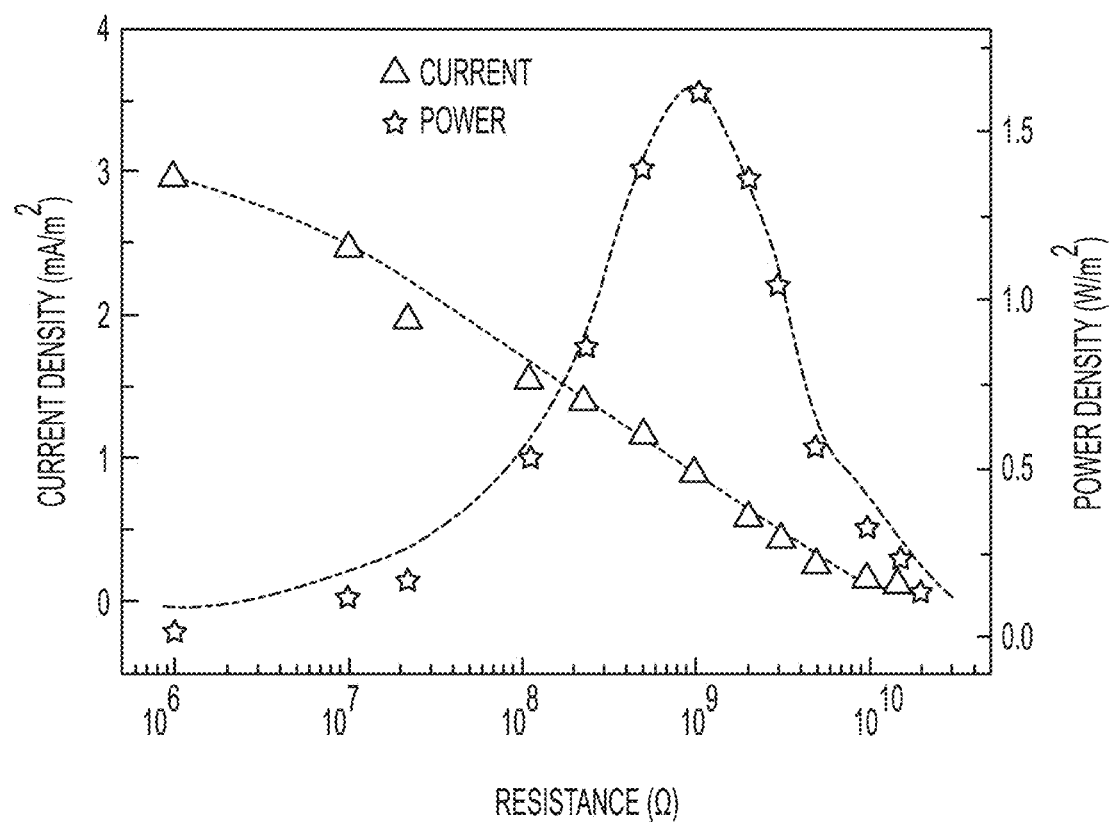

As illustrated in FIG. 3H, after integration and rectification of the top and bottom output terminals, the short-circuit current density Jsc may reach up to 9-10 mA/m$^2$, which is almost twice as much as the output current density generated by a single layer alone as illustrated in FIGS. 3C and 3F. FIG. 3I illustrates the output current and the output power with variable load resistances. According to FIG. 3I, after integration, an overall power density of up to 1.6 W/m$^2$ may be achieved.

In one aspect, the top layer of the RTENG 100 may be driven by a linear motor to cause reciprocating movements, and the bottom layer may be secured to a stationary XYZ linear translation stage (e.g., 462-XYZ-M, Newport Incorporation). Open-circuit voltage and transferred charge density may be measured by a Keithley 6514 System Electrometer. The short-circuit current may be measured by an SR570 Low Noise Current Amplifier (Stanford Research System).

1.5 Parameter Effect on Output Performance

Various parameters may affect the output performance of the RTENG 100. Such parameters may include but not limited to rolling velocity or sliding velocity, distance between adjacent electrodes, and diameter of the rods.

Figure 4A:
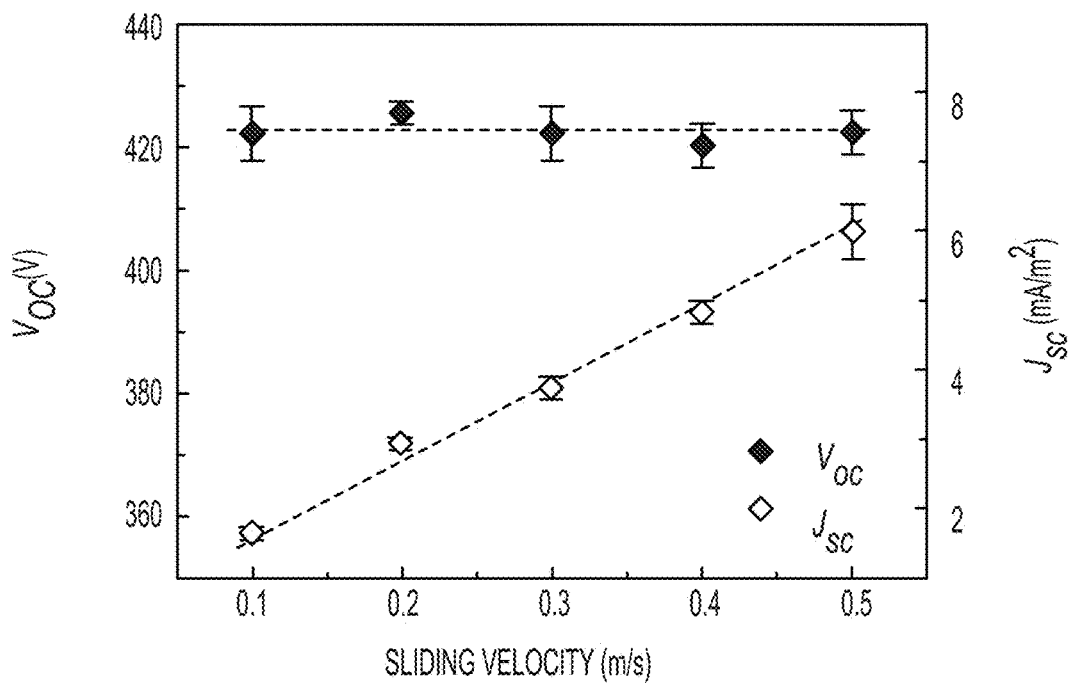
FIGS. 4A-F illustrate effects by various parameters on the output performance of the rolling triboelectric nanogenerator according to one aspect of the disclosed technology.
Figure 4B:
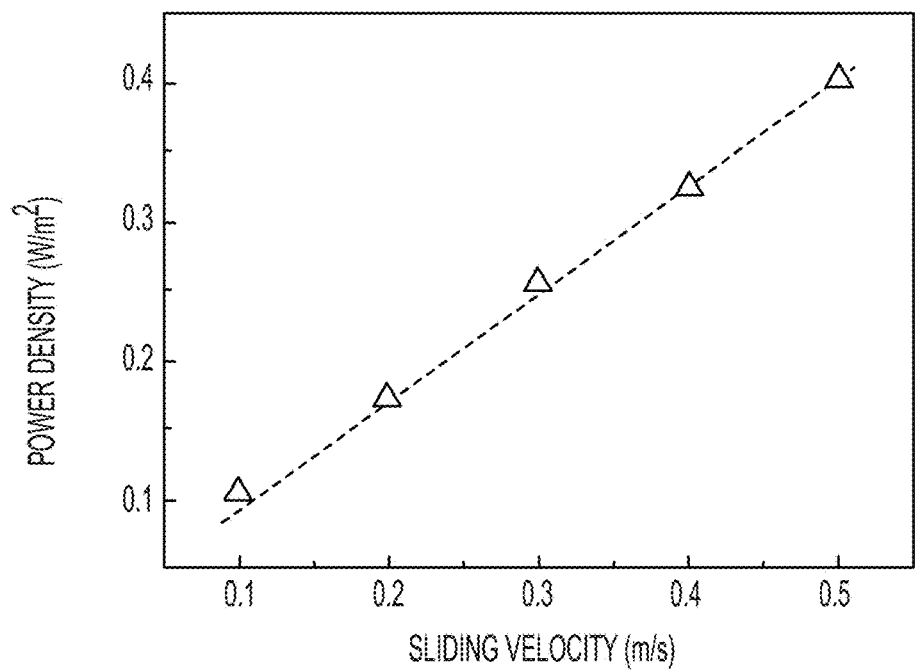

FIGS. 4A-F illustrate effects of these parameters on the output performance of the RTENG 100. For convenience purpose, all data provided in FIGS. 4A-F are based on measurements of the bottom output terminals 112c-d. FIG. 4A illustrates how the sliding velocity affects the open-circuit voltage and the short-circuit current density of the RTENG 100, while other parameters remain constant. As shown in FIGS. 4A-B, Voc remains unchanged as the sliding velocity varies, whereas Jsc increases as the velocity increases from 0.1 to 0.5 m/s. FIG. 4B illustrates how the sliding velocity affects the optimum output power density of the RTENG 100. The different trends in FIGS. 4A-B may be attributed to the fact that Voc is a static signal that solely depends on the amount of tribo-charges and the magnitude of the charge separation, whereas Jsc is a dynamic signal that is also highly proportional to the rate of the charge transfer process. According to FIGS. 4A-B, the maximum output power increases as the sliding velocity increases.

Figure 4C:
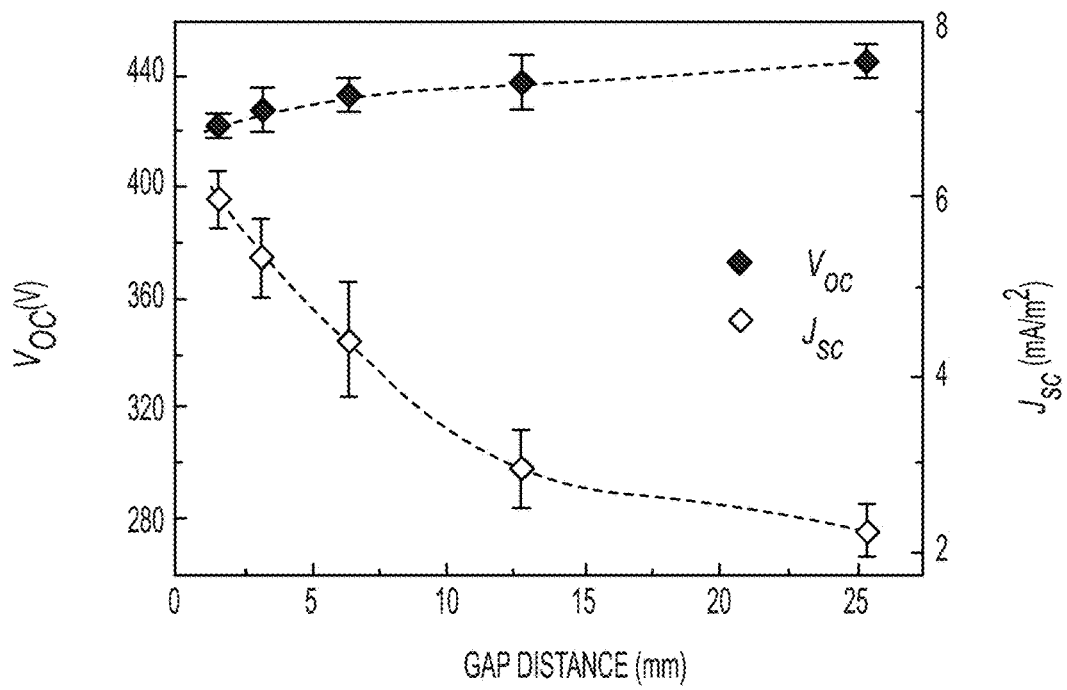
Figure 4D:
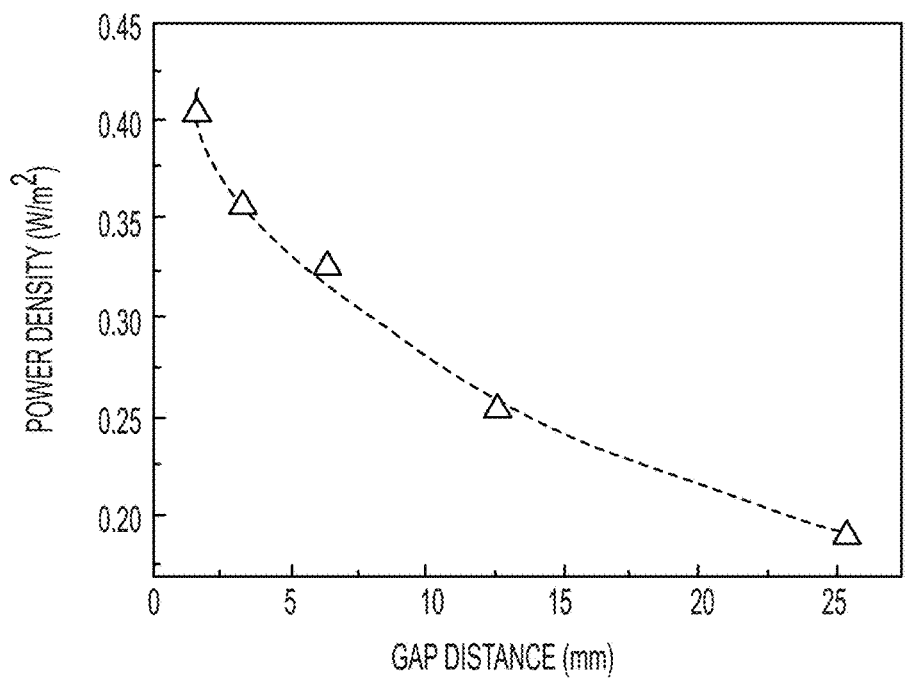

FIG. 4C illustrates how the gap distance between two electrodes on the same FEP thin film, e.g., 106c-d, affects the open-circuit voltage and the short-circuit current density of the RTENG 100. FIG. 4D illustrates the impact of the gap distance on the optimum output power density of the RTENG 100. As shown in FIG. 4C, as the horizontal separation distance between two electrodes on each FEP thin film, e.g., 106c-d, increases from 1.6 to 25.4 mm, Voc slightly increases, whereas Jsc decays drastically. Theoretically, in an ideal situation, Voc should increase as the gap distance increases, since a larger distance between the two electrodes leads to a smaller capacitance, which is inversely proportional to Voc where there the amount of transferable charges is constant. However, such an expected increase in Voc can be hardly detected due to a non-ideal internal resistance of the voltage meter. As shown in FIG. 4D, the increase of the separation distance also slows the charge transfer process and hence reduces Jsc. Accordingly, as shown in FIG. 4D, the total power output declines as the gap distance increases.

Figure 4E:
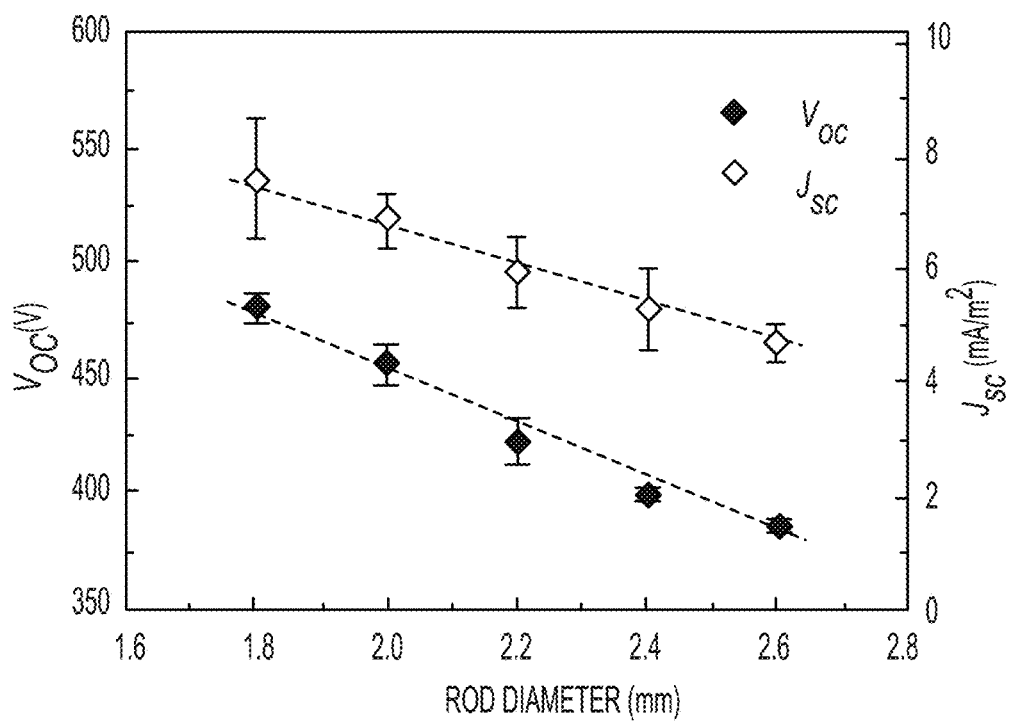
Figure 4F:
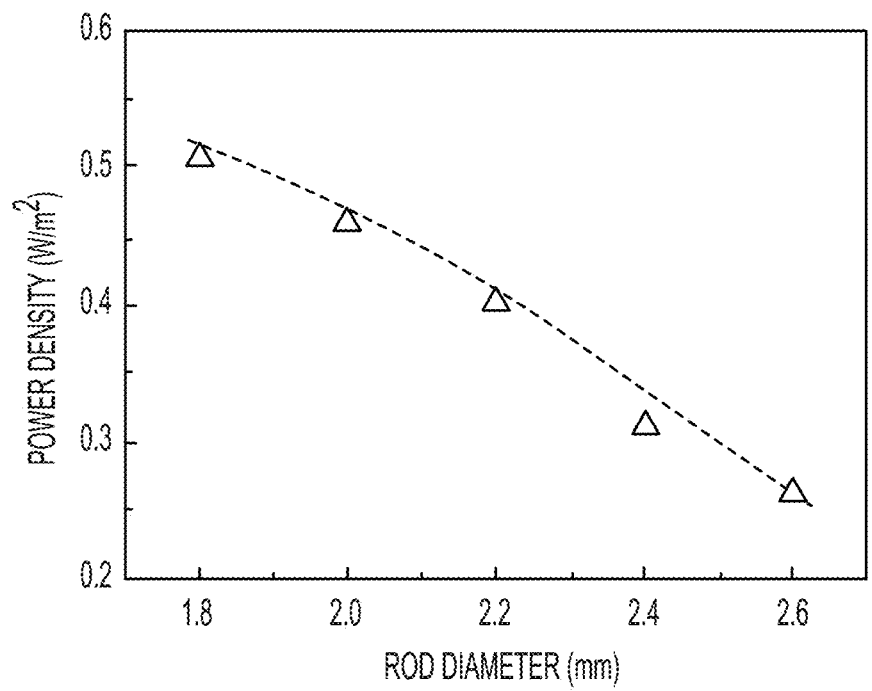

FIG. 4E illustrates how the rod diameter affects the open-circuit voltage and the short-circuit current density of the RTENG 100. FIG. 4F illustrates how the rod diameter affects the optimum output power density of the RTENG 100. As shown in FIG. 4E, both Voc and Jsc decrease as the diameter of the rolling rods 102 increases. Each rod 102 may have a constant charge density, regardless of its diameter. All charges carried by each rod 102 may be considered as being distributed along its center axis. Hence, as the diameter of the rolling rods 102 grows larger, the distance between the center axis of each rod 102 and the electrodes increases, resulting in a decrease in the potential difference.

According to FIGS. 4C-F, the smaller the rod diameter, the higher the output by the RTENG 100. Similarly, the smaller the distance between electrodes, the higher the output.

1.6 Energy Efficiency

The rolling rods 102 may minimize the frictional force in the RTENG 100 without scarifying the output power, which, in turn, may enhance energy conversion efficiency.

Figure 5A:
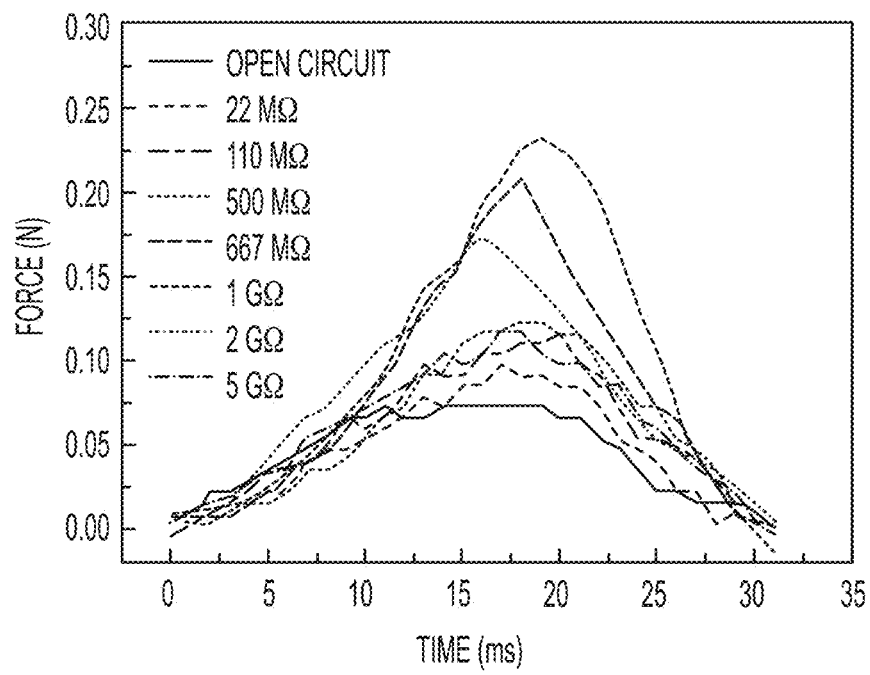
FIGS. 5A-C illustrate energy conversion efficiency of the rolling triboelectric nanogenerator according to one aspect of the disclosed technology.

FIGS. 5A-E demonstrate energy conversion efficiency of the RTENG 100. FIG. 5A illustrates resistive force measurements obtained during the energy conversion process of the RTENG 100 in various conditions including open circuit as well as different loading resistances. As shown in FIG. 5A, in contrast to open circuit, the resistive force is large when there is a load resistance, since the current flow or energy consumption in the load yields higher electrostatic resistance to the rolling motion.

Assuming there is a constant frictional energy loss due to heat dissipation, the energy conversion efficiency may be calculated by dividing the amount of work expended on an external load by the total amount of work, according to the following equation:

$$\eta = \frac{E_{output}}{E_{input}} = \frac{\int F dt - \int F_0 dt}{\int F dt} \quad (1)$$

Here, $\eta$ is the energy conversion efficiency, $E_{output}$ is the electrical energy output, $E_{input}$ is the mechanical energy input, F is the resistive force measured with a certain load resistance, and $F_0$ is the resistive force measured with open-circuit condition.

Figure 5B:
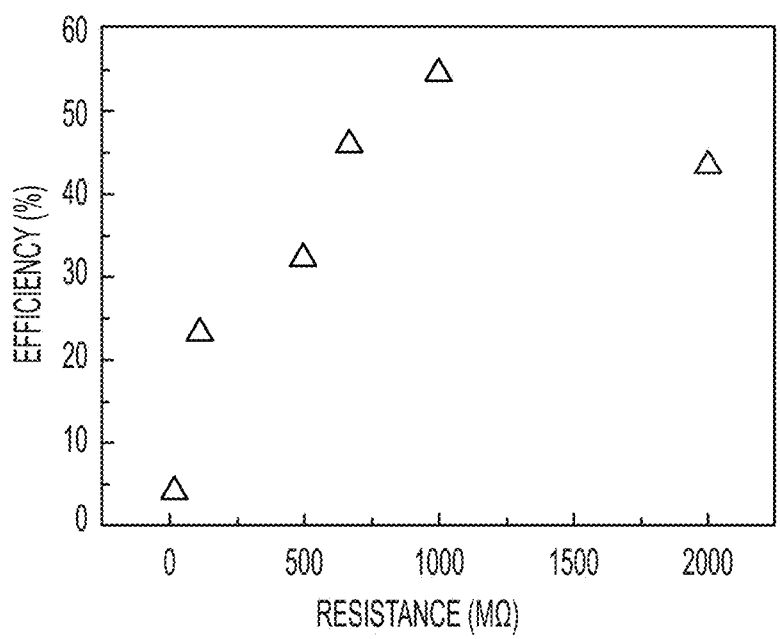

FIG. 5B illustrates energy conversion efficiencies corresponding to different load resistances. As indicated in FIG. 5B, an instantaneous efficiency may be as high as 55% when the load resistance is compatible with the internal impedance of the RTENG 100 at current motion status. The high energy conversion efficiency may be attributed to the low frictional coefficient between the rolling rods 102 and the planar FEP surface 108, which represents one of many advantages of the disclosed technology.

Figure 5C:
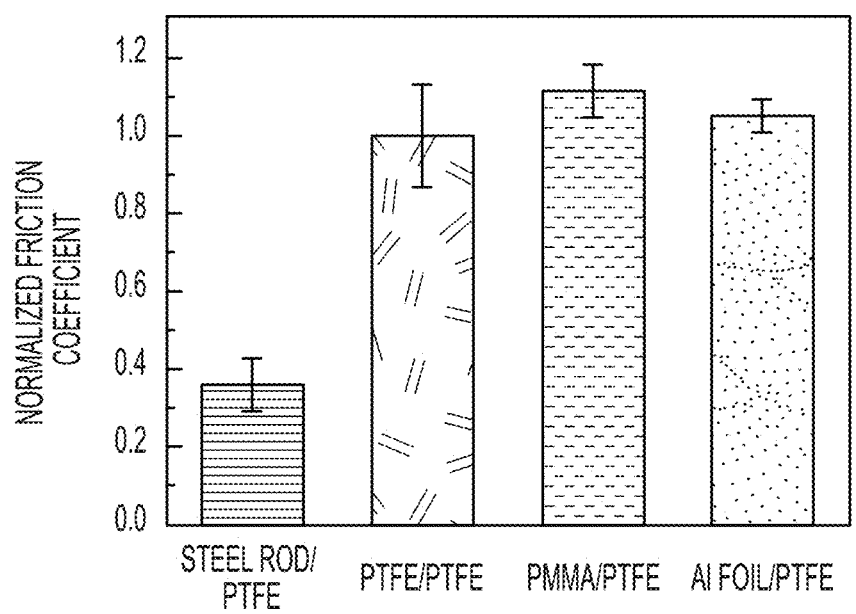

FIG. 5C illustrates different normalized friction coefficients between different materials, the combination of which may be used for triboelectric nanogenerators. In this example, the friction coefficient between PTFE films in a sliding mode, i.e., one material in a planar configuration slides against another material in a planar configuration without any rolling mechanism, is set as the reference value. As shown in FIG. 5C, the frictional coefficient of the RTENG 100 with rolling rods 102 is substantially lower than the reference value.

1.7 Reliability

The RTENG 100 may deliver ultra high energy conversion efficiency without scarifying its robustness and stability. A study is performed to monitor polymer nanowire structures, under separate friction influences including rolling friction by steel rods 102 and sliding friction by steel foils, over a long period of operations.

Figure 6A:
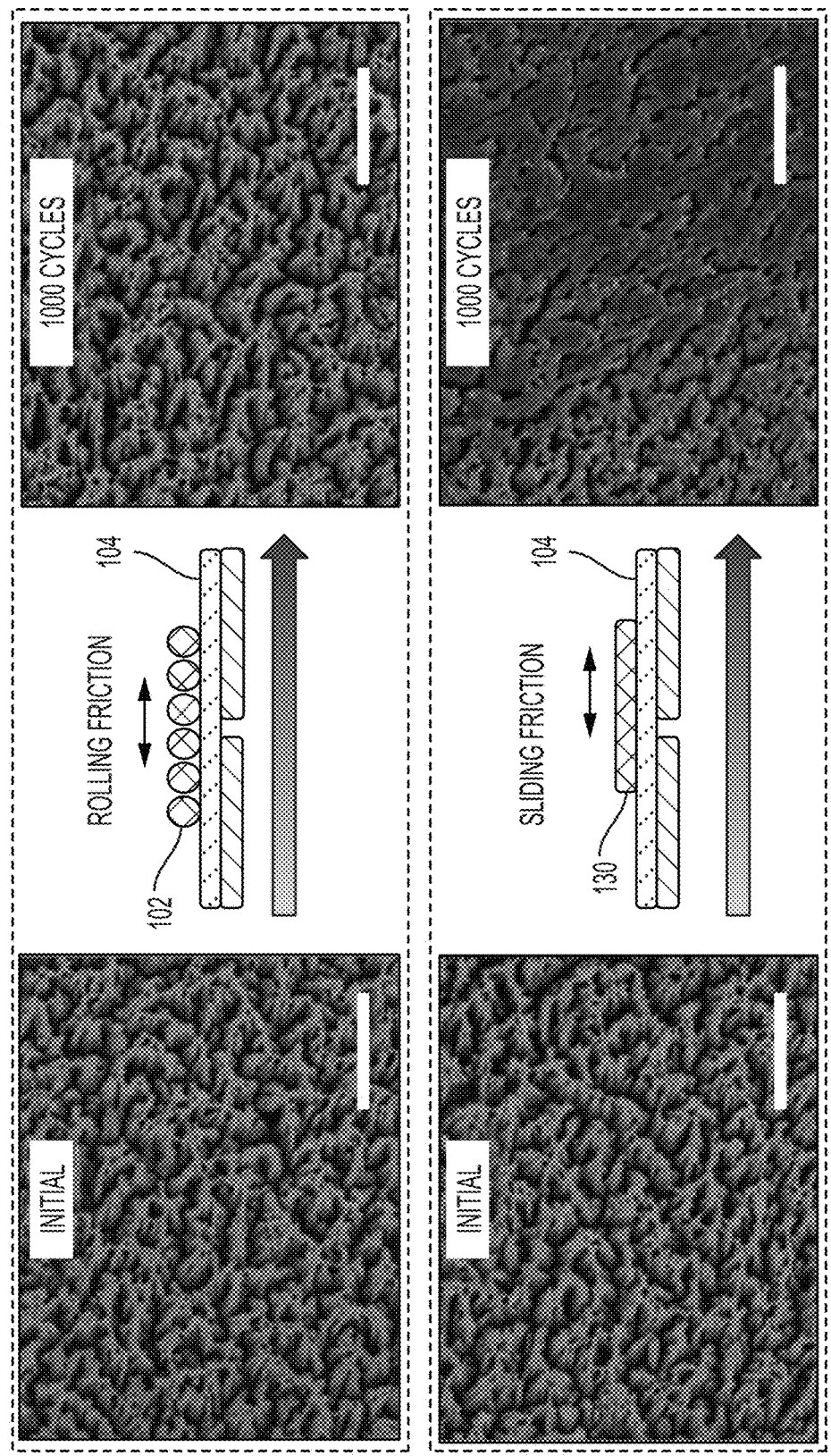
FIG. 6A illustrates changes in a surface under separate influences of rolling friction and sliding friction.

In the study, two samples of nanostructured FEP thin films 104 undergo a strenuous test, where a first film experiences rolling friction caused by rods 102 over 1000 cycles of motion, and a second film experiences sliding friction caused by steel foils 130 over 1000 cycles of motion. SEM images of both samples are taken before and after the test, as illustrated in FIG. 6A. The top portion of FIG. 6A illustrates the transformation of the first film under the influence of the rolling friction, whereas the bottom portion illustrates the transformation of the second film under the influence of the sliding friction. In FIG. 6A, the two left SEM images show the states of the two samples before the test and the two right SEM images show the states after the test. The scale bars are 2 μm for all images in FIG. 6A.

As shown in FIG. 6A, the first sample subject to rolling friction experiences minor degradation in its nanowire structures, indicating a tremendously low wearing effect. On the other hand, most of the nanowires on the second sample subject to sliding friction are destroyed at the end of the test. Accordingly, the RTENG 100 is more durable than traditional sliding TENGs.

1.8 Application

Figure 6B:
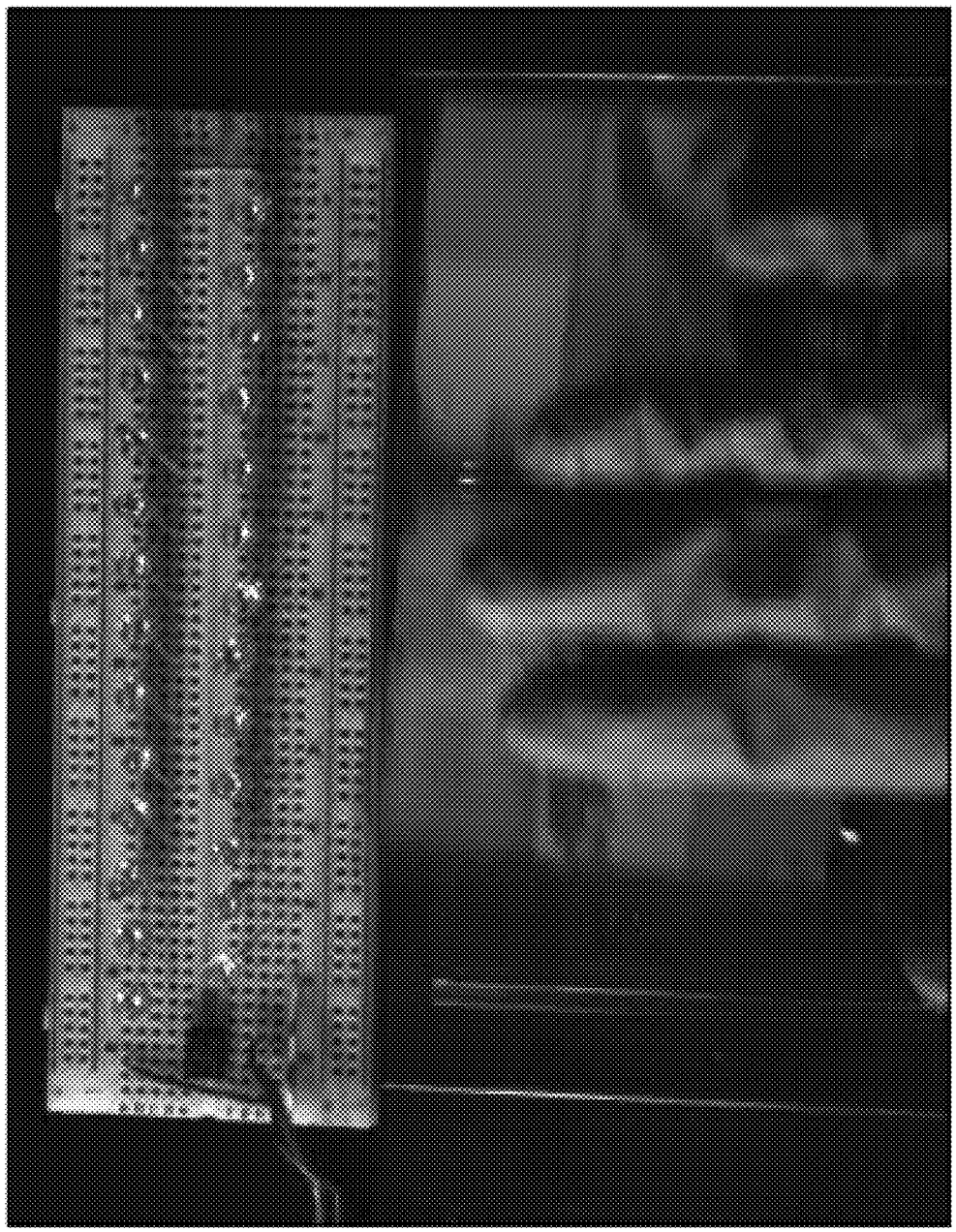
FIG. 6B illustrates an exemplary application of the rolling triboelectric nanogenerator for harvesting energy according to one aspect of the disclosed technology.

The high-efficient RTENG 100 may have many applications, including, but not limited to, instantaneously powering portable electronics. For example, this RTENG 100 may harvest energy from gentle finger movements as illustrated in FIG. 6B, which may be used to drive portable electronics such as light-emitting diodes (LEDs).

2. Rolling Triboelectric Nanogenerator with Rolling Balls on a Planar Surface Based on the rolling electrification concept, RTENGs may have many other configurations such as incorporating one or more of the following implementations: rolling balls, a rotating disk structure, and a grating structure, among many other possibilities. Detailed discussions with respect to these alternative embodiments are provided herein. Similar to the rolling rod embodiment, these embodiments may also provide effective and efficient energy harvesting.

2.1 Rolling Balls in Contact with Electrodes

Figure 7B:
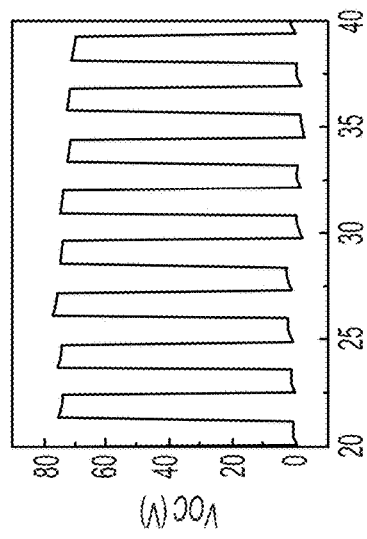
FIGS. 7A-D illustrates a schematic structure and, output performance characteristics of a different embodiment of the rolling triboelectric nanogenerator.
Figure 7A:
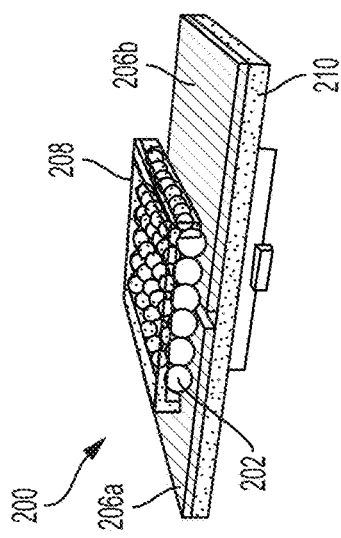

FIG. 7A illustrates an RTENG 200. The RTENG 200 may include two electrodes 206a-b. A member 202 may be in contact with the two electrodes 206a-b to generate triboelectric charges. The member 202 may roll against the electrodes 206a-b to generate a flow of electrons between the two electrodes 206a-b. As shown in FIG. 7A, the RTENG 200 may include a plurality of substantially spherical members 202. A supporting member 208 may confine the plurality of substantially spherical members 202. The two electrodes 206a-b may also be supported by a supporting member 210.

The electrodes 206a-b and the member 202 may have different triboelectric characteristics. For example, the electrodes 206a-b and the member 202 may be made of materials having different triboelectric series ratings. For instance, the member 202 may include a material with a relatively less negative triboelectric series rating, or with a propensity to gain electrons upon contact. Examples of suitable materials for the member 202 may include, but not limited to, anyone or a combination of the following materials: PET, PMMA, PDMS, PTFE, FEP, PVC, polyimide, metal and alloy, among many other possibilities. The electrodes 206a-b may include a material with a relatively more negative triboelectric series rating, or with a propensity to lose electrons upon contact. Examples of suitable materials for the electrodes 206a-b may include, but not limited to, anyone or a combination of the following materials: PU, poly-oxydiphenylene-pyromellitimide, PDMS, conductive polymer, metal such as copper, aluminum, silver and gold, alloy such as steel, and ITO, among many other possibilities.

The supporting members 208 and 210 each may include a substrate material. The supporting members 208 and 210 may or may not have the same substrate material. Examples of suitable substrate materials may include, but not limited to, anyone or a combination of the following materials: polyimide, PET, PMMA, poly(4,4'-oxydiphenylene-pyromellitimide) and SiO2, among many other possibilities.

In one embodiment, the RTENG 200 may include a group of dielectric PTFE rolling balls 202 and two separate copper electrodes 206a-b. The balls 202 may be confined by a PMMA member 208, and the copper electrodes 206a-b may be supported by a PMMA sheet 210.

The PTFE balls 202 may become negatively charged when contacting the underlying copper electrodes 206a-b. The PTFE balls 202 may freely roll between the pair of copper electrodes 206a-b. Such rolling movements may induce a change of potential between the two electrodes 206a-b, which, in turn, may induce a charge flow in an external load 220.

Figure 7D:
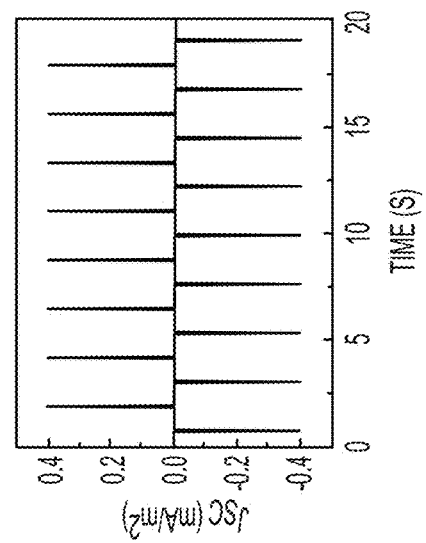
Figure 7C:
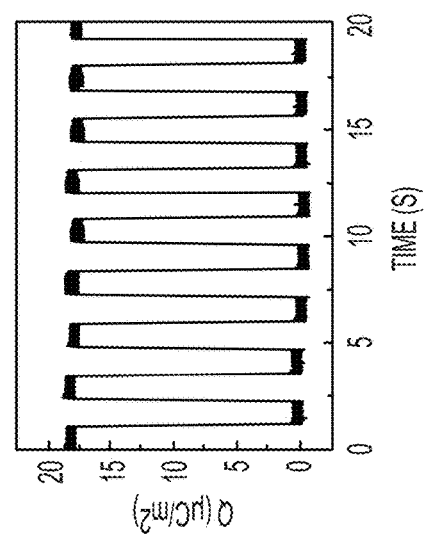

FIGS. 7B-D illustrate output performance characteristics of the RTENG 200. For example, FIGS. 7B-D respectively illustrate open-circuit voltage, transferred charge density, and short-circuit current density measurements of the RTENG 200. The output performances of RTENG 200 are similar to, but lower in magnitude than, that of the RTENG 100.

2.2 Rolling Balls in Contact with an FEP Film

Figure 8B:
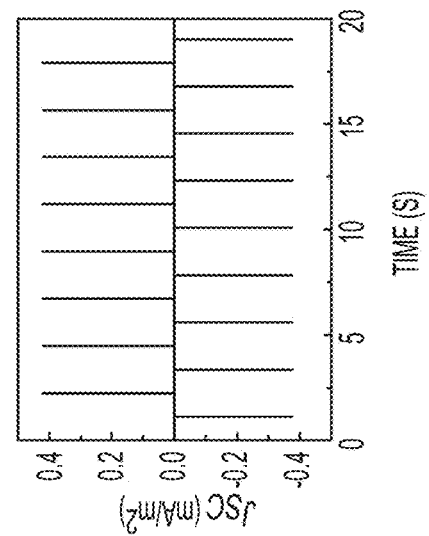
Figure 8D:
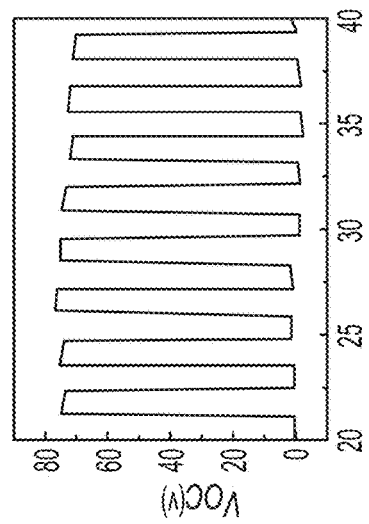
Figure 8A:
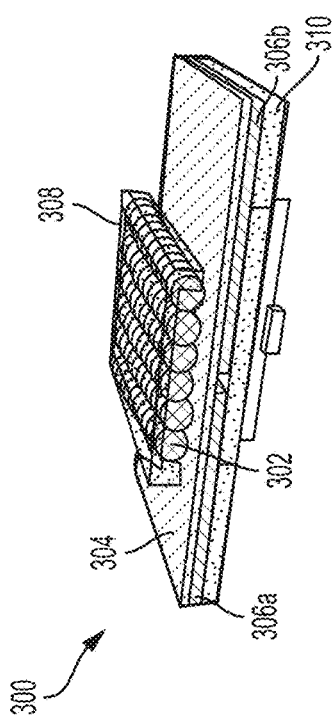

FIG. 8A illustrates an RTENG 300. The RTENG 300 may include a first member 304, and a second member 302 in contact with the first member to generate triboelectric charges. The second member 302 may roll against the first member 304 to generate a flow of electrons between two electrodes 306a-b. The first member 304 may define a substantially planar configuration. The electrodes 306a-b may be adjacent to the first member 304. The second member 302 may include a plurality of substantially spherical members 302. A supporting member 308 may confine the plurality of substantially spherical members 302. Another supporting member 310 may support the two electrodes 306a-b.

The first member 304 and the second member 302 may have different triboelectric characteristics. For example, the two members may be made of materials having different triboelectric series ratings. For instance, the first member 304 may include a material with a relatively less negative triboelectric series rating, or with a propensity to gain electrons upon contact. Examples of suitable materials for the first member 304 may include, but not limited to, anyone or a combination of the following materials: PET, PMMA, PDMS, PTFE, FEP, PVC, polyimide, metal and alloy, among many other possibilities. The second member 302 may include a material with a relatively more negative triboelectric series rating, or with a propensity to lose electrons upon contact. Examples of suitable materials for the second member 302 may include, but not limited to, anyone or a combination of the following materials: PU, poly-oxydiphenylene-pyromellitimide, PDMS, conductive polymer, metal such as copper, aluminum and gold, and alloy such as steel, among many other possibilities. The electrodes 306a-b may include, but not limited to, anyone or a combination of the following materials: metal such as copper, gold, silver and aluminum, ITO and conductive polymer, among many other possibilities.

The supporting members 308 and 310 each may include a substrate material. The supporting members 308 and 310 may or may not have the same substrate material. Examples of suitable substrate materials may include, but not limited to, anyone or a combination of the following materials: polyimide, PET, PMMA, poly(4,4'-oxydiphenylene-pyromellitimide) and SiO2, among many other possibilities.

In one embodiment, the RTENG 300 may include a group of steel rolling balls 302 and a piece of FEP film 304 disposed above two separate copper electrodes 306a-b. The balls 302 may be confined by a PMMA member 308. The copper electrodes 306a-b may be supported by a PMMA sheet 310. Rolling electrification between the steel balls 302 and the planar FEP thin film 304 may induce a change in a potential difference between the pair of copper electrodes 306a-b.

Figure 8C:
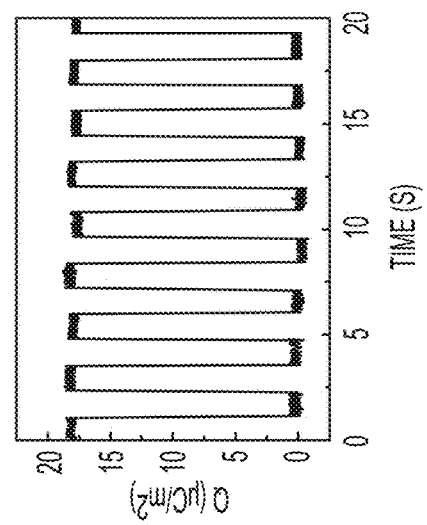

FIGS. 8B-D illustrate output performance characteristics of the RTENG 300. For example, FIGS. 8B-D respectively illustrate open-circuit voltage, transferred charge density, and short-circuit current density measurements of the RTENG 300. The output performances of RTENG 300 are similar to that of the RTENG 100, but lower in magnitude than that of the RTENG 100.

2.3. Two Separate Groups of Rolling Balls

Figure 9A:
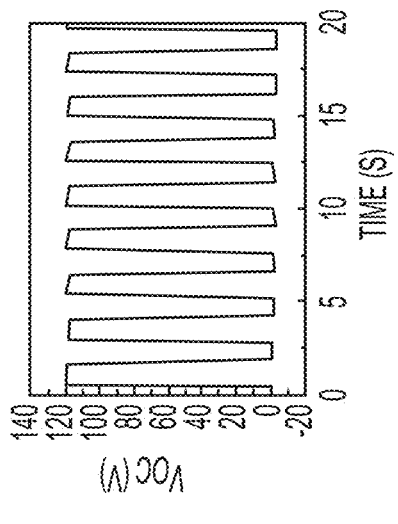
FIGS. 9A-D illustrate a schematic structure and output performance characteristics of yet another embodiment of the rolling triboelectric nanogenerator.

FIG. 9A illustrates an RTENG 400. The RTENG 400 may include a first member 404 and a second member 402 in contact with the first member 404 to generate triboelectric charges. The second member 402 may roll against the first member 404 to generate a flow of electrons between two electrodes 406a-b. The first member 404 may define a substantially planar configuration. The second member 402 may include a plurality of substantially spherical members 402. The substantially spherical members 402 may contact and roll against the two electrodes 406a-b. The substantially spherical members 402 may form into two groups. Each group may be confined by a supporting member 408. Supporting members 410 and 412 may respectively support the first member 404 and the two electrodes 406a-b.

The first member 404 and the second member 402 may have different triboelectric characteristics. For example, the two members may be made of materials having different triboelectric series ratings. For instance, the first member 404 may include a material with a relatively less negative triboelectric series rating, or with a propensity to gain electrons upon contact. Examples of suitable materials for the first member 404 may include, but not limited to, anyone or a combination of the following materials: PET, PMMA, PDMS, PTFE, FEP, PVC, polyimide, metal and alloy, among many other possibilities. The second member 402 may include a material with a relatively more negative triboelectric series rating, or with a propensity to lose electrons upon contact. Examples of suitable materials for the second member 402 may include, but not limited to, anyone or a combination of the following materials: PU, poly-oxydiphenylene-pyromellitimide, PDMS, conductive polymer, metal such as copper, aluminum and gold, and alloy such as steel, among many other possibilities. The electrodes 406a-b may include, but not limited to, anyone or a combination of the following materials: metal such as copper, gold, silver and aluminum, ITO and conductive polymer, among many other possibilities.

The supporting members 408, 410 and 412 each may include a substrate material. The supporting members 408, 410 and 412 may or may not have the same substrate material. Examples of suitable substrate materials may include, but not limited to, anyone or a combination of the following materials: polyimide, PET, PMMA, poly(4,4'-oxydiphenylene-pyromellitimide) and SiO2, among many other possibilities.

In one embodiment, the RTENG 400 may have two groups of steel rolling balls 402 disposed directly above copper electrodes 406a and 406b. The RTENG 400 may also include a piece of freestanding FEP film 404 without electrode disposition. Each group of the balls 402 may be confined by a PMMA member 408. The FEP film 404 may be covered by a PMMA sheet 410. The copper electrodes 406a-b may also be supported by a PMMA sheet 412. The FEP thin film 404 may roll between the two groups of balls 402, which, in turn, generates electric power.

Figure 9B:
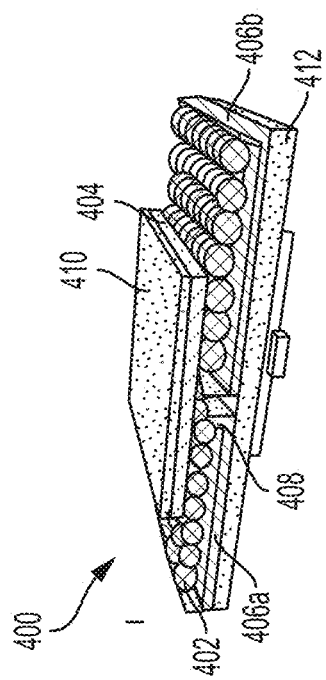
Figure 9C:
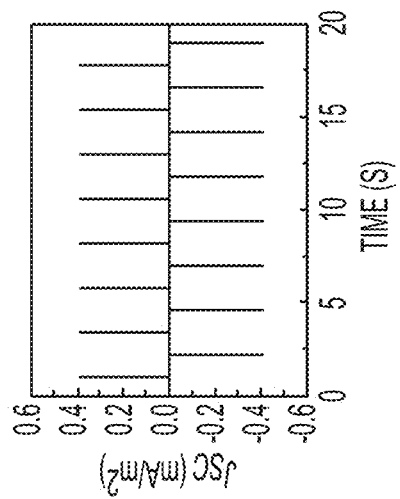
Figure 9D:
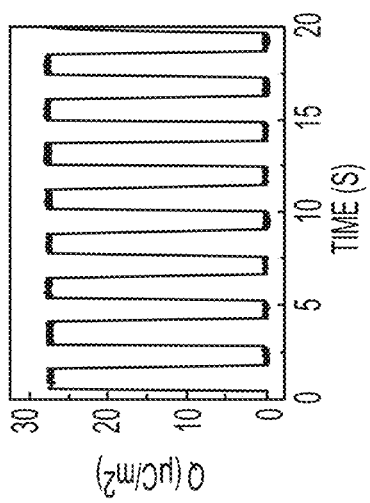

FIGS. 9B-D illustrate output performance characteristics of the RTENG 400. FIGS. 9B-D illustrate open-circuit voltage, transferred charge density, and short-circuit current density measurements of the RTENG 400. The output performances of the RTENG 400 are similar to, but lower in magnitude than, that of the RTENG 100.

2.4. Linear Grating RTENG

Figure 10A:
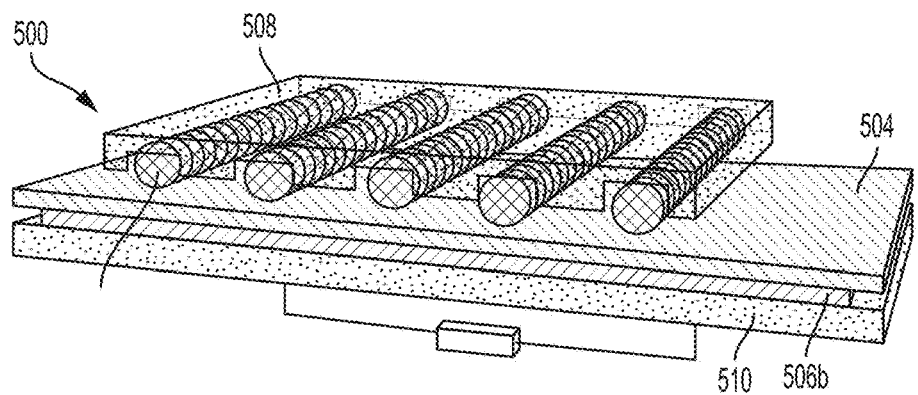
FIGS. 10A-F illustrate a schematic structure and output performance characteristics of a further embodiment of the rolling triboelectric nanogenerator.
Figure 10B:
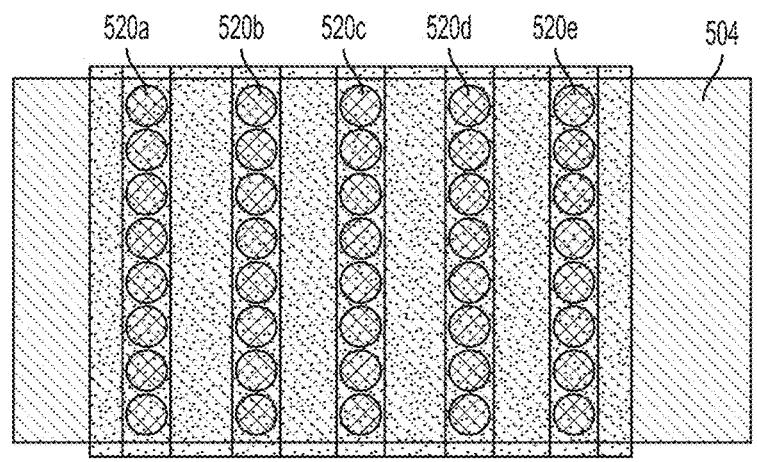

FIG. 10A illustrates a linear-grating RTENG 500. The RTENG 500 may include a first member 504, and a second member 502 in contact with the first member 504 to generate triboelectric charges. The first member 504 may define a substantially planar configuration. The second member 502 may include a plurality of substantially spherical members 502. A supporting member 508 may confine the plurality of substantially spherical members 502, and separate the members 502 into parallel groups 520a-e as illustrated in FIG. 10B. Each group 520a-e may form a linear profile.

The second member 502 may roll against the first member 504 to generate a flow of electrons between two electrodes 506a-b. The two electrodes 506a-b may be complementary grating electrodes.

The first member 504 and the second member 502 may have different triboelectric characteristics. For example, the two members may be made of materials having different triboelectric series ratings. For instance, the first member 504 may include a material with a relatively less negative triboelectric series rating, or with a propensity to gain electrons upon contact. Examples of suitable materials for the first member 504 may include, but not limited to, anyone or a combination of the following materials: PET, PMMA, PDMS, PTFE, FEP, PVC, polyimide, metal and alloy, among many other possibilities. The second member 502 may include a material with a relatively more negative triboelectric series rating, or with a propensity to lose electrons upon contact. Examples of suitable materials for the second member 502 may include, but not limited to, anyone or a combination of the following materials: polyurethane (PU), poly-oxydiphenylene-pyromellitimide, PDMS, conductive polymer, metal such as copper, aluminum and gold, and alloy such as steel, among many other possibilities. The electrodes 506a-b may include, but not limited to, anyone or a combination of the following materials: metal such as copper, gold, silver and aluminum, ITO and conductive polymer, among many other possibilities.

The supporting members 508 and 510 each may include a substrate material. The supporting members 508 and 510 may or may not have the same substrate material. Examples of suitable substrate materials may include, but not limited to, anyone or a combination of the following materials: polyimide, PET, PMMA, poly(4,4'-oxydiphenylene-pyromellitimide) and SiO2, among many other possibilities.

According to one embodiment, the RTENG 500 may include a plurality of steel balls 502. The steel rolling balls 502 may be separated into several groups 520a-e by a PMMA member 508 fabricated by laser cutting. For example, the PMMA member 508 may include several parallel compartments. As a result, each group of rolling balls 502 may be confined within one compartment. Each group of rolling balls 502 may form a linear fashion. All groups of rolling balls 502 may be parallel to each other. FIG. 10B illustrates a top view of the RTENG 500 showing rolling ball groups 520a-e arranged in a parallel fashion.

Figure 10C:
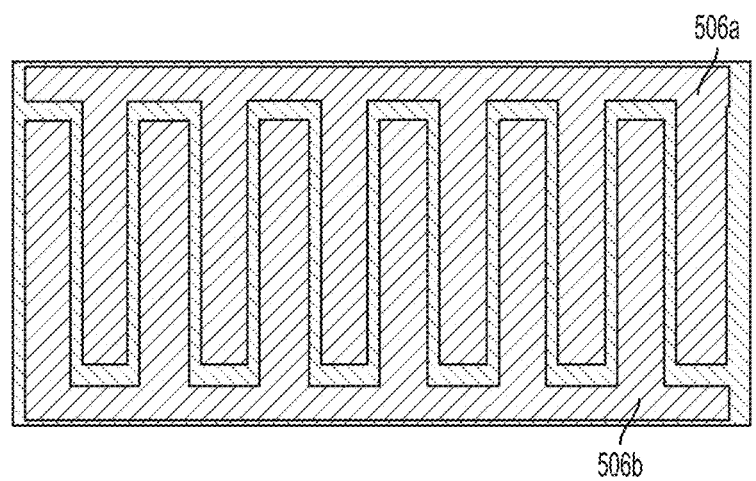

The RTENG 500 may include a piece of FEP film 504 deposited above two complementary grating copper electrodes 506a-b. FIG. 10C is a bottom view of the RTENG 500 illustrating the two complementary grating electrodes 506a and 506b. Concurrent movements of the rolling balls 502 may introduce a potential difference between the two copper electrodes 506a-b. As shown in FIG. 10A, the copper electrodes 506a-b may be supported by a PMMA sheet 510.

Figure 10D:
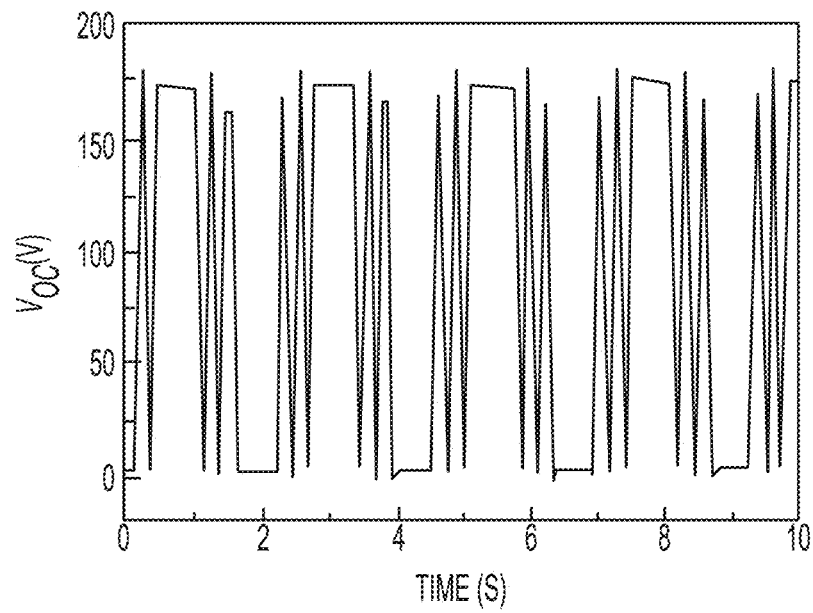
Figure 10E:
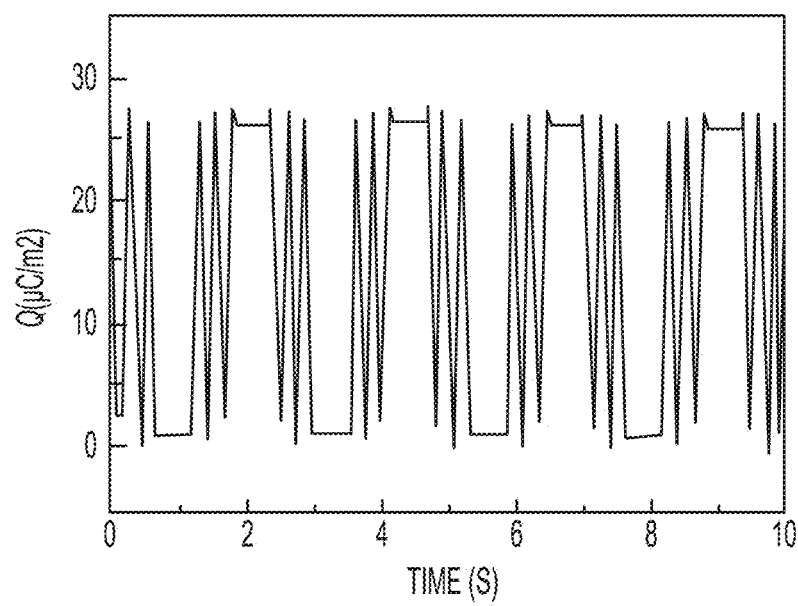
Figure 10F:
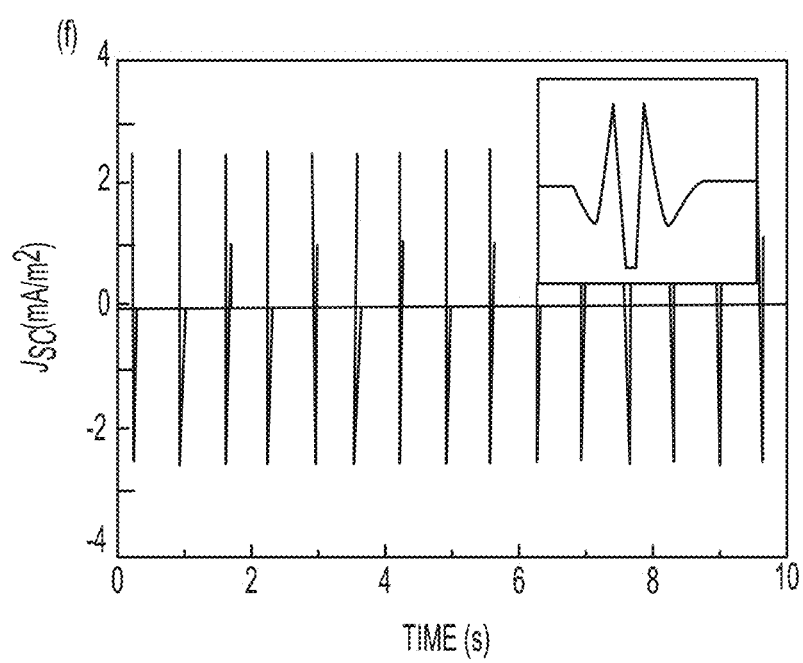

FIGS. 10D-F respectively illustrate open-circuit voltage, transferred charge density, and short-circuit current density measurements of the RTENG 500. As illustrated in FIG. 10DF, the output current of the RTENG 500 may be improved as a result of a larger rate of charge transfer. More importantly, multiple cycles of charge transfer may be achieved through one single cycle of reciprocating movement. One cycle of movement may be regarded as moving the second member 202 from a starting end of the first member 504 to an opposite end and returning back to the starting end.

2.5. Rotary RTENG

Figure 11A:
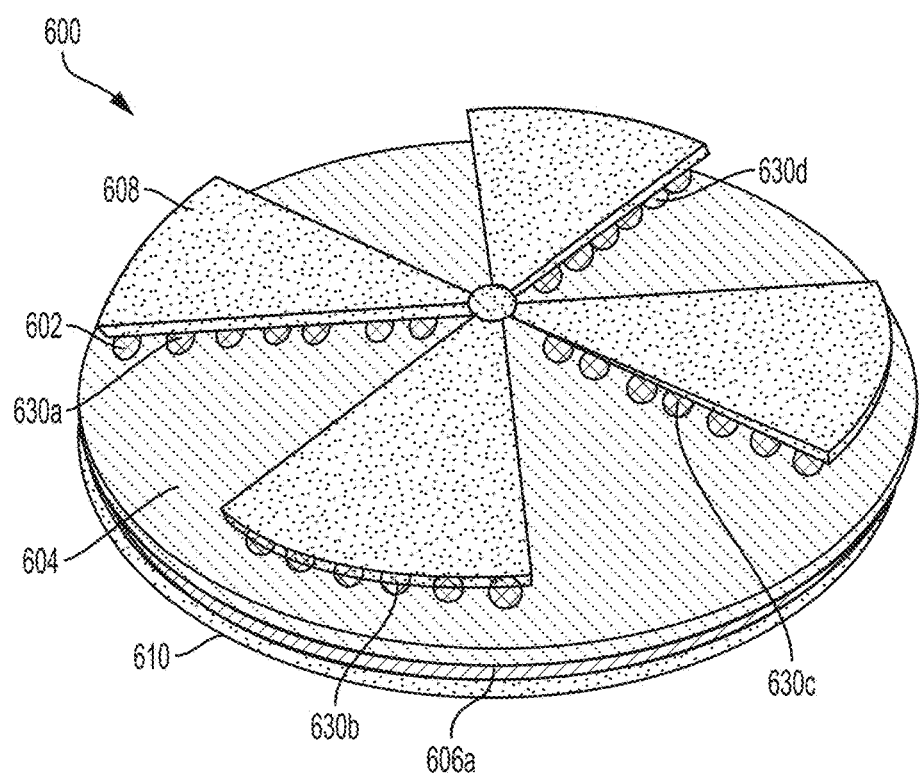
FIGS. 11A-F illustrate a schematic structure and output performance characteristics of a still further embodiment of the rolling triboelectric nanogenerator.

FIG. 11A illustrates a rotary RTENG 600 for rotational mechanical energy harvesting. The RTENG 600 may include a first member 604, and a second member 602 in contact with the first member 604 to generate triboelectric charges. The first member 604 may define a substantially planar configuration. The second member 602 may include a plurality of substantially spherical members 602. The substantially spherical members 602 may form into a plurality of groups, each group being confined by a supporting member 608. Each group of substantially spherical members 602 may exhibit a circular sector profile of a disk.

Two electrodes 606a-b may be adjacent to the first member 604. The second member 602 may roll against the first member 604 to generate a flow of electrons between the two electrodes 606a-b. A supporting member 610 may support the two electrodes 606a-b.

The first member 604 and the second member 602 may have different triboelectric characteristics. For example, the two members may be made of materials having different triboelectric series ratings. For instance, the first member 604 may include a material with a relatively less negative triboelectric series rating, or with a propensity to gain electrons upon contact. Examples of suitable materials for the first member 604 may include, but not limited to, anyone or a combination of the following materials: PET, PMMA, PDMS, PTFE, fluorinated FEP, PVC, polyimide, metal and alloy, among many other possibilities. The second member 602 may include a material with a relatively more negative triboelectric series rating, or with a propensity to lose electrons upon contact. Examples of suitable materials for the second member 602 may include, but not limited to, anyone or a combination of the following materials: PU, poly-oxydiphenylene-pyromellitimide, PDMS, conductive polymer, metal such as copper, aluminum and gold, and alloy such as steel, among many other possibilities. The electrodes 606a-b may include, but not limited to, anyone or a combination of the following materials: metal such as copper, gold, silver and aluminum, ITO and conductive polymer, among many other possibilities.

The supporting members 608 and 610 each may include a substrate material. The supporting members 608 and 610 may or may not have the same substrate material. Examples of suitable substrate materials may include, but not limited to, anyone or a combination of the following materials: polyimide, PET, PMMA, poly(4,4'-oxydiphenylene-pyromellitimide) and SiO2, among many other possibilities.

According to one embodiment of the disclosed technology, the RTENG 600 may have rolling balls 602 separated into a plurality of groups 630a-d. Each group of rolling balls 602 may be confined by a PMMA member 608. Each PMMA member 608 may exhibit a circular sector configuration. Each group of rolling balls may be confined by the member 608 to form a circular sector profile. The plurality of groups 630a-d may have substantially similar dimensions. The plurality of groups 630a-d may be parts of a same disk profile.

Figure 11B:
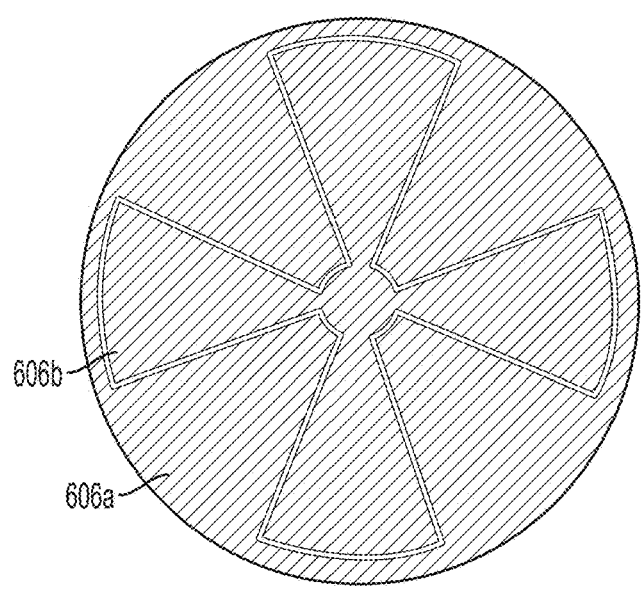

The rolling balls 602 may be disposed above a piece of an FEP film 604. The FEP film 604 may be disposed above two complementary copper electrodes 606a-b, as shown in FIG. 11B. The copper electrodes 606a-b may be supported by a PMMA sheet 610. The electrodes 606a-b may be complementary to together form a disk profile. In one example, one electrode 606b may exhibit a profile similar to a joint profile of the groups 630a-d of the rolling balls.

Figure 11C:
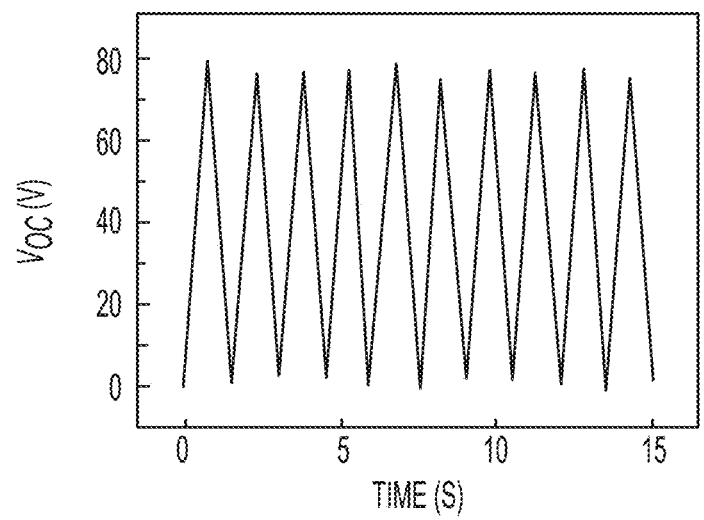
Figure 11D:
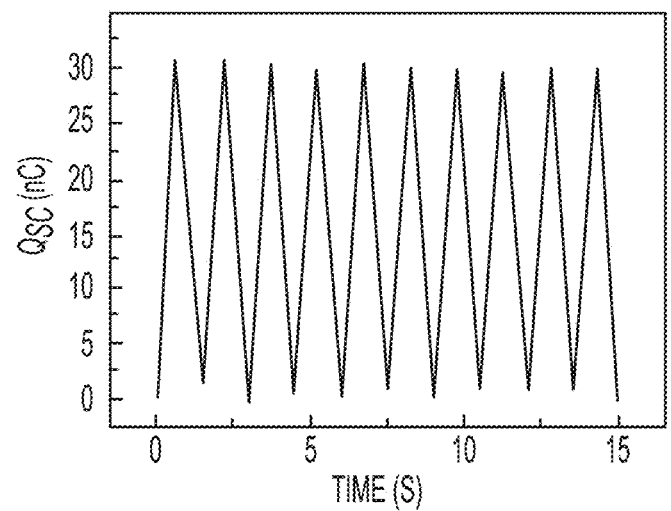
Figure 11E:
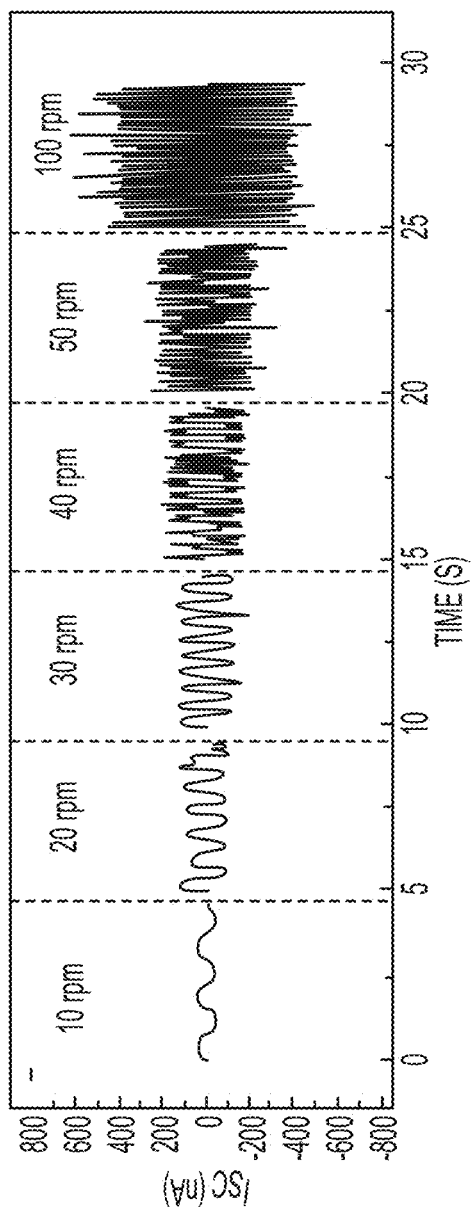
Figure 11F:
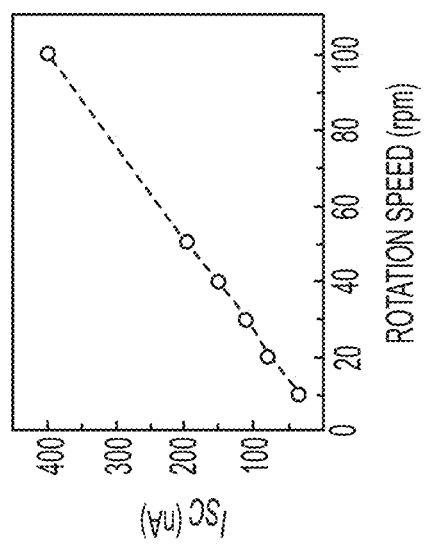

The RTENG 600 may harvest energy from rotations, and may accommodate different rotational speeds. FIGS. 11C-D illustrate open-circuit voltage and transferred charge density measurements of the rotary RTENG 600. FIGS. 11E-F illustrate short-circuit current measurements of the rotary RTENG 600 at different rotation speeds. As shown in FIG. 11E, there is a linear relationship between the current output and the rotational speed. Accordingly, the RTENG 600 may be applied as a self-powered angular speed sensor based on this relationship.

3. Rolling Friction Enhanced Free-Standing Triboelectric Nanogenerator

3.1 Structure

Figure 12A:
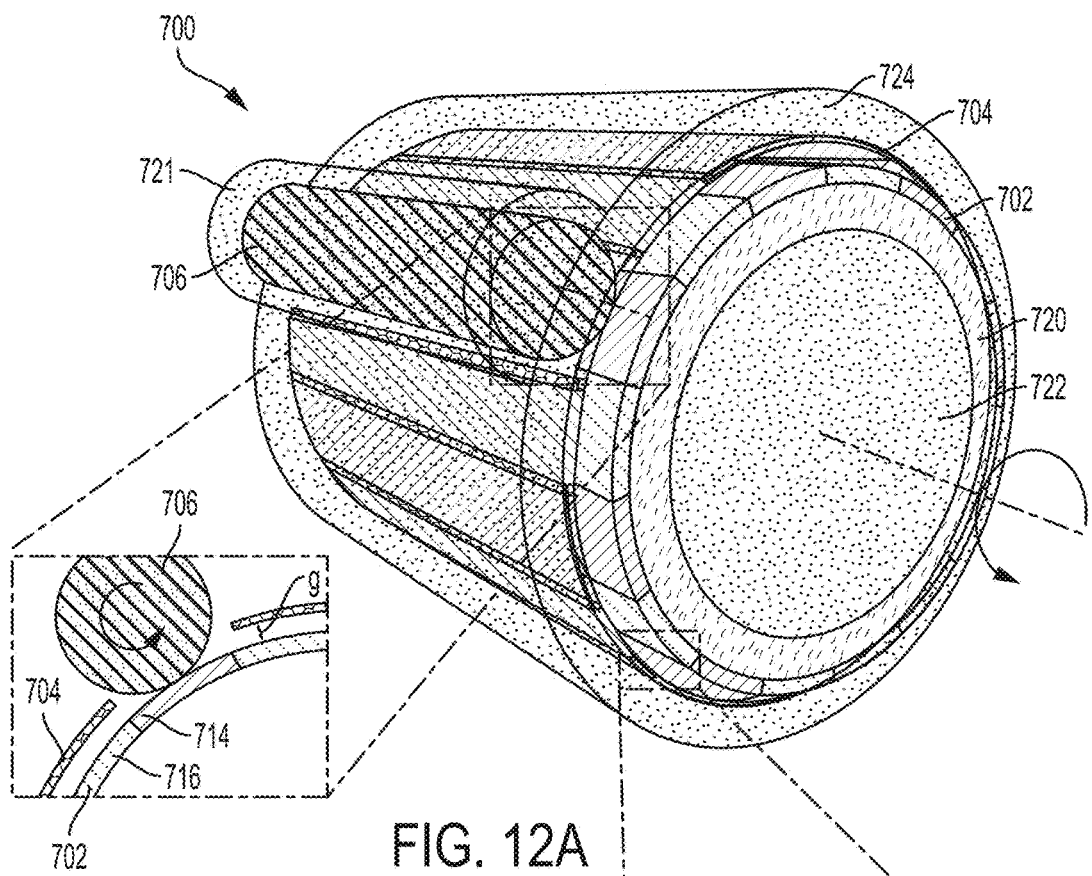
FIG. 12A illustrate a schematic structure of a rolling friction enhanced free-standing triboelectric nanogenerator according to one aspect of the disclosed technology.

FIG. 12A illustrates a rolling friction enhanced free-standing triboelectric nanogenerator (RF-TENG) 700 according to one aspect of the disclosed technology.

The RF-TENG 700 may include a first member 702, and a second member 706 in contact with the first member 702 to generate triboelectric charges. The second member 706 may roll against the first member 702 to generate a flow of electrons between two electrodes 708a and 708b.

Figure 12B:
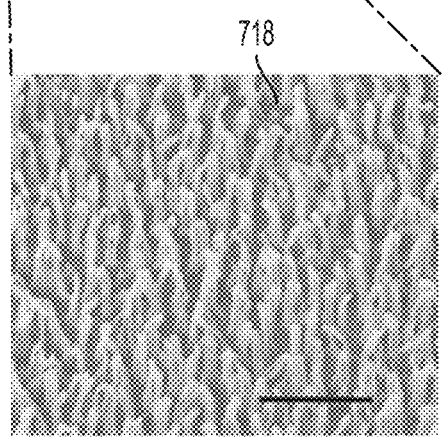
FIG. 12B provide a SEM image illustrate nanostructures on an FEP film of the triboelectric nanogenerator of FIG. 12A.
Figure 12D:
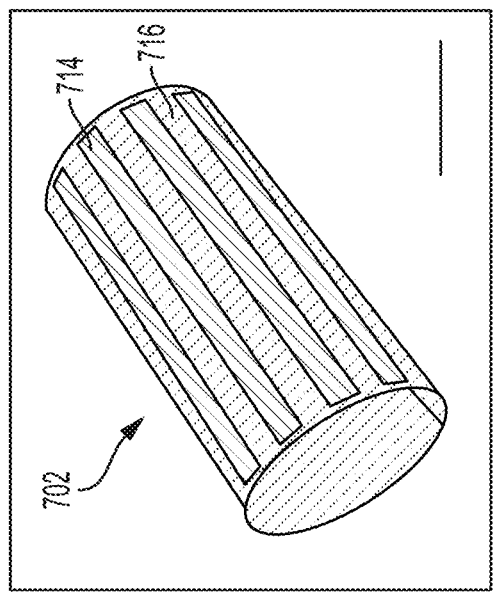
FIG. 12C provides a schematic illustration of two complementary electrodes forming a cylindrical configuration according to one aspect of the disclosed technology.
FIG. 12 D illustrates a schematic illustration of an FEP film with metal strips according to one aspect of the disclosed technology.

The first member 702 may define a substantially cylindrical configuration or a substantially hollow cylindrical configuration. The first member 702 may include a first material 716 with a plurality of parallel, equidistant, identical second materials 714 deposited thereon. As shown in FIGS. 12A and 12D, the first material 716 and the second material 714 may be arranged in an interleaved fashion.

The second member 706 may exhibit a substantially cylindrical configuration. At least one of the first member 702 and the second member 706 may include nanostructures thereon. The second member 706 may include a third material. The second member 706 may be supported by a supporting member 721.

The first member 702 may rotate about a center axis. A supporting member 722 may be disposed within a hollow defined by the first member 702 to support the supporting member.

With reference to FIG. 12 C, the two electrodes 708a and 708b may be complementary to together form a hollow cylindrical configuration. As shown in FIGS. 13A-F, each electrode 708a-b may exhibit a square or rectangular waveform configuration. Returning back to FIG. 12A, the two electrodes 708a-b may be supported by a supporting member 724.

The first material and the third material may have different triboelectric characteristics. For example, the two materials may be made of materials having different triboelectric series ratings. For instance, the first material may have a relatively less negative triboelectric series rating, or with a propensity to gain electrons upon contact. The first material may include, but not limited to, anyone or a combination of the following materials: PET, PMMA, PDMS, PTFE, FEP, PVC, polyimide, metal and alloy, among many other possibilities. The third material 706 may include a relatively more negative triboelectric series rating, or with a propensity to lose electrons upon contact. The third material may include, but not limited to, anyone or a combination of the following materials: PU, poly-oxydiphenylene-pyromellitimide, PDMS, conductive polymer, metal such as copper, aluminum and gold, and alloy such as steel, among many other possibilities.

The second material may be different from the first material. The second material may include anyone or a combination of the following: metal such as copper, gold, silver and aluminum, ITO and conductive polymer, among many other possibilities.

The electrodes 708a-b may include, but not limited to, anyone or a combination of the following materials: metal such as copper, gold, silver and aluminum, ITO and conductive polymer, among many other possibilities.

The supporting members 721, 722 and 724 each may include a substrate material. The supporting members 721, 722 and 724 may or may not have the same substrate material. Examples of suitable substrate materials may include, but not limited to, anyone or a combination of the following materials: polyimide, PET, PMMA, poly(4,4'-oxydiphenylene-pyromellitimide) and $SiO_2$, among many other possibilities.

In one embodiment, the RF-TENG 700 may provide charge replenishment based on a rod rolling friction. In this embodiment, the first member 702 may be a rotator 702, and the second member 706 may be an aluminum rod 706. The first material 716 may refer to an FEP thin film 716, and the second material 714 may refer to metal gratings 714. The rotator 702 may include a layer of parallel, equidistant identical metal gratings 714. In one example, the metal gratings 714 may include copper stripes. The metal gratings 714 may be uniformly deposited onto the FEP thin film 716. FIG. 12D provides a schematic illustration of the rotator 702, with evenly-spaced metal gratings 714 on the FEP thin film 716. In FIG. 12D, the scale bar is 1 cm.

In one example, the FEP surface 716 may include polymer nanowires array 718 to enhance its surface charge density in contact electrification. The polymer nanowires 718 may be created on the FEP surface 716 by way of an inductively coupled plasma (ICP) etching treatment. FIG. 12B provides an SEM image illustrating the etched FEP 716 with nanowires 718. The scale bar in FIG. 12B is 500 nm. In FIG. 12B, the nanowires 718 may have an average clustering diameter about 80 nm, and an average length about 250 nm.

Referring to FIG. 12A, in some embodiments, the thin film 716 of the rotator 702 may be aligned onto a layer of sponge foam 720. The soft sponge foam 720 may act as a buffer layer to assure an intimate contact between the aluminum rod 706 and the FEP film 716. The rotator 702 and the sponge foam 720 may be supported by a PMMA member 722. In one example, the PMMA rod 722 may exhibit a cylindrical configuration with a diameter of 2.54 cm.

Figure 12C:
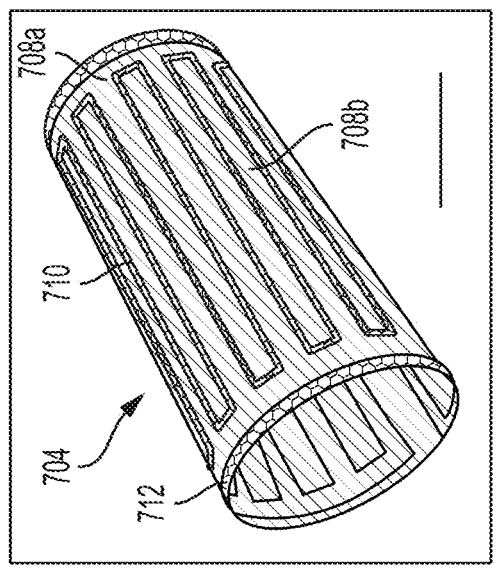
Figure 13C:
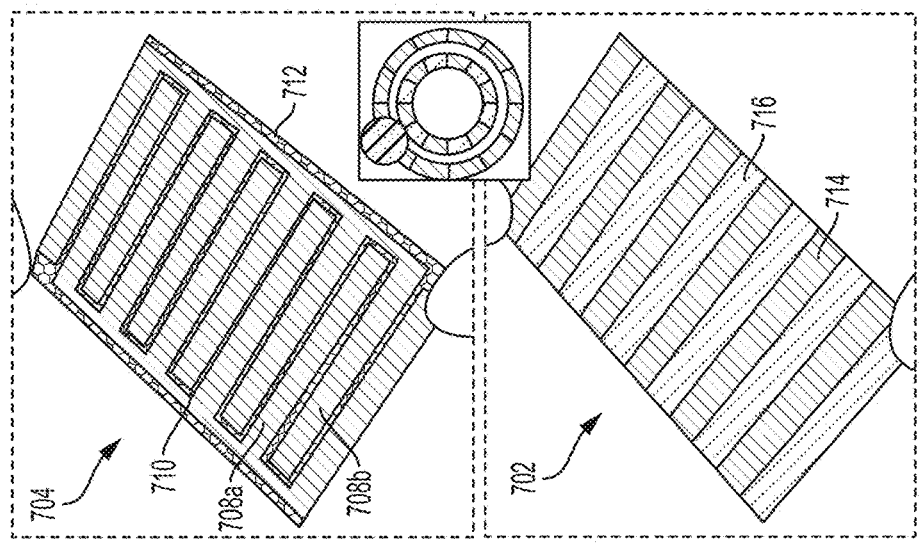
Figure 13B:
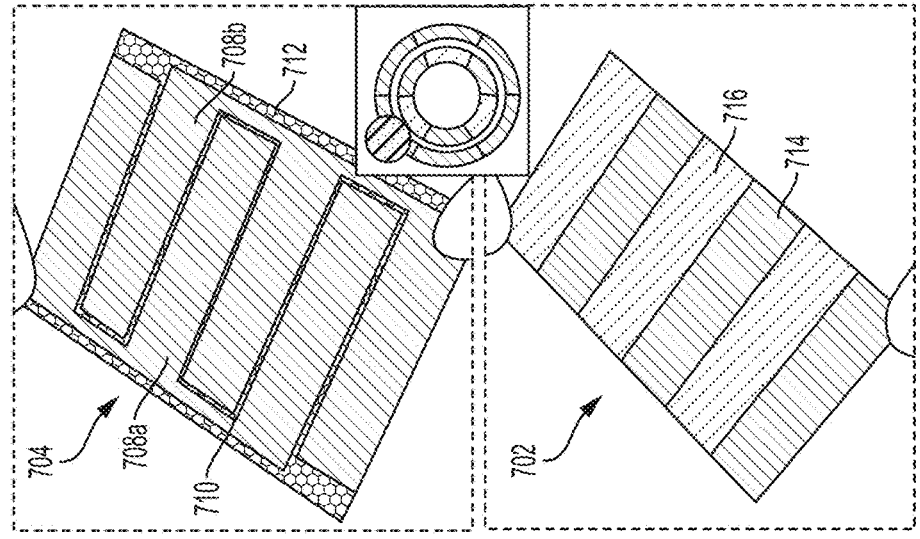
Figure 13A:
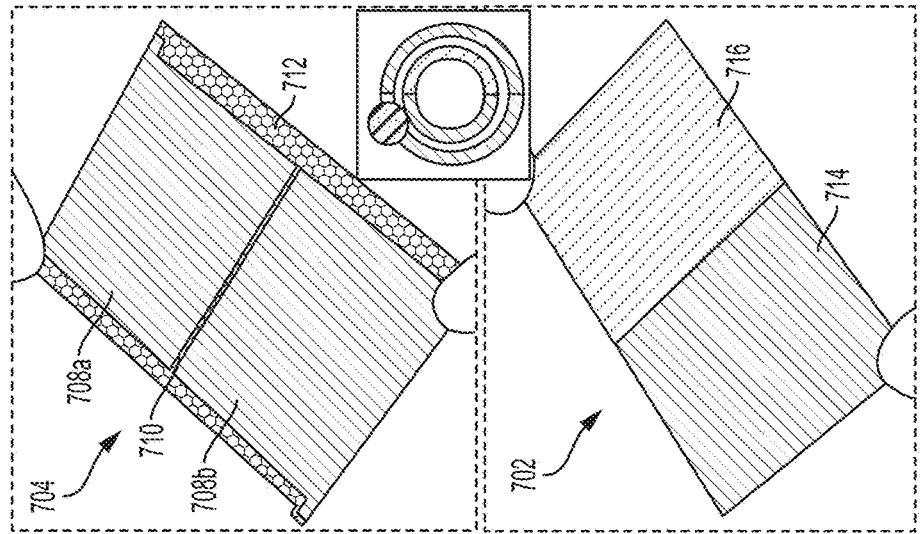

In one embodiment, the electrodes 708a-b may be part of a stator 704 as shown in FIG. 12A. As illustrated in FIG. 12C, the two copper electrodes 708a-b, which are complementarily patterned and disconnected by fine trenches 710 in between. The scale bar in FIG. 12C is 1 cm. The copper electrodes 708a-b may be deposited onto a substrate 712 as shown in FIGS. 13A-F. The substrate 712 may include, but not limited to, anyone or a combination of the following materials: polyimide and PET, among many other possibilities. As shown in FIG. 12A, the substrate 712 with the copper electrodes 708a-b may be supported by an outer supporting member 724.

The rotator 702 and the stator 704 may have any number of gratings. FIGS. 13A-F illustrate the rotator 702 and the stator 704 configured at various grating numbers of 2, 6, 12, 18, 24 and 30, respectively.

Referring back to FIG. 12A, the rotator 702 and the stator 704 may be separated by a free-standing gap "g." The gap "g" may be tunable.

The aluminum rod 706 may generate charge replenishment due to rolling friction with the rotator 702. The rolling rod 706 may act as a charge pump, which continuously replenishes elastic charges into the free standing triboelectric layer 704 to a saturated level. This replenishment may assure a high electric output with strong robustness.

3.2 Fabrication and Assembly

The nanowire structures 718 may be created onto the FEP film 716 by way of inductively coupled plasma (ICP) reactive-ion etching. According to one embodiment, to fabricate polymer nanowire structures 718 on the FEP surface 716, a thick FEP thin film is first cleaned with isopropyl alcohol and deionized water in a consecutive order, and then blown dry with nitrogen gas. The FEP thin film may have a thickness of 50 μm. Before etching, Au particles may be deposited onto the FEP thin film by sputtering to serve as an etching mask. Ar, $O_2$, and $CF_4$ gases are introduced into an ICP chamber at flow rates of 10.0, 15.0, and 30.0 sccm, respectively. A high density plasma generator (400 W) and a plasma-ion acceleration (100 W) may be used to etch the FEP film for 10 min to form the nanowire structures.

In one embodiment, to fabricate the rotator 702, an FEP film of a size of 88 mm×3 mm may be coated with copper stripes by way of physical vapor deposition (PVD). The copper coated FEP may be placed over a layer of sponge foam. Thereafter, a PMMA rod of a diameter of 2.54 cm may be used to support the FEP and the sponge foam.

To fabricate the stator 704, a PMMA tube may be selected. The PMMA tube may have an inner diameter of anyone of the following: 29 mm, 30 mm, 32 mm, 34 mm and 36 mm. An elongated opening may be created in the PMMA in a direction parallel to a center axis of the PMMA. The opening may be of a suitable width to accommodate and anchor the rod 706. For example, if the rod 706 has a diameter of 11 mm, the opening may have a width of 12 mm. A layer of copper electrodes, which are complementarily patterned and disconnected by fine trenches in between, may be deposited onto a substrate film, such as a polyimide film. The polyimide film may then be aligned along an inner surface of the PMMA tube.

3.3 Operating Principle

Figures 14A, 14B, 14C:
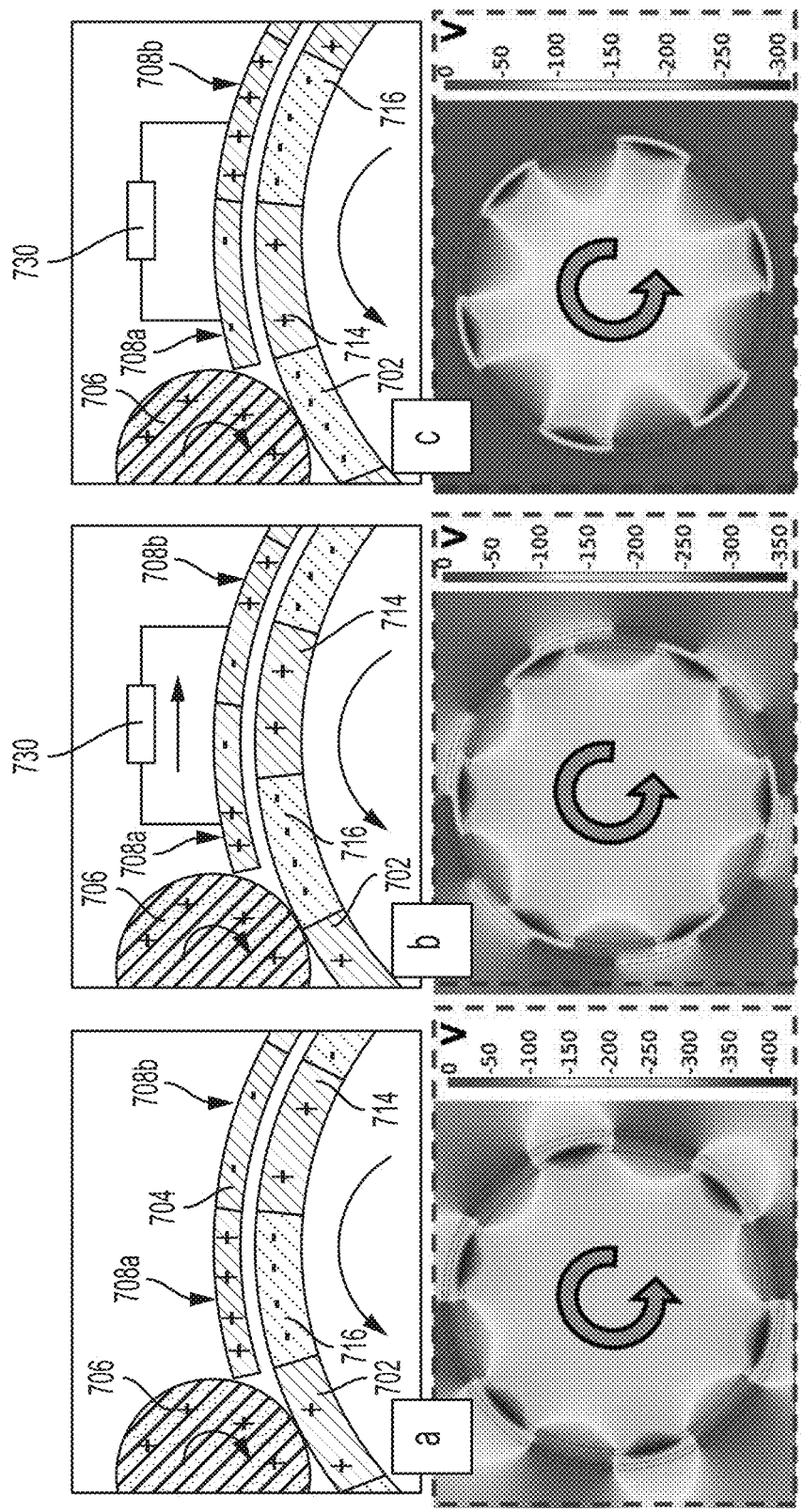
FIGS. 14A-C illustrate the operating principle of the rolling friction enhanced free-standing triboelectric nanogenerator according to one aspect of the disclosed technology.

FIGS. 14A-C illustrate how the RF-TENG 700 generate electricity as a result of a coupling effect of contact electrification and electrostatic induction.

FIGS. 14A-C each include a top diagram illustrating charge distributions of the RF-TENG 700 at various states during a half cycle rotation, including an initial state, an intermediate state and a final state. Bottom diagrams illustrate potential distributions of the RF-TENG 700 at each stage. The initial state and the final state may refer to the states when the FEP gratings 716 of the rotator 702 are aligned with electrodes 708a-b. An intermediate state may refer to the state when the rotator 702 spins from the initial position to the final position.

Initially, when the rotator 702 starts to spin, rolling friction occurs between the aluminum rod 706 and the FEP surface 716. As a result, an equal amount of negative and positive charges are respectively generated on the FEP parts 716 and the metal parts 714 due to a difference in electron affinity between the aluminum rod 706 and the FEP parts 716.

The rotation of the rotator 702 leads to an intimate contact between the aluminum rod 706 and the metal gratings 714, causing a redistribution of positive and negative charges on both the FEP parts 716 and metal parts 714 of the rotator 702, according to the principle of equipotential body. Subsequently, as illustrated in FIG. 14A, owing to electrostatic induction, the negatively charged FEP 716 induces an equal amount of positive charges in its aligned electrode 708a in the stator 704, while the positively charged metal 714 induces an equal amount of negative charges in its aligned electrode 708b in the stator 704.

At the intermediate state, the positive charge on the electrode 708a continuously transfers to the electrode 708b through an external circuit 730 as illustrated in FIG. 14B until arriving at the final state as illustrated in FIG. 14C. Continuous rotations beyond the final state may periodically change the open circuit voltage and the short-circuits current.

3.4 Output Performance

Figure 15A:
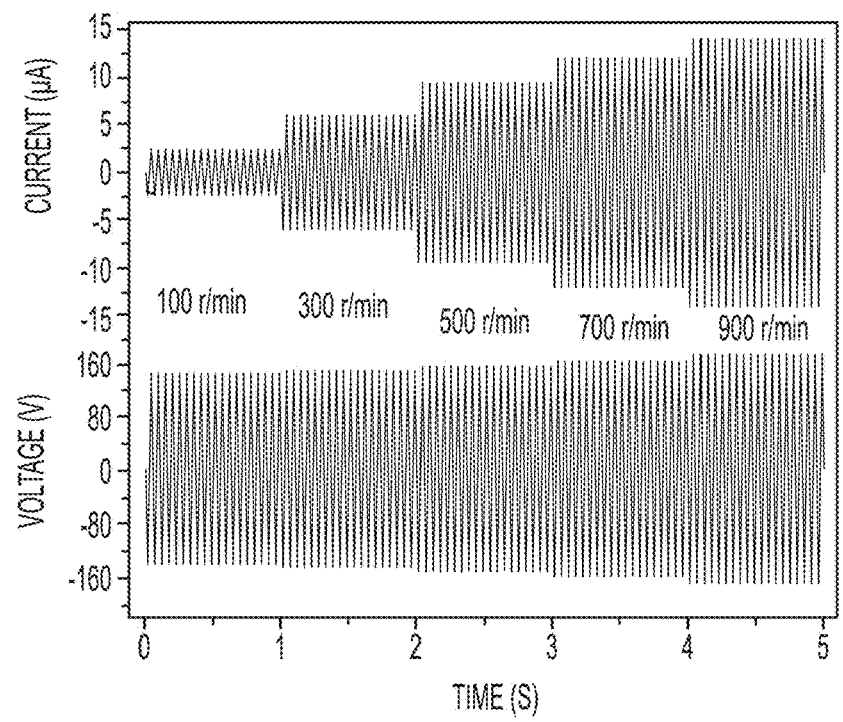
FIGS. 15A-B illustrate electric output characteristics of the rolling friction enhanced free-standing triboelectric nanogenerator according to one aspect of the disclosed technology.
Figure 15B:
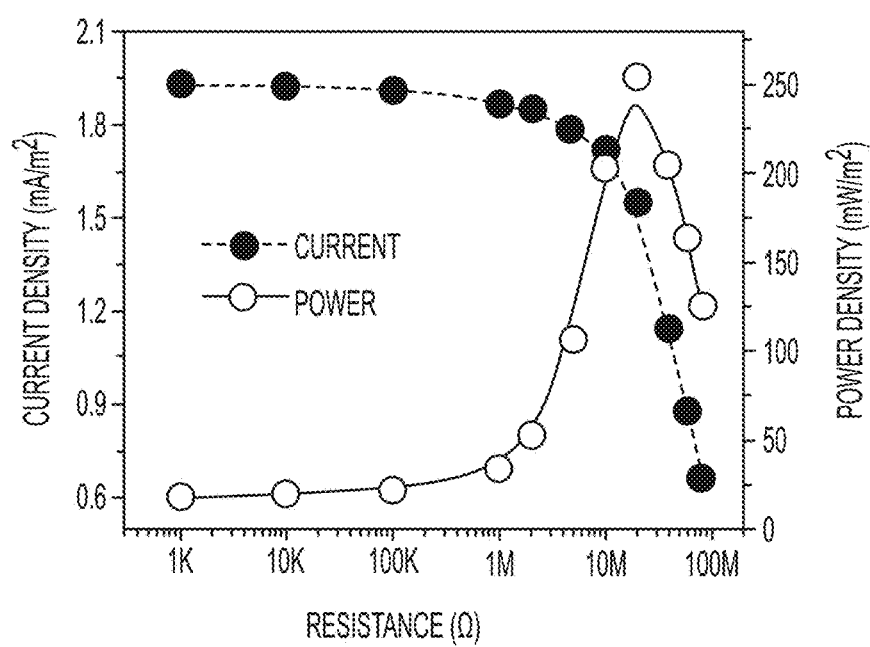

The RF-TENG 700 acts as a robust and sustainable power source. FIGS. 15A-B provide data that demonstrate the RF-TENG 700 as a practical power source. Data are from a test performed on an as-fabricated RF-TENG having the following attributes: a grating number of 30, a diameter of 2.54 cm, a length of 10 cm, a free standing gap of 0.5 mm, and a rotating speed of 900 r/min. FIG. 15A illustrates voltage and current outputs of the RF-TENG 700. As shown in FIG. 15A, the short-circuit current and the open-circuit voltage (peak to peak) may respectively reach ~15 to and ~320V.

FIG. 15B illustrates how the resistance of the external load 730 affects the output current and the peak power of the RF-TENG 700. As shown in FIG. 15B, a maximum power density of 250 mW/m$^2$ is achieved when the resistance is approximately at 20 MΩ. As displayed in FIG. 15B, the current decreases as the load resistance increases due to ohmic loss. The voltage on the other hand behaves in an opposite manner.

3.5 Parameters Effecting Output Performance

Two design parameters, grating numbers and free standing gap "g", may affect the performance of the RF-TENG 700 in harvesting rotational kinetic energy. As explained below, the output power may greatly increase as the grating number increases and the gap decreases.

3.5.1 Grating Number

Figure 16A:
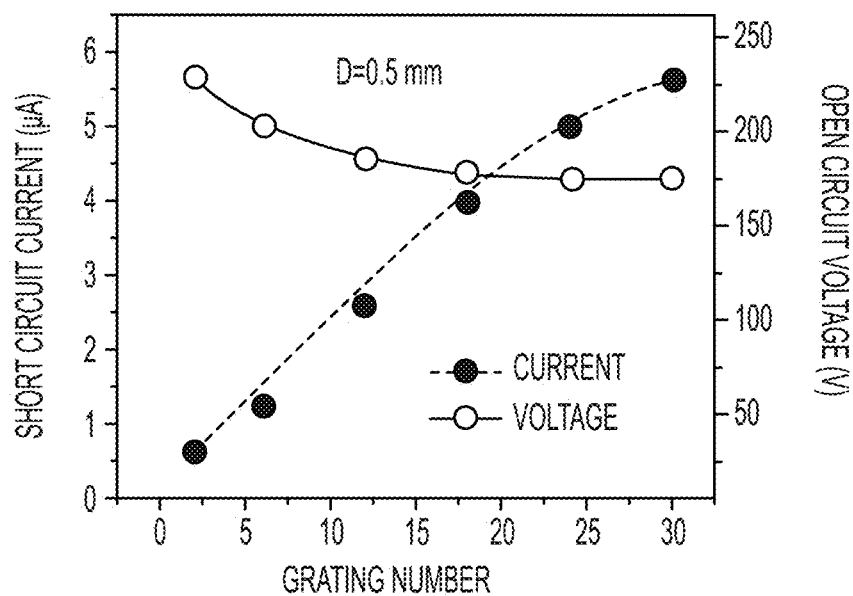
FIGS. 16A-F illustrate additional electrical output characteristics of the rolling friction enhanced free-standing triboelectric nanogenerator according to one aspect of the disclosed technology.
Figure 16B:
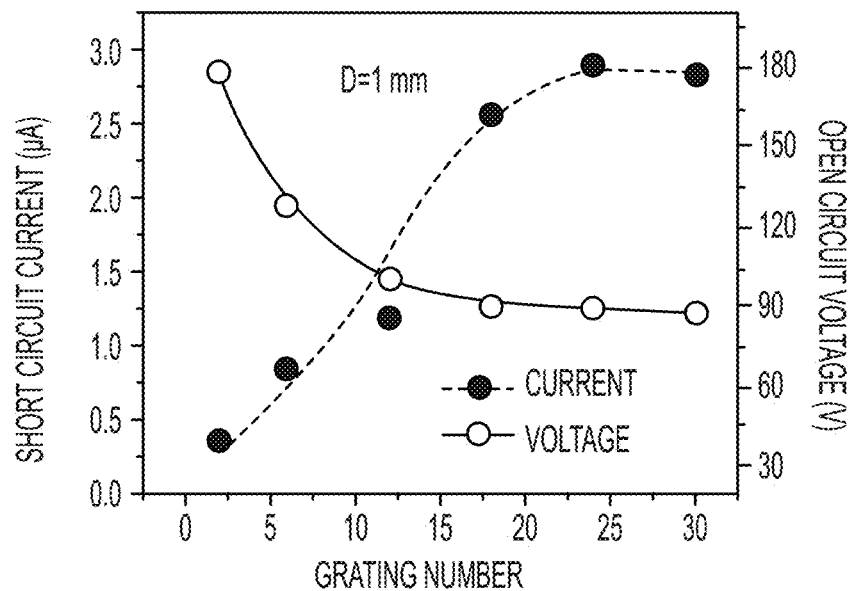
Figure 16C:
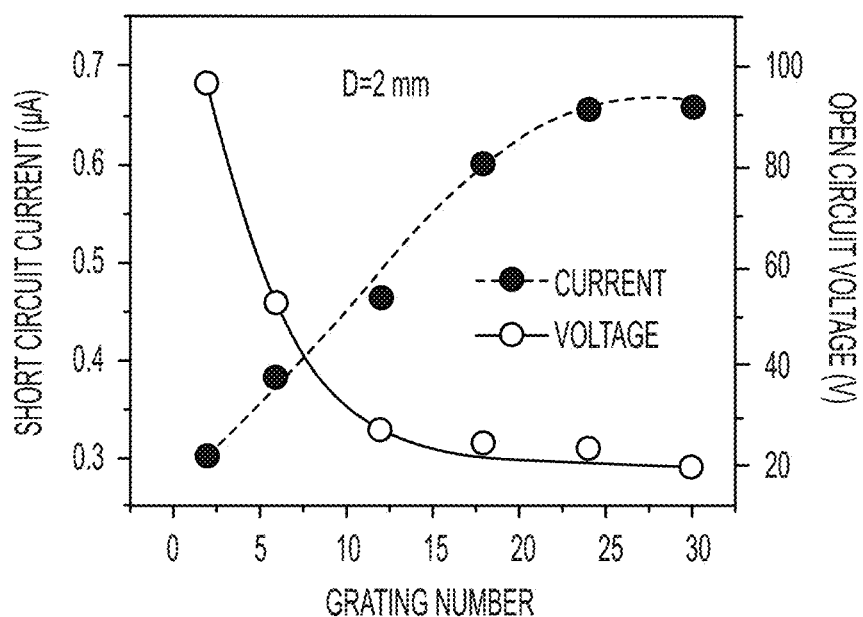
Figure 16D:
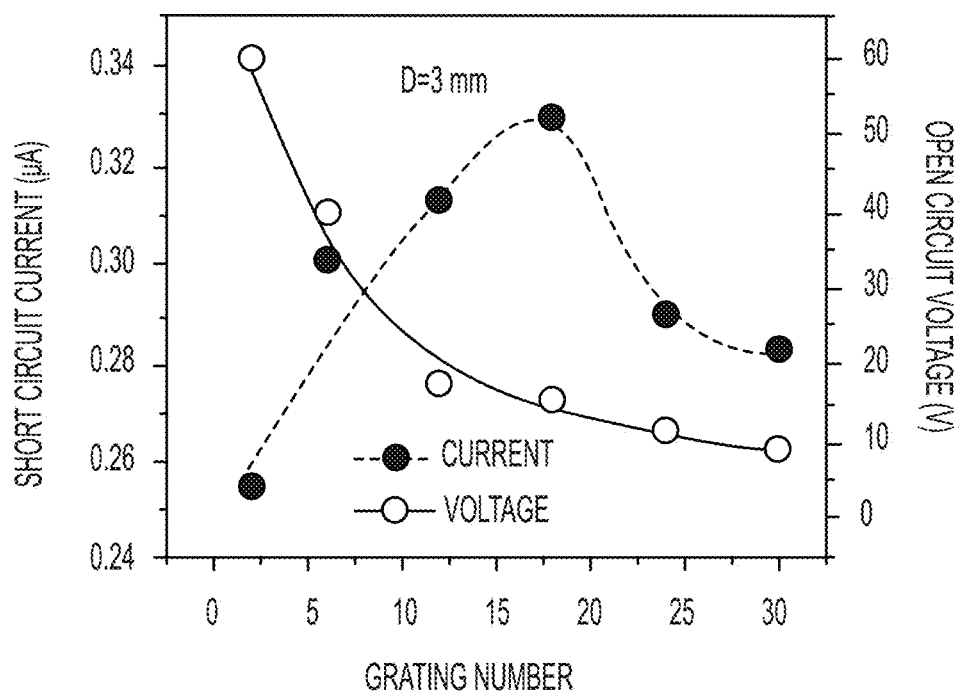
Figure 16E:
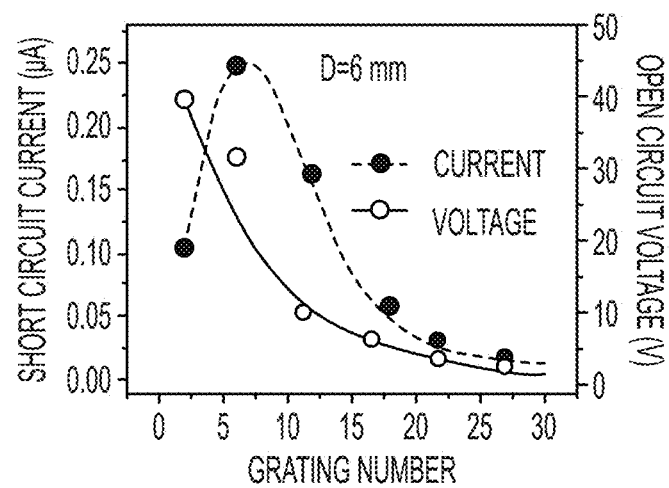

FIGS. 16A-F each illustrate how the number of gratings impacts short-circuit current and open-circuit voltage when the free standing gap between the rotator and the stator is set at a constant value. For example, FIG. 16A illustrates that, at a fixed free standing gap of 0.5 mm, an increase in the grating number may result in a minor degradation in the open circuit voltage and also result in a quasi-linear increase in the short circuit current. FIGS. 16B-E illustrate output performance characteristics when the free standing gap is at 1 mm, 2 mm, 3 mm and 6 mm, respectively.

FIGS. 17A-E provide output current and voltage data curves used for plotting FIGS. 16A-E. The output voltage measurements of the RF-TENG 700 may be taken by a voltage preamplifier, e.g., Keithley 6514 System Electrometer. The output current measurements of the RF-TENG 700 may be taken by a low-noise current preamplifier, e.g., Stanford Research SR560.

As clearly shown in FIGS. 16A-E and 17A-E, when the gap is below 2 mm, current amplitudes increase as the number of gratings increases. Once the gap exceeds 2 mm, for instance when the gap is greater than 3 mm, the current amplitudes first increase and then decline as the grating number increases. The maximum current amplitudes occur when the grating number is small and the gap is large. As also shown in these figures, at any given gap, the open-circuit voltage decreases as the grating number increases.

Figure 18A:
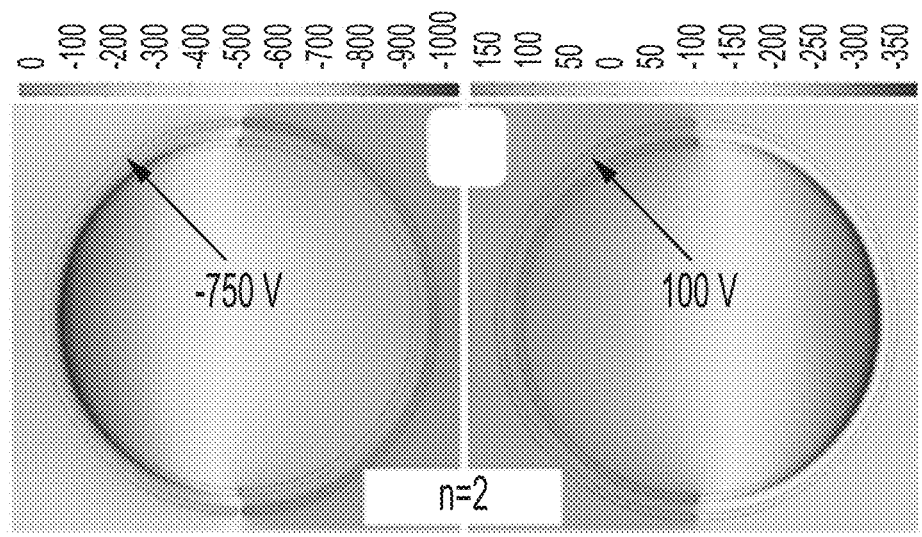
FIGS. 18A-F each illustrate a potential distribution of the rolling friction enhanced free-standing triboelectric nanogenerator with respect to a different grating number.
Figure 18B:
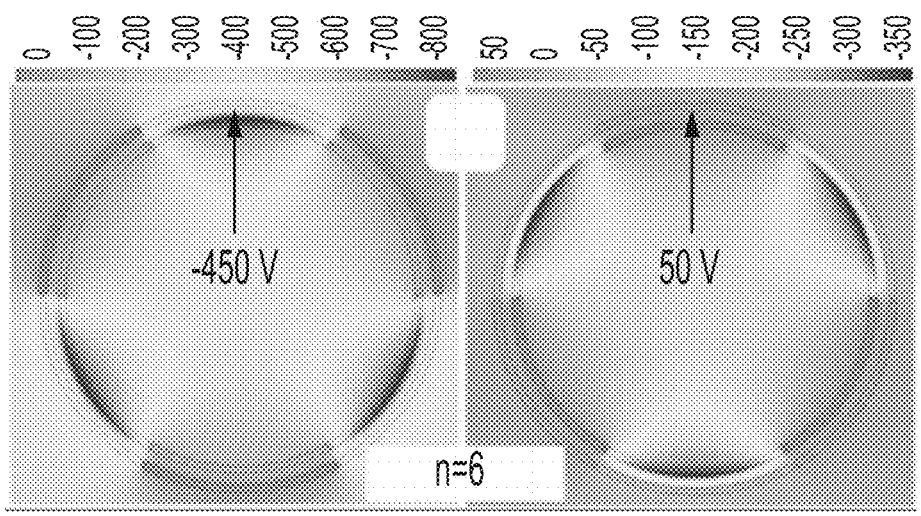
Figure 18C:
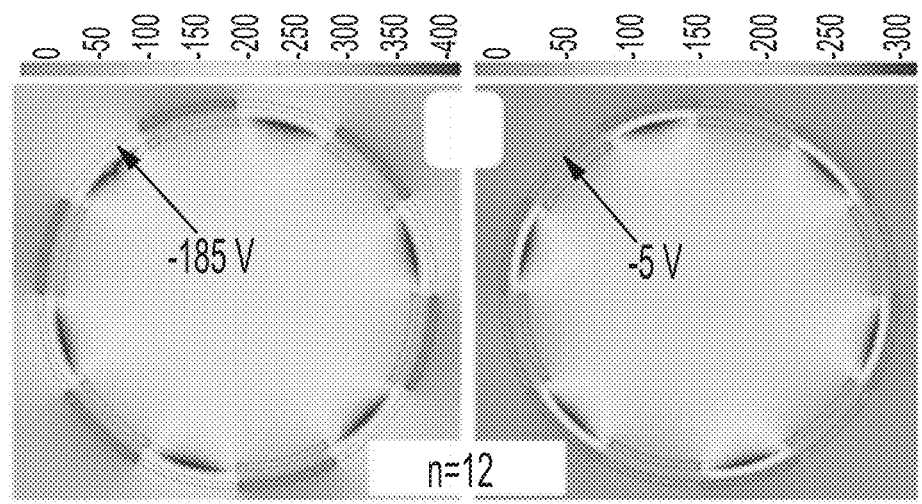
Figure 18D:
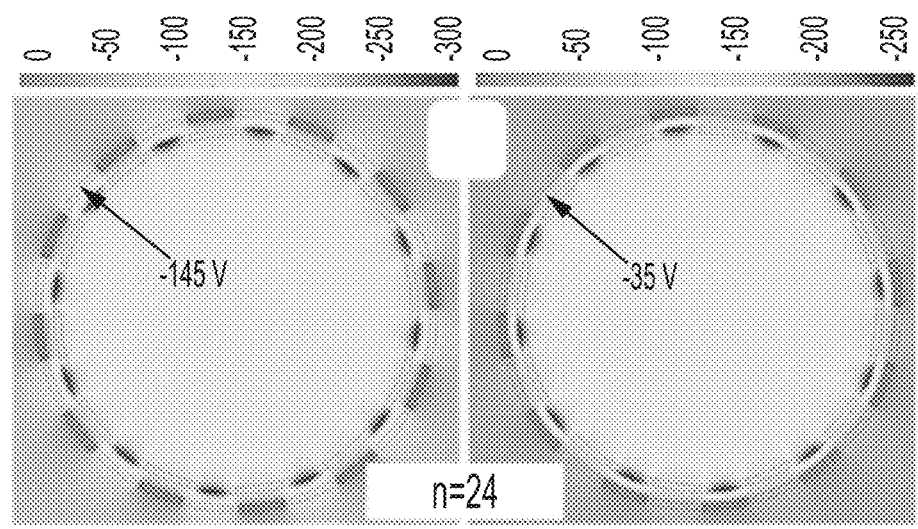
Figure 18E:
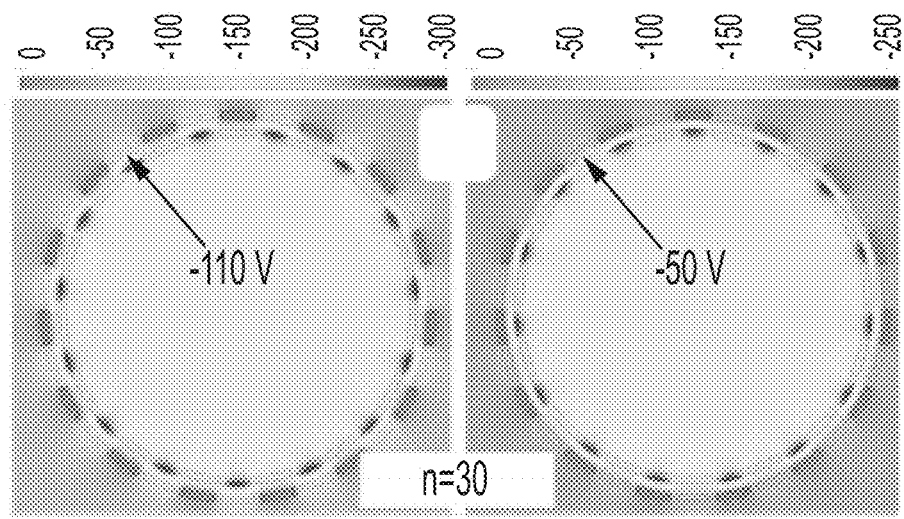
Figure 18F:
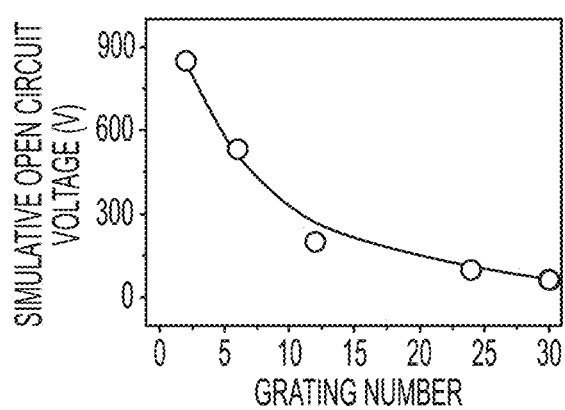
Figure 19A:
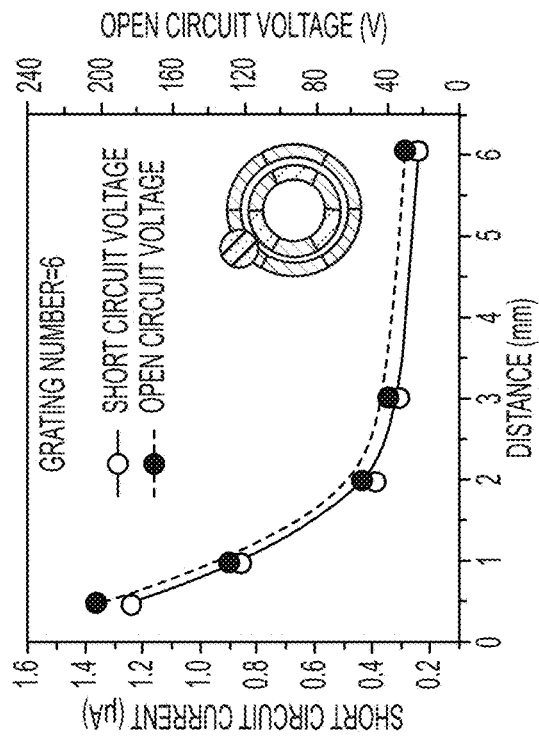
FIGS. 19A-F each illustrate changes in output performance characteristics of the rolling friction enhanced free-standing triboelectric nanogenerator as the distance between a rotator and a stator varies.
Figure 19B:
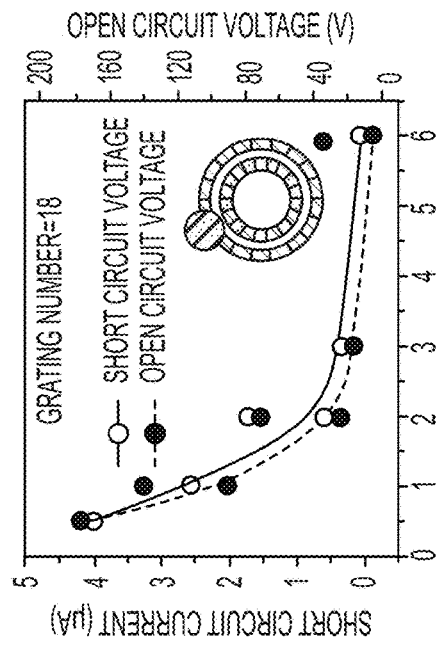
Figure 19C:
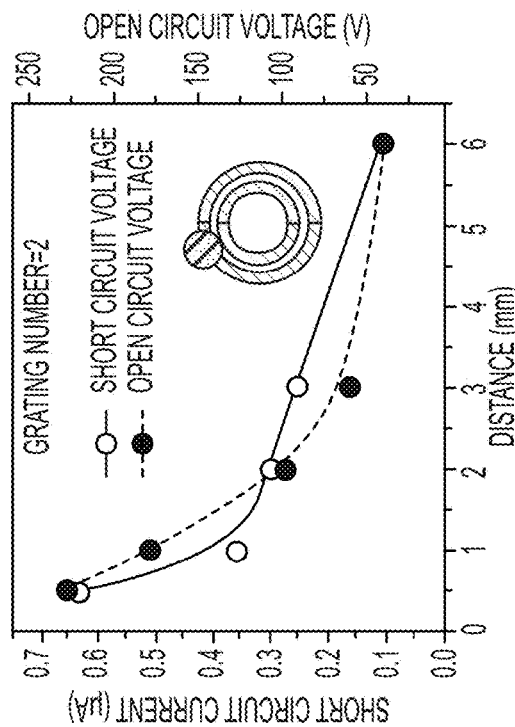
Figure 19D:
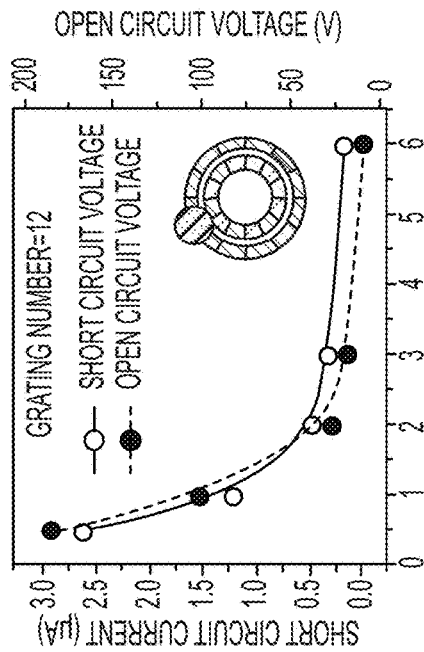
Figure 19F:
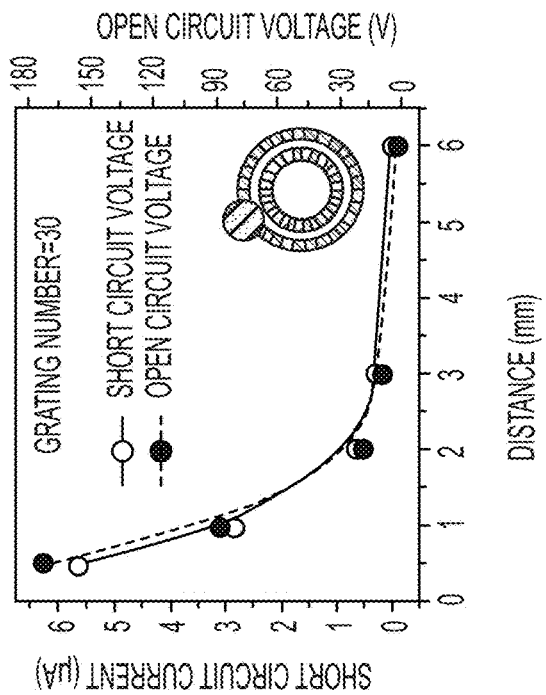
Figure 19E:
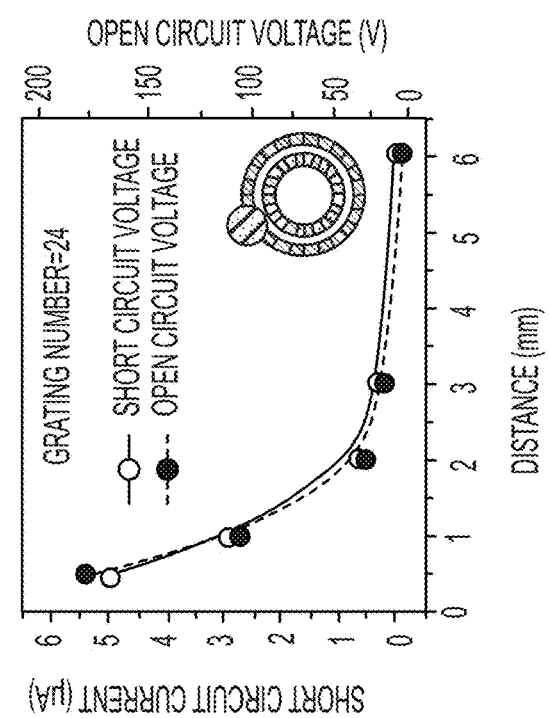

FIGS. 18A-F each illustrate open-circuit potential distributions of the RF-TENG 700 at different grating number configurations while the standing gap is at 1 mm. FIGS. 18A-E each illustrate two states in a half cycle when the grating number is set to 2, 6, 12, 24 and 30. FIG. 18F illustrates a plot developed based on FIGS. 18A-E. FIGS. 18A-F illustrate that the open-circuit voltage decreases as the grating number increases.

Figure 16F:
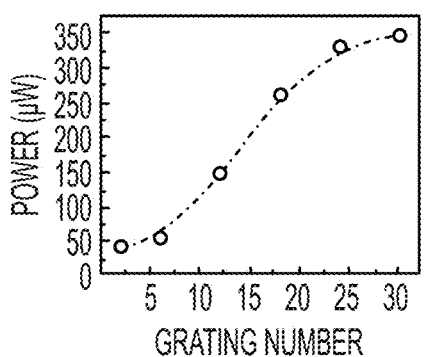

The grating number may also affect the output power of the RF-TENG 700. For example, as shown in FIG. 16F, at a fixed gap distance, e.g., 0.5 mm, the output power density significantly increases as the grating number increases.

3.5.2 Free Standing Gap

When the gap increases, the output voltage may decrease. FIGS. 19A-F illustrate how the free standing gap affects short-circuit current and open-circuit voltage of the RF-TENG 700, when the grating number is set to 2, 6, 12, 18, 24 and 30. As shown in these figures, both the current and the voltage significantly decrease as the free standing gap increases. FIGS. 19A-F respectively illustrate such effects.

The larger the gap, the weaker the electrostatic induction effect. The electrostatic field is strong when the gap distance between the charged surfaces and the electrodes is small. The potential becomes more neutralized as the gap increases.

Figure 20A:
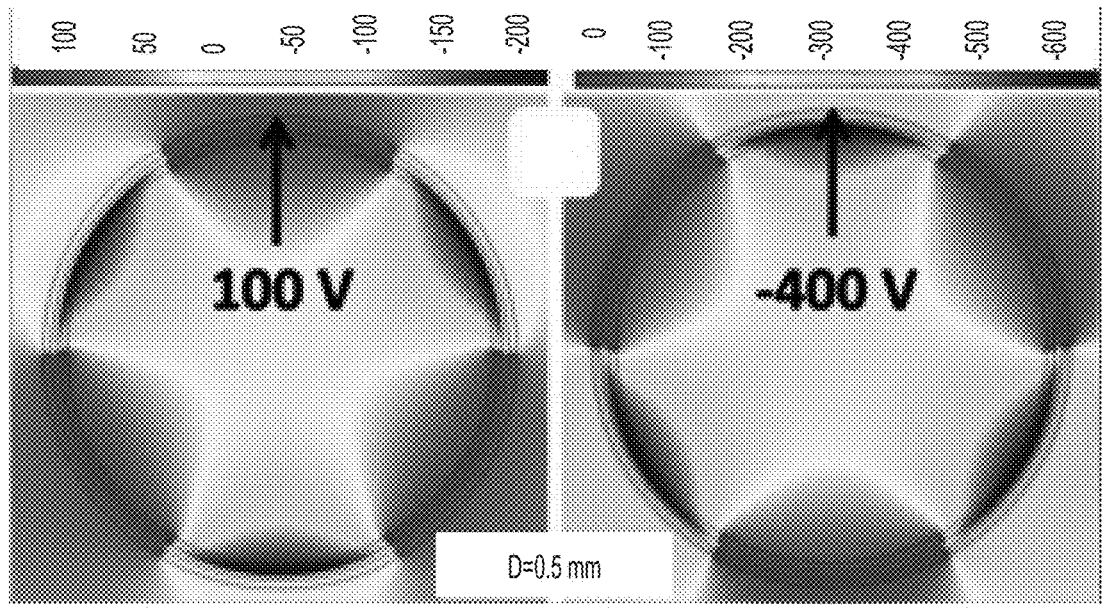
FIGS. 20A-F each illustrate simulated voltage outputs of the rolling friction enhanced free-standing triboelectric nanogenerator with respect to a different distance between the rotator and the stator.
Figure 20B:
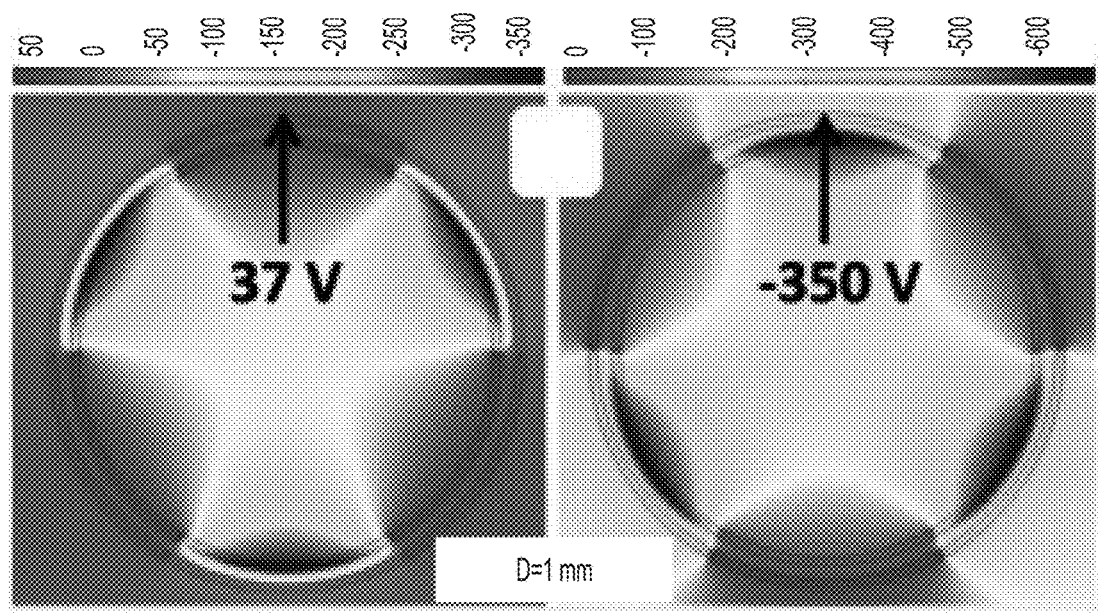
Figure 20C:
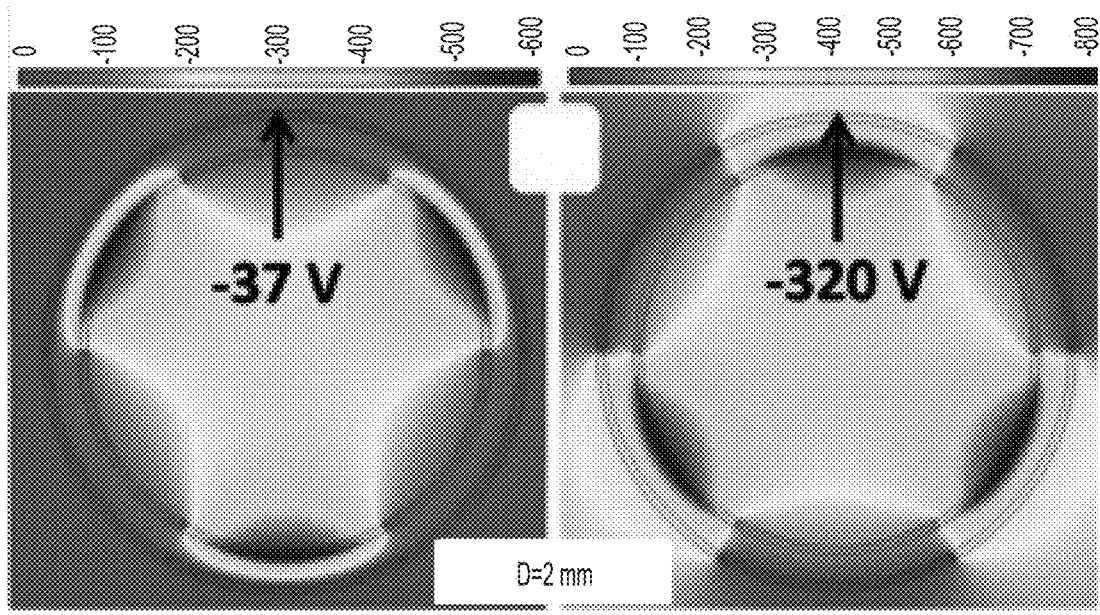
Figure 20D:
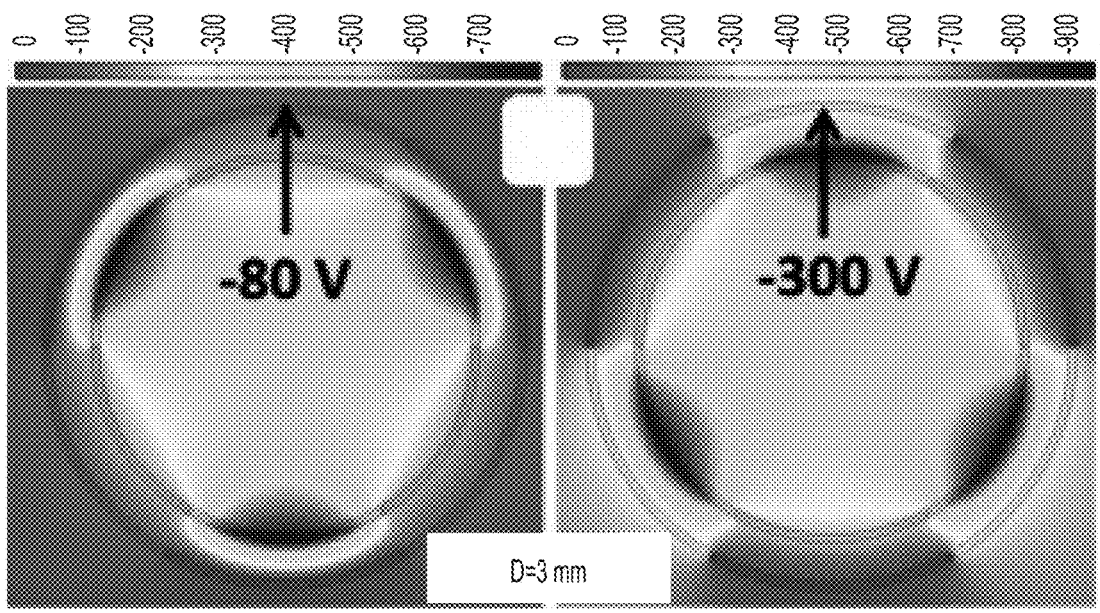
Figure 20E:
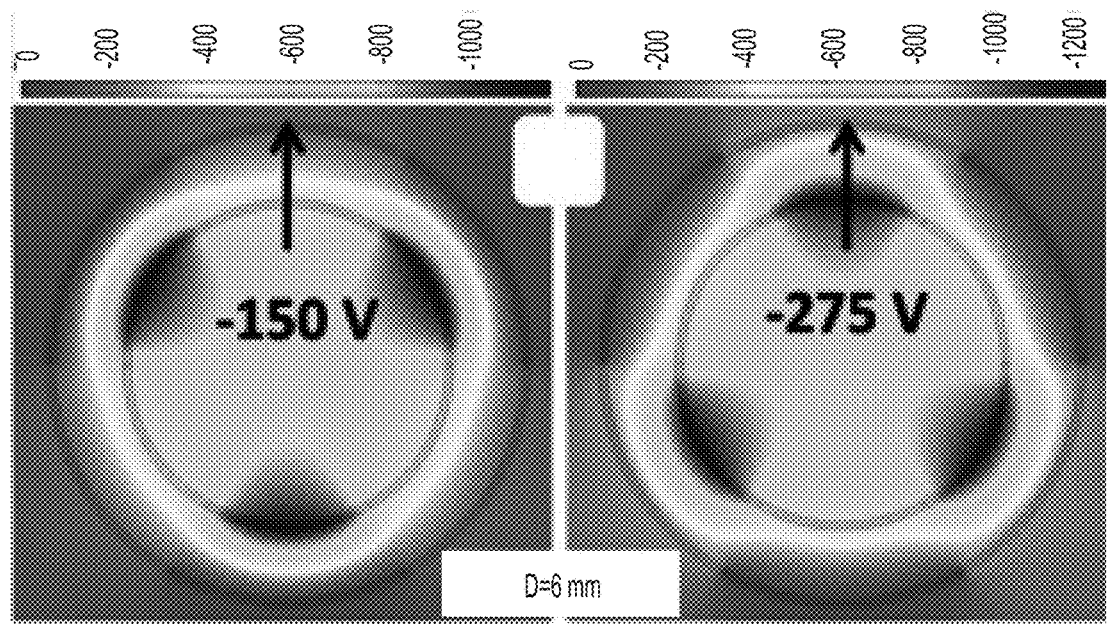
Figure 20F:
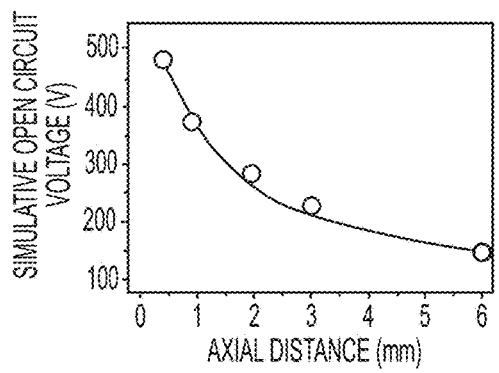
Figure 21A:
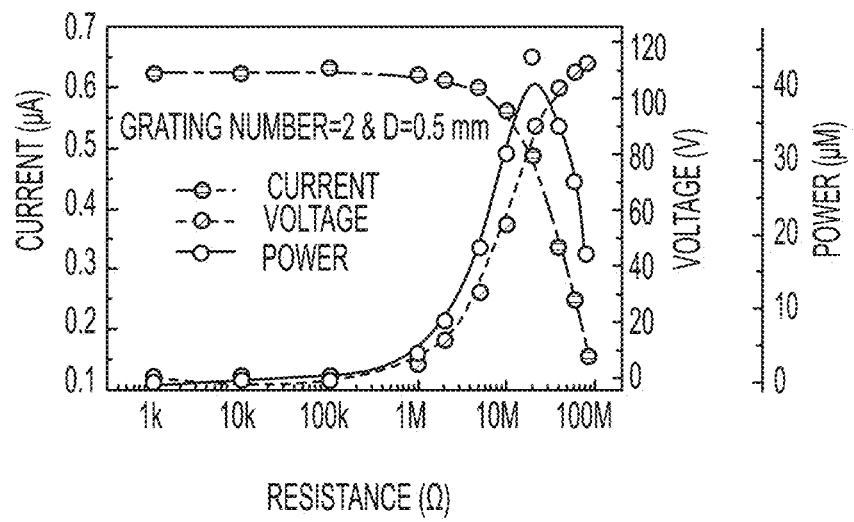
FIGS. 21A-F illustrate changes in output current, voltage and power of the rolling friction enhanced free-standing triboelectric nanogenerator as the external load resistance varies.
Figure 21B:
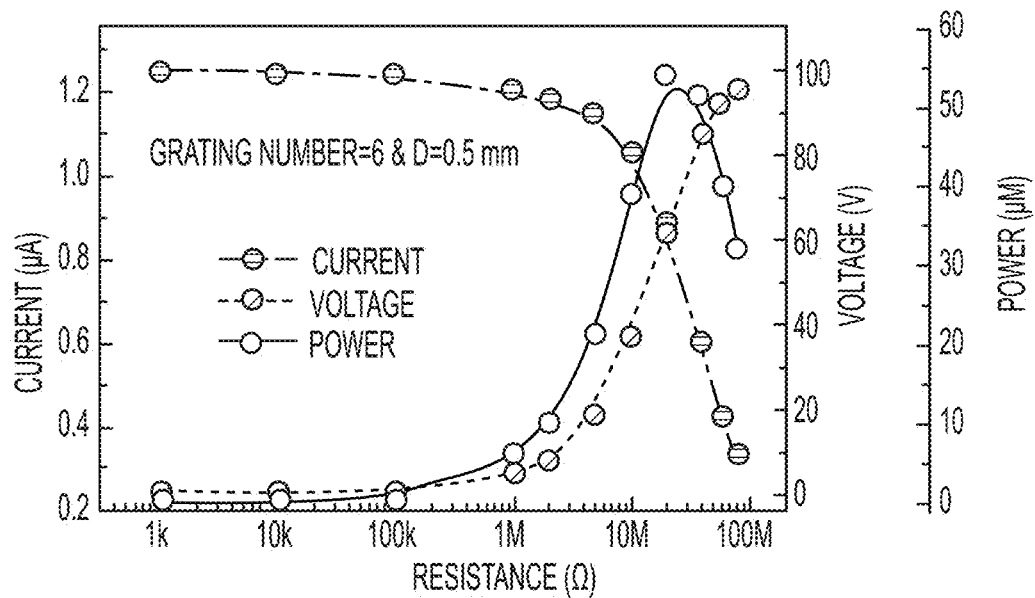
Figure 21C:
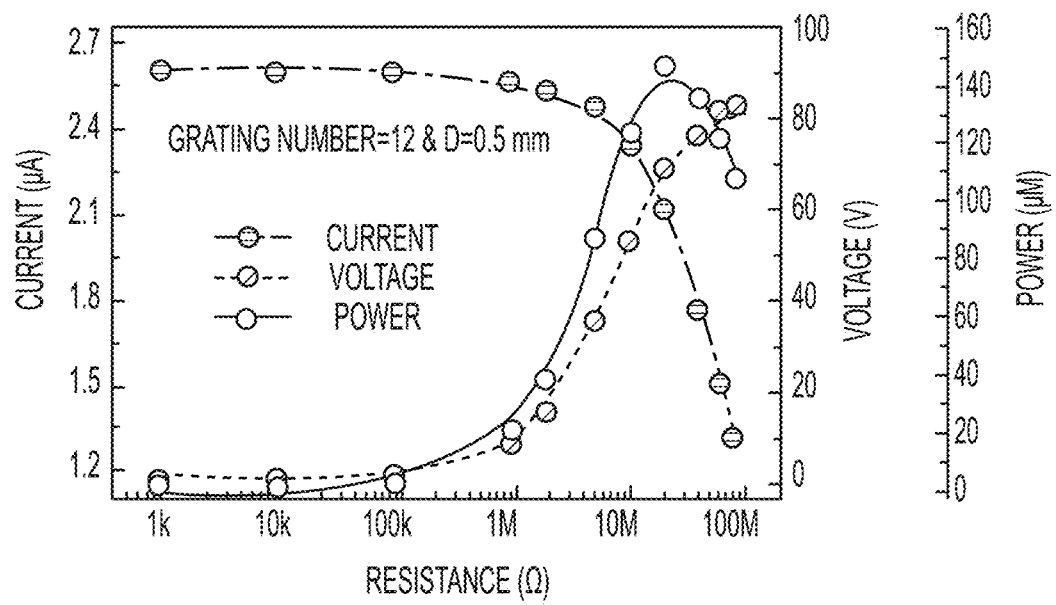
Figure 21D:
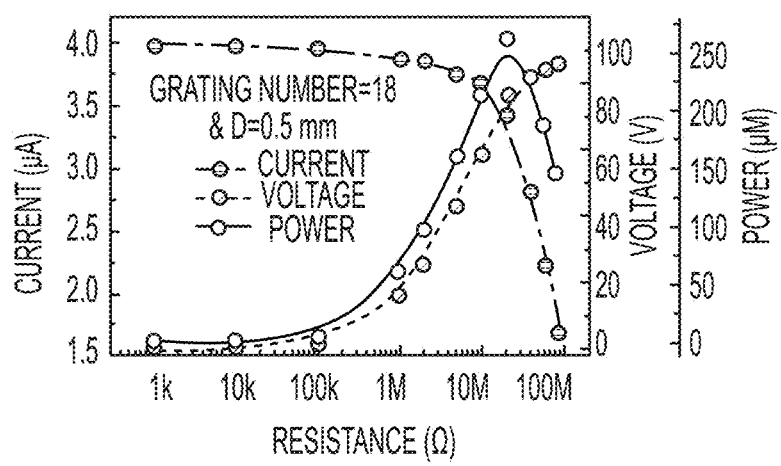
Figure 21E:
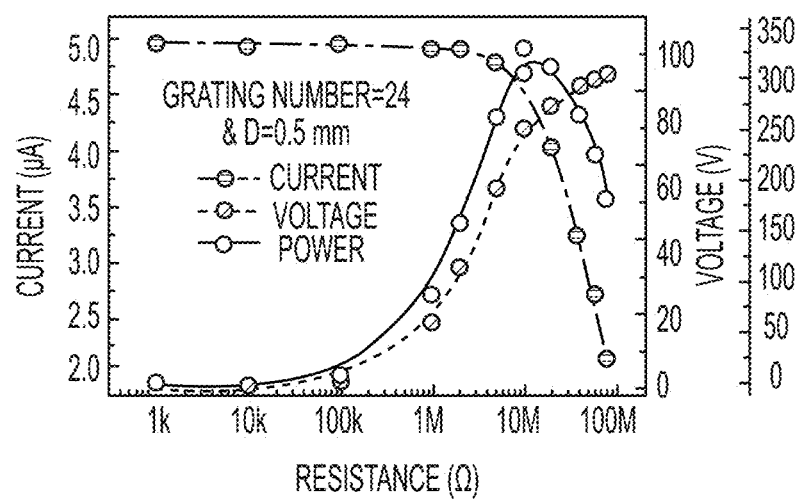
Figure 21F:
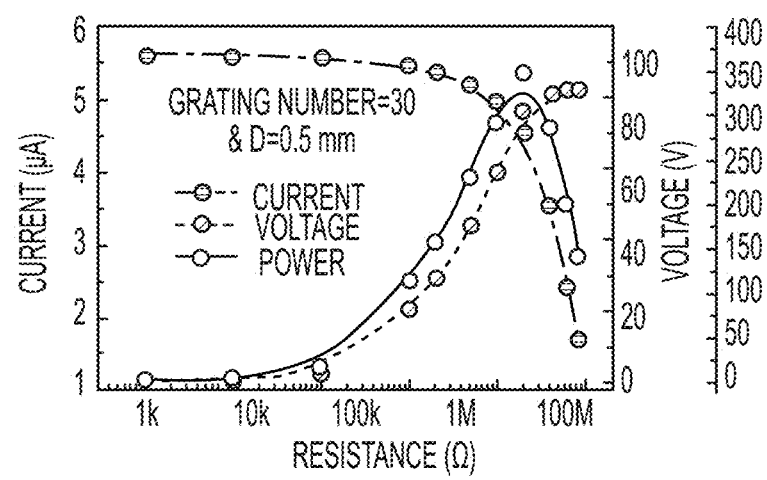

FIGS. 20A-F each illustrate open-circuit potential distributions of the RF-TENG 700 at various gap sizes when the grating number is fixed, e.g., when the grating number is 6. FIGS. 20A-E each illustrate two states in a half cycle when the gap is set to 0.5 mm, 1 mm, 2 mm, 3 mm and 6 mm. FIG. 20F illustrates a plot developed based on FIGS. 20A-E. FIGS. 20A-F illustrate that the open-circuit potential difference decreases as the gap increases. These figures also show that the open-circuit voltage increases as the free-standing gap distance decreases.

3.5.3 External Load Resistance

FIGS. 21A-F also illustrate how the external load resistance impacts output current, voltage and power of the RF-TENG 700 when the free standing gap stays the same, e.g., at 0.5 mm. FIGS. 21A-F illustrate such impacts when the grating number is at 2, 6, 12, 18, 24 and 30, respectively.

3.5.4 Rolling Rod

Figure 22A:
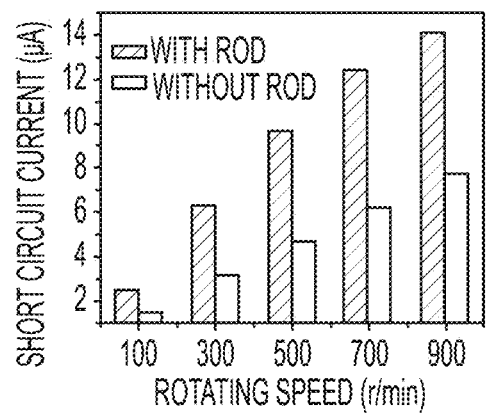
FIGS. 22A-B illustrate output characteristics of the rolling friction enhanced free-standing triboelectric nanogenerator with and without a rod.
Figure 22B:
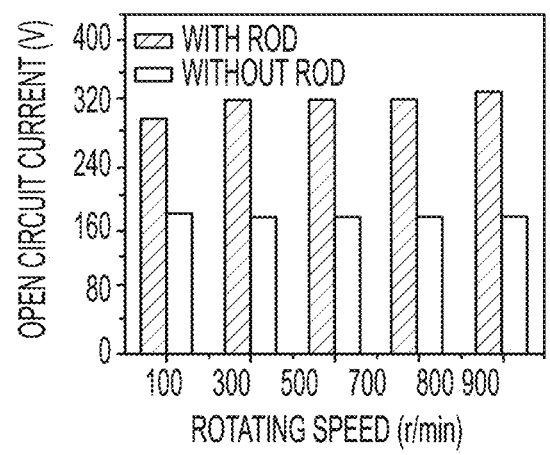

Charge replenishment induced by a rod rolling friction is the reason for an enhanced electric output by the RF-TENG 700. FIGS. 22A-B illustrate both open-circuit voltage and short-circuit current measurements with and without the rod when tested at various rotational speeds, from 100 to 900 r/min. Data are from a test performed on an RF-TENG with the following attributes: a rotator diameter of 2.54 cm, a rotator length of 10 cm, and a free standing gap of 0.5 mm. As shown in FIGS. 22A and 22B, each of the open-circuit voltage and the short-circuit current doubles when the rod is present or when there is charge replenishment induced by rolling friction.

Figure 22C:
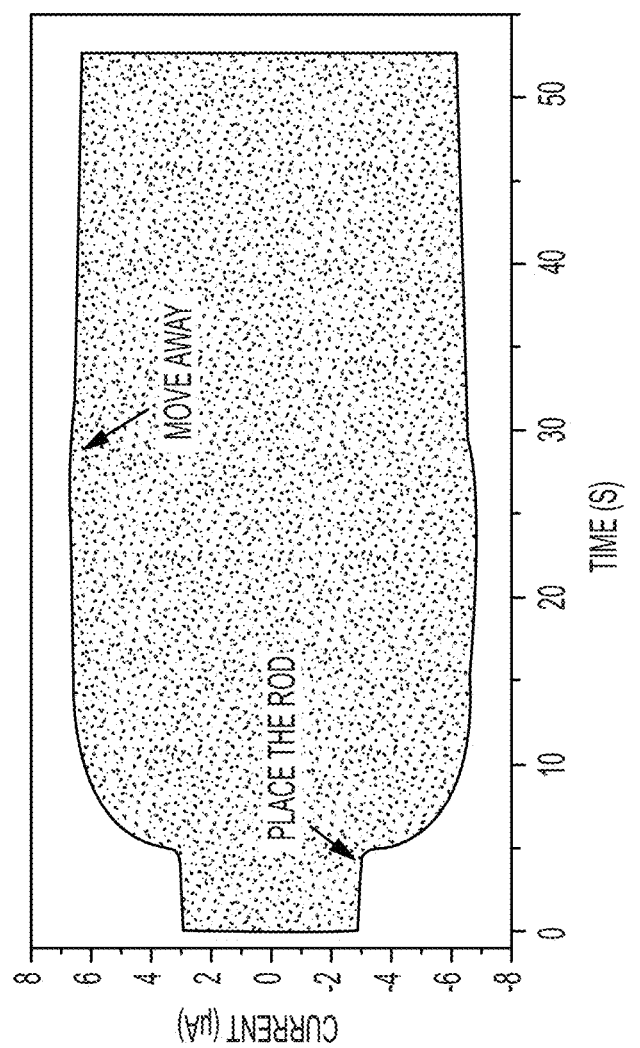
FIG. 22C illustrates changes in the short-circuit current of the rolling friction enhanced free-standing triboelectric nanogenerator based on the disposition of the rod.

Without the rolling rod 706, the triboelectric charges on the FEP surface may decay significantly. FIG. 22C illustrates a dynamic change of the short-circuit current output by the RF-TENG 700 as the aluminum rod 706 moves away.

When the aluminum rod 706 is present, the RF-TENG 700 generates high output performance. Once the aluminum rod 706 is removed, the electric output performance drops. Charge may degrade in ambient environment. Using the RF-TENG 700, the continuous charge replenishment induced by the rolling rod 706 may enable an electricallypowered device free from the environmental influence, yielding a consistent and constant electric output. As such, the RF-TENG 700 provides a sustainable practical power source.

3.6 Reliability

Figure 23A:
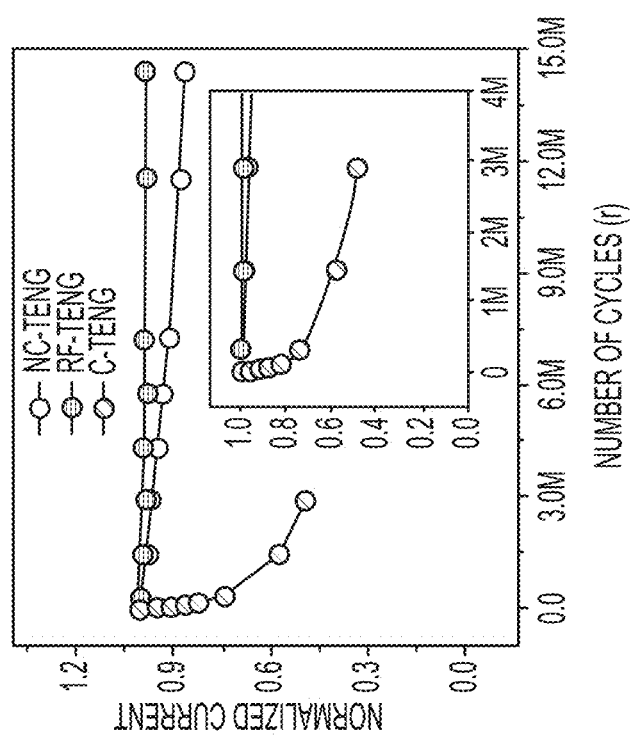
FIG. 23A illustrates robustness test results of various types of triboelectric nano generators.

The RF-TENG 700 provides an ultra-robust and high-performance solution for rotational kinetic energy harvesting. The RF-TENG 700 has superior reliability. For example, the RF-TENG 700 has a stable output. FIG. 23A illustrates a comparison of current output measurements obtained from RF-TENG, free-standing mode based TENG, and in-plane sliding mode based TENG. As shown in FIG. 23A, the RF-TENG has the best mechanical robustness, as its output current shows a minor fluctuation of less than 0.2% after 14.4 million cycles of rotation, which is significantly lower than that of other TENGs. For example, the output of the free-standing mode TENG decreases by about 15%. The output of the in-plane sliding TENG drops more in magnitude and at a much faster speed—drop to 45% only after 2.8 million cycles of rotation.

Figure 23B:
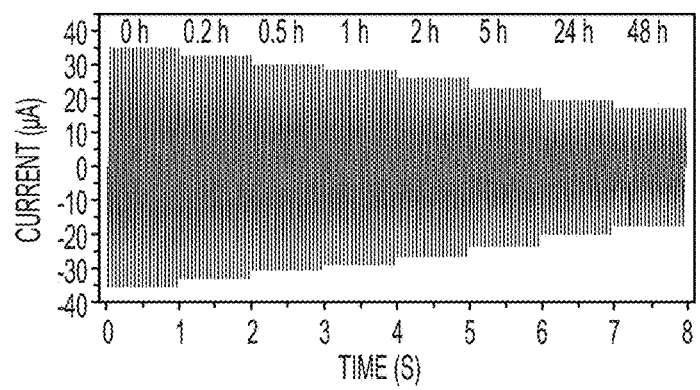
FIGS. 23B-D provide output stability test results of various types of triboelectric nano generators.
Figure 23C:
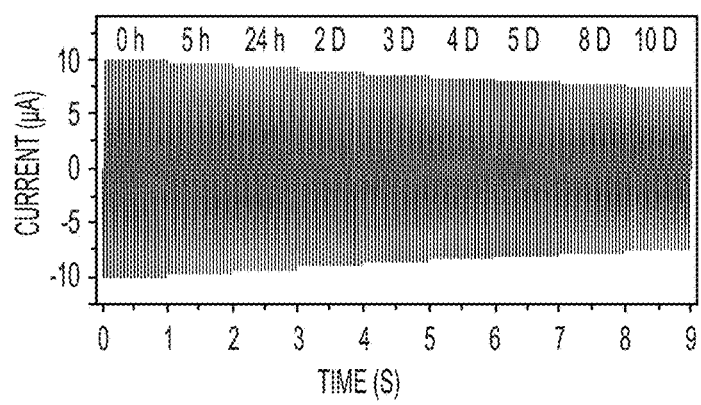
Figure 23D:
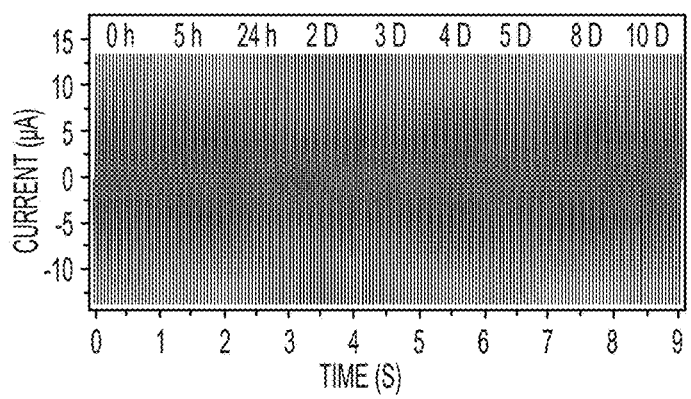

FIGS. 23B-D provide more detailed current output data used for generating the plots of FIG. 23A. FIGS. 23B-D respectively illustrate the output stability test results for the in-plane sliding TENG, the free-standing mode TENG, and the RF-TENG 700. FIG. 23B illustrates that the output of the in-plane sliding TENG drops to 45% only after 2.8 million cycles of rotation. FIG. 23C illustrates that the output of the free-standing mode TENG decreases by about 15% after 14.4 million cycles of rotation. FIG. 23D illustrates that the output of the RF-TENG has only a minor fluctuation of less than ±0.2% after 14.4 million cycles of rotation. Both the voltage and current outputs of the RF-TENG 700 may remain constant throughout a 10-day period of continuous rotations at a rotational speed of 1000 r/min.

In addition, the RF-TENG 700 also has strong mechanical durability. The rolling friction can effectively avoid sliding friction between the rod 706 and the FEP surface 716, thus protecting the FEP surface from abrasion. FIG. 23E illustrates how rolling friction and sliding friction respectively transform an FEP surface with metal gratings after 120000 cycles of rotation. The top row in FIG. 23E illustrates how the rolling friction affects the FEP surface with metal gratings, whereas the bottom row illustrates how the sliding friction affects the FEP surface with metal gratings. As shown in FIG. 23E, the metal gratings of the RF-TENG 700 stay almost intact while those of the in-plane sliding mode TENG deteriorate significantly.

Due to its robustness, the RF-TENG 700 provides an enduring charge density on its FEP surface, thus yielding a long-lasting and constant output power.

3.7 Application

Figure 24A:
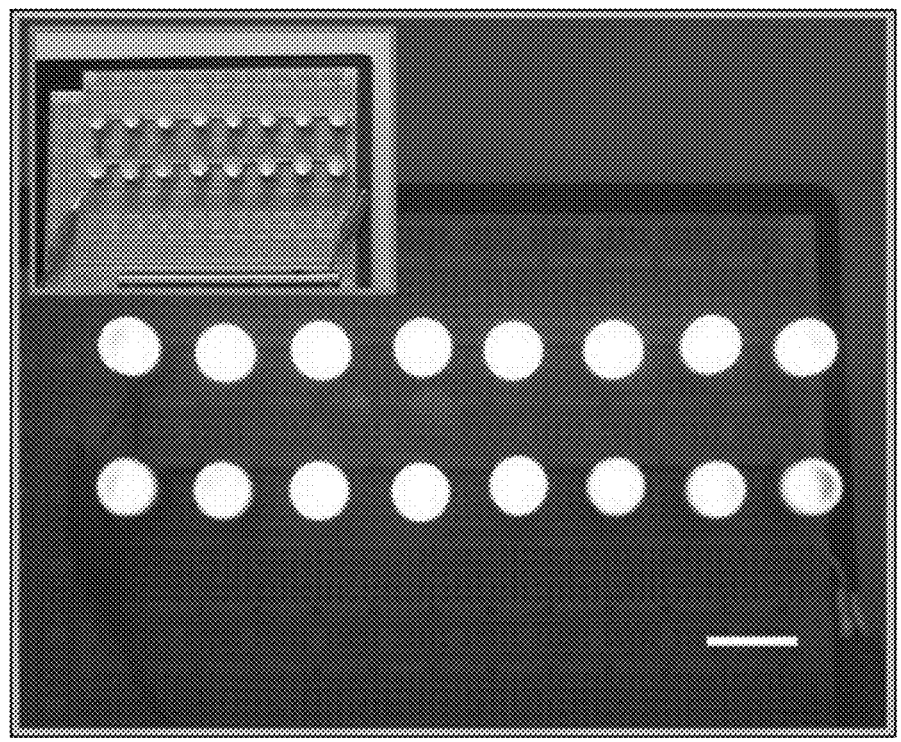
FIG. 24A illustrates powering a plurality of spot lights using the rolling friction enhanced free-standing triboelectric nanogenerator according to one aspect of the disclosed technology.
Figure 24B:
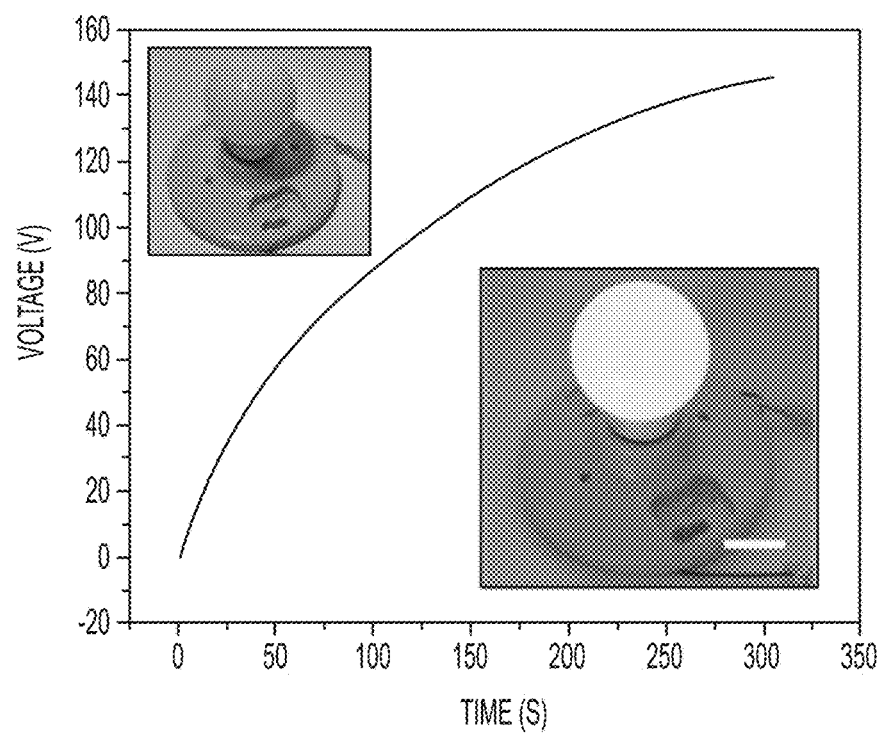
FIG. 24B illustrates charging a commercial capacitor and powering a globe light using the rolling friction enhanced free-standing triboelectric nanogenerator according to one aspect of the disclosed technology.

As shown in FIG. 24A, the RF-TENG 700 may simultaneously power sixteen spot lights in a parallel connection in complete darkness at a rotational speed of 1500 r/min. In another example with reference to FIG. 24B, the RF-TENG 700 may charge a 200 μF commercial capacitor to 120 V in 170 s. As also shown in FIG. 24B, the RF-TENG 700 may power a G16 globe light.

4. Single-Layer Triboelectric Nanogenerator with Interdigitated Electrodes

Another aspect of the disclosed technology relates to a triboelectric nanogenerator (TENG) for harvesting hydropower. The TENG may have a single layer or multiple layers.

4.1 Structure

Figure 25A:
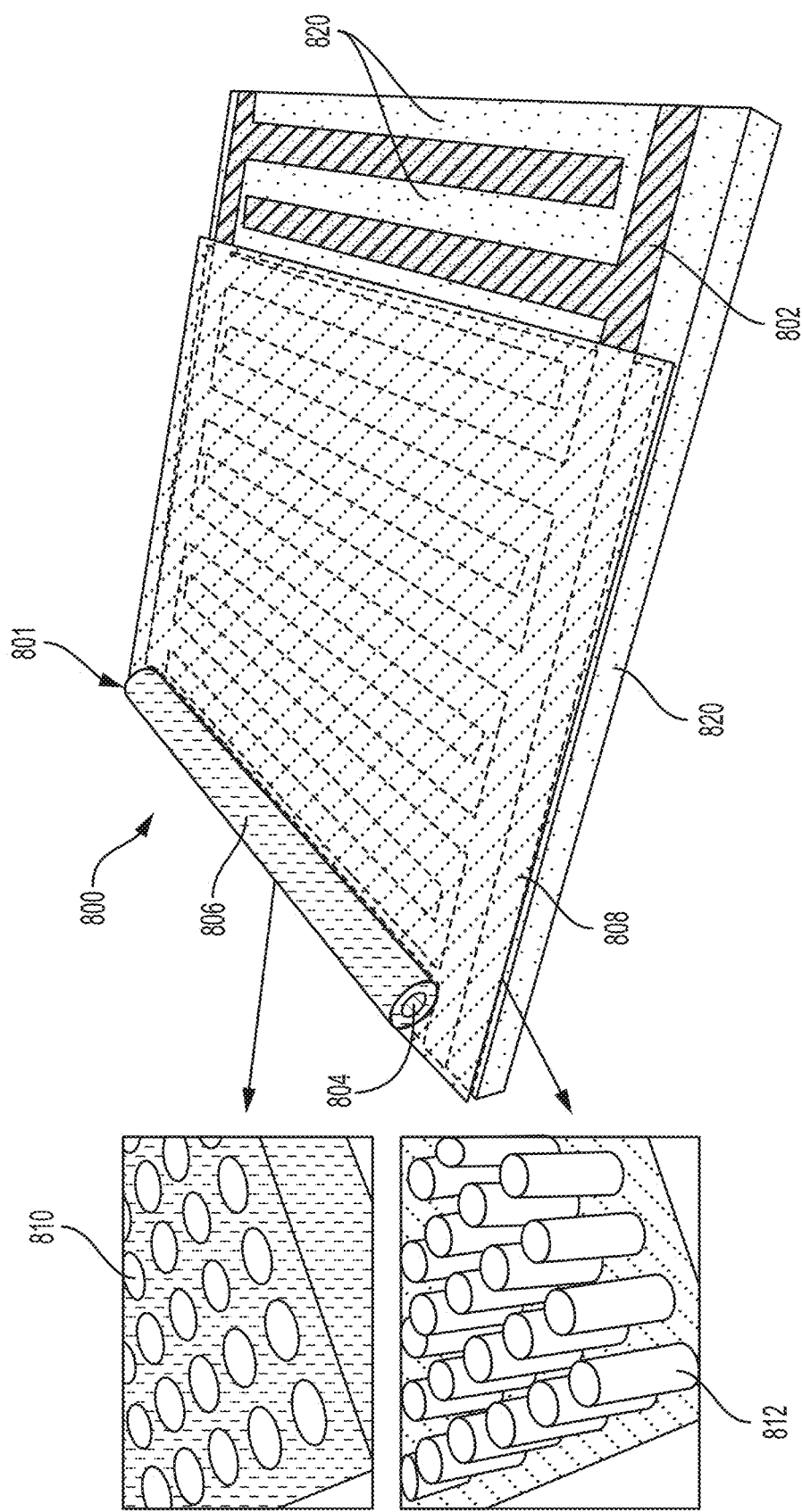
FIG. 25A provides a schematic diagram of a single-layered triboelectric nanogenerator with interdigitated electrodes according to one aspect of the disclosed technology.
Figure 25B:
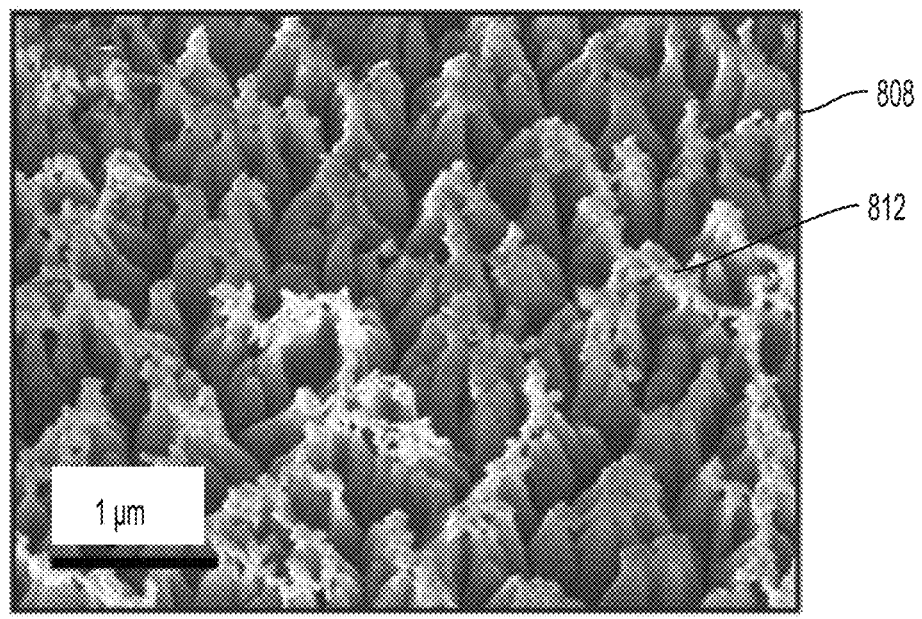
FIG. 25B illustrates a polytetrafluoroethylene (PTFE) surface of the triboelectric nanogenerator of FIG. 25A according to one aspect of the disclosed technology
Figure 25C:
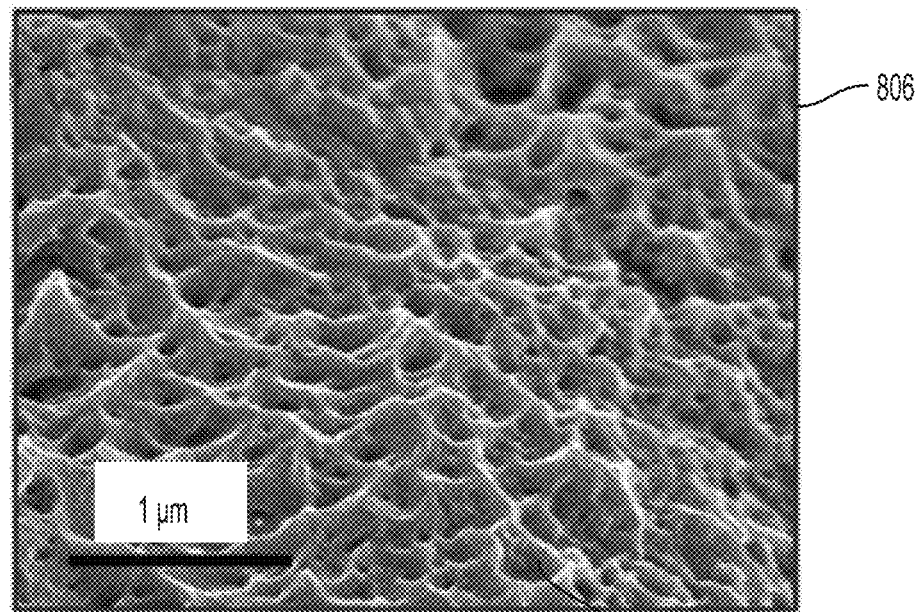
FIG. 25C illustrates a polyurethane (PU) surface of the triboelectric nanogenerator of FIG. 25A according to one aspect of the disclosed technology.
Figure 25D:
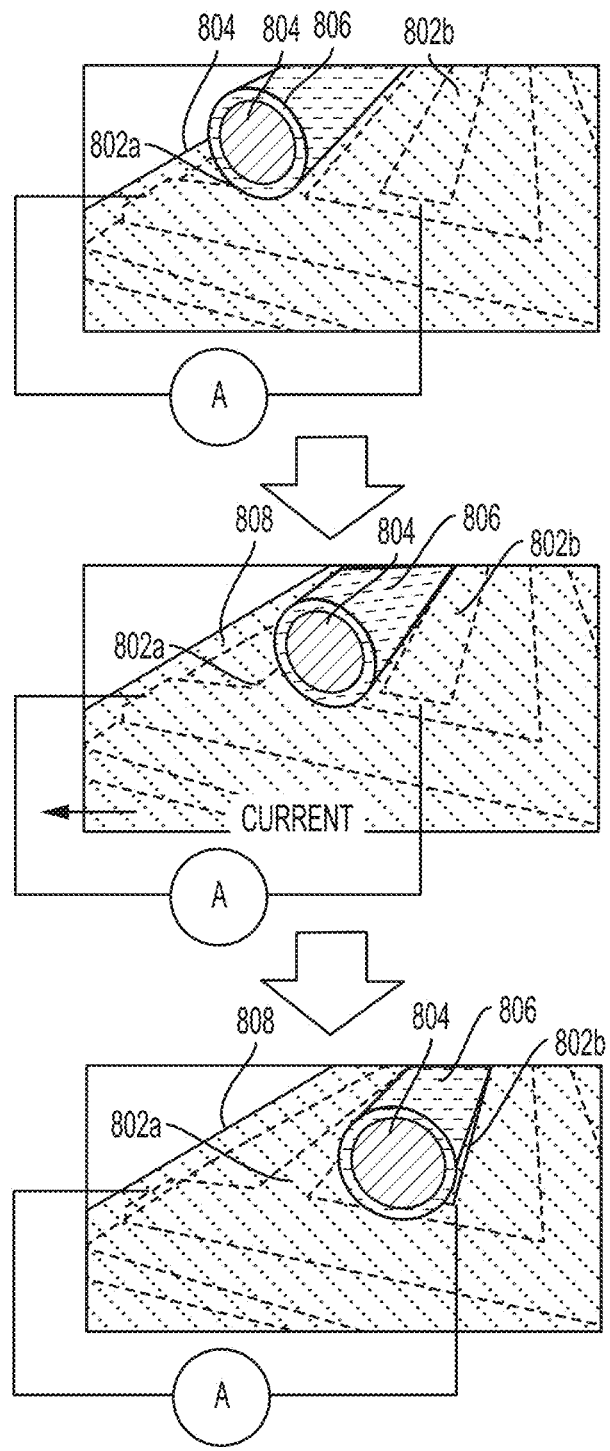
FIG. 25D illustrates effects of rolling a rod of the triboelectric nanogenerator of FIG. 25A according to one aspect of the disclosed technology.

FIG. 25A illustrates a schematic diagram of a single-layer TENG 800. The TENG 800 may include a first member 808, and a second member 801 in contact with the first member 808 to generate triboelectric charges. The first member 808 may define a substantially planar configuration. The second member 801 may exhibit a substantially cylindrical configuration. At least one of the first and second members may include nanostructures thereon. The first member 808 may include a first triboelectric material. The second member 801 may include a second triboelectric material 806 surrounding a material 804 exhibiting a cylindrical configuration. The second member 801 may roll against the first member 808 to generate a flow of electrons between two electrodes 802a and 802b as shown in FIG. 25D. The electrodes 802a-b may be adjacent to the first member 808. The electrodes 802a-b may be interdigitated electrodes. The second member 801 may generate the flow of electrons between the two electrodes 802a-b when the second member 801 rolls from a first position aligned with the electrode 802a to a position aligned with the other electrode 802b.

In some embodiments, the TENG 800 may include a plurality pairs of interdigitated electrodes. The second member 801 may generate a flow of electrons between each pair of interdigitated electrodes as it rolls against the first member 808.

The TENG 800 may include a supporting member 820 supporting the two electrodes 802a-b.

The first triboelectric material and the second triboelectric material may have different triboelectric characteristics. For example, they may have different triboelectric series ratings. For instance, the first triboelectric material may have a relatively less negative triboelectric series rating, or with a propensity to gain electrons upon contact. Examples of suitable first triboelectric materials may include, but not limited to, anyone or a combination of the following materials: PET, PMMA, PDMS, PTFE, FEP, PVC, polyimide, metal and alloy, among many other possibilities. The second triboelectric material may have a relatively more negative triboelectric series rating, or with a propensity to lose electrons upon contact. Examples of suitable second triboelectric materials may include, but not limited to, anyone or a combination of the following materials: PU, poly-oxydiphenylene-pyromellitimide, PDMS, conductive polymer, metal such as copper, aluminum and gold, and alloy such as steel, among many other possibilities.

The material 804 having the cylindrical configuration may be different from the second triboelectric material. The material 804 may include anyone or a combination of the following: metal such as copper, gold, silver and aluminum, ITO and conductive polymer, among many other possibilities.

The electrodes 802a-b may include, but not limited to, anyone or a combination of the following materials: metal such as copper, gold, silver and aluminum, ITO and conductive polymer, among many other possibilities.

The supporting member 820 may include a substrate material. Examples of suitable substrate materials for may include, but not limited to, anyone or a combination of the following materials: polyimide, PET, PMMA, poly(4,4'-oxydiphenylene-pyromellitimide) and SiO2, among many other possibilities.

In one embodiment, the TENG 800 may include interdigitated electrodes 802 to generate multiple pulses of electric outputs under water wave or water drop impact. The second material 806 may be a PU coating 806. The material 804 may be a copper rod 804. The copper rod 804 may be covered by the PU coating 806. In one embodiment, the diameter of the copper rod 804 may be about 0.5 cm.

The first member 808 may be a PTFE film 808 lying on top of the interdigitated electrodes 802. The rod 804 may roll back and forth on top of and form a contact with the PTFE film 808. The PTFE film 808 and the PU coating 806 respectively have a relatively high negative charge affinity and a relatively high positive charge affinity.

In one embodiment, the PU coating 806 may define a plurality of pores 810 on its surface. The PTFE film 808 may include a plurality of nanowires 812. The pores 810 and nanowires 812 may provide an increased contact area between the PU coating 806 and the PTFE film 808 so as to generate more triboelectric charges on their surfaces, which, in turn, increases the electric output of the TENG 800. The pores 810 and the nanowires 812 may also allow an efficient separation between the PU coating 806 and the PTFE film 808. FIGS. 25B-C provide SEM images respectively illustrating the nanowires 812 formed on the PTFE film 808 and the pore 810 formed on the PU coating 806.

4.2 Fabrication and Assembly

According to one aspect of the disclosed technology, the nanostructures on the PTFE film 808 and the PU coating 806 may be fabricated as follows. In one embodiment, the nanowire arrays 812 on the PTFE film surface 808 is synthesized by using an ordered anodic aluminum oxide (AAO) foil as a template and using a PTFE solution as a precursor.

The AAO template may be prepared by anodizing an Al foil through a two-step anodization approach. At the first anodization step, the high-purity aluminum foil (99.99%) is cleaned, degreased, and annealed at 500° C. for 3 hours. The foil is anodized in an oxalic acid solution (0.3 M) under a constant voltage 40 V for 40 hours. The aluminum foil may be electropolished in a perchloric acid solution (2.0 M in ethanol) at 4° C. for 2 min. The anodization layer is removed through a wet chemical etching process using a solution containing phosphorus acid (0.9M) and chromium (VI) oxide (0.2 M).

Subsequently, a second anodization is carried out under the same condition as the first anodizaion step for 1 hour.

Afterwards, the AAO template is immersed into another phosphoric acid solution to widen the pores. In a typical process, a commercial PTFE solution or precursor is directly poured into the AAO template. A vacuum process, e.g., a facile vacuum system, is used to remove the air remaining inside the nanoholes. After curing at ambient temperature for one day, the solvent evaporates, and a PTFE film with nanowire arrays takes form as shown in FIG. 25B. Finally, the PTFE film is peeled off from the AAO template using a double-sided tape and attached to a PMMA substrate 820 as shown in FIG. 25A, which is deposited with copper interdigitated electrodes 802. In one embodiment, the PMMA substrate 820 may have a size of 7.5 cm×7.5 cm.

In one embodiment, the PU material 806 may be designed to have porous structures. The surface of a commercial PU 806 may be etched by using a diluted sulfuric acid solution, e.g., 3.0M for 2 min, and then cleaned with water. Once pores are formed as illustrated in FIG. 25C, the PU 806 is applied onto the copper rod 804. The rod may have a diameter about 0.5 cm.

The interdigitated electrodes 802 may be fabricated according to the following process. First, a PMMA mask is curved by a laser cutter. Then, the mask is attached onto another PMMA substrate for deposition of aluminum interdigitated electrodes 802. Aluminum may have a thickness about 100 nm. The aluminum deposition is performed by an RF magnetron sputtering system. The dimension of the PMMA substrate may be about 3 inch×3 inch. The width of each aluminum electrode 802 depends on the number of total interdigitated electrodes. For example, for a TENG 800 with 9 pairs of interdigitated electrodes, the width of each aluminum electrode 802 may be about 0.2 cm. Two conducting wires may be connected to the interdigitated electrodes 802 as leads for subsequent electric measurements. The prepared PTFE film 808 is peeled off from the AAO template by using a double-sided tape and directly bonded to the top of interdigitated electrodes 802.

4.3 Operating Principle

The operation of the TENG 800 is based on a coupling effect of triboelectrification and electrostatic induction, which drives a flow of electrons that reverses direction at regular intervals between pairs of interdigitated electrodes 802 and generates electric outputs as a result. For example, the TENG 800 operates based on movements of the copper rod 804 across the interdigitated electrodes 802, where the copper rod 804 is covered by the PU coating 806, and where the interdigitated electrodes 802 are covered by the PTFE film 808. Rolling the rod along the PTFE film 808 causes the electrons to transfer from the PU coating 806 to the PTFE film surface 808.

Figure 26A:
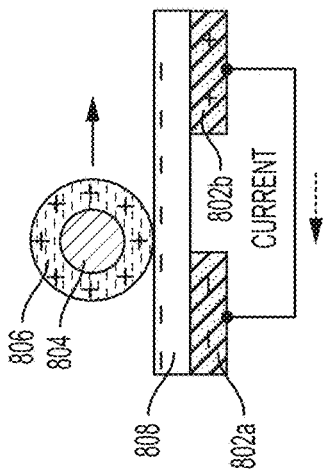
FIGS. 26A-D illustrate working mechanism of the triboelectric nanogenerator of FIG. 25A according to one aspect of the disclosed technology.
Figure 26B:
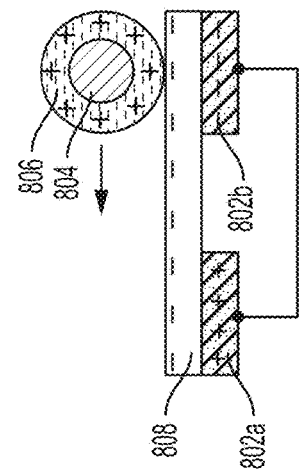
Figure 26C:
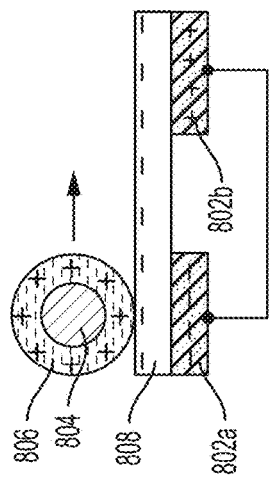

FIG. 25D as well as FIGS. 26A-D illustrate the working principle of the TENG 800. At an initial state as illustrated in FIG. 26A, the rod 804 lies on top of and is aligned with the electrode 802a. Since the PU 806 and PTFE 808 are in direct contact, the electrons transfers from the PU surface 806 to the PTFE surface 808 due to triboelectrification. As a result, the PU surface 806 becomes positively charged, the PTFE surface 808 becomes negatively charged, and electrons accumulate at the electrode 802a. Once the rod 804 starts to roll as illustrated in FIG. 26B, a positive electrical potential occurs between the electrodes 802a and 802b, and the electrons start to flow from the electrode 802a to the electrode 802b to balance the potential difference until equilibrium is reached as illustrated in FIG. 26C. During this process, a positive output current is generated as illustrated in FIG. 26B.

Figure 26D:
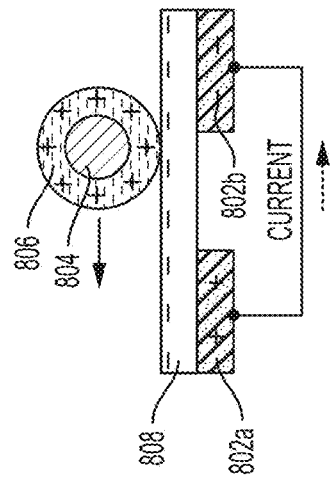

Referring to FIG. 26C, once the rod 804 reaches the electrode 802b or becomes aligned with the electrode 802b, the electrons accumulate at the electrode 802b. As the rod 804 returns back to the electrode 802a as illustrated in FIG. 26D, a negative electric potential occurs between the electrode 802a and the electrode 802b, and the electrons flow from the electrode 802b back to the electrode 802a until an equilibrium is reached as illustrated in FIG. 26A. During this process, a negative output current is generated. Accordingly, as the rod 804 rolls back and forth on top of the PTFE film 808, the TENG 800 continuously outputs electricity.

Rolling of the rod 804 may be driven by an external force. By way of example, a linear motor, such as a Linmot linear motor system, may provide a stable external force to drive the rod 804 back and forth against the PTFE film 808.

Figure 26F:
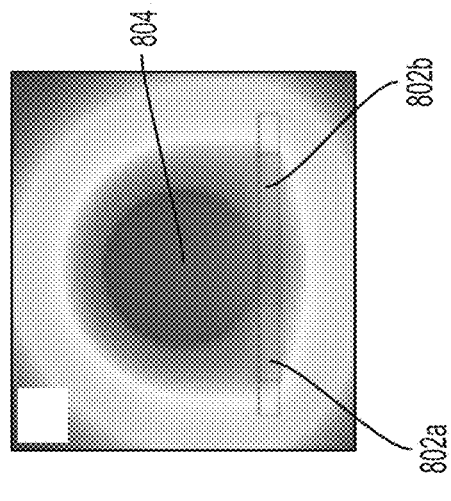
FIGS. 26E-H illustrate changes in power distributions of the triboelectric nanogenerator of FIG. 25A when rolling the rod according to one aspect of the disclosed technology.
Figure 26H:
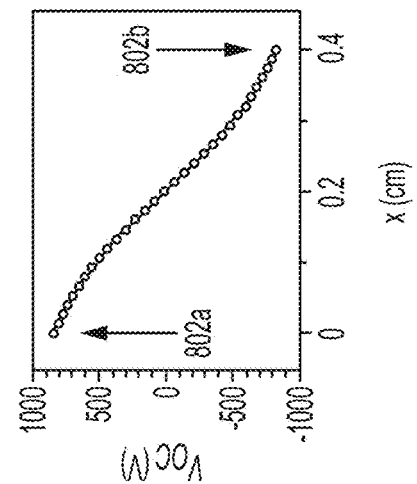
Figure 26E:
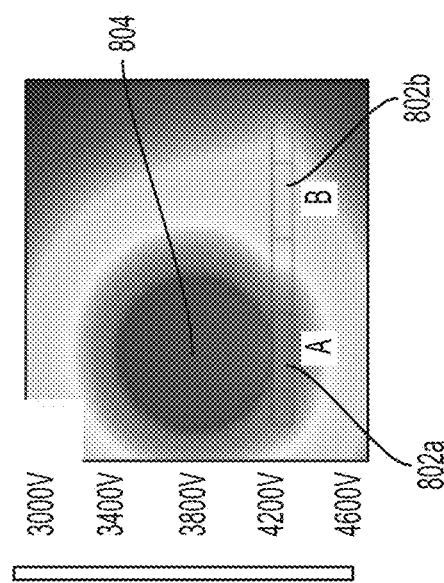
Figure 26G:
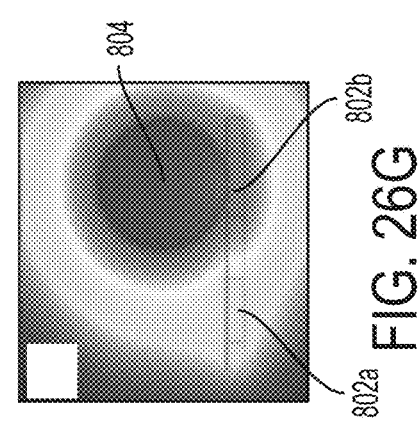

FIGS. 26E-G illustrate potential distributions on the interdigitated electrodes 802 in an open-circuit condition based on a numerical simulation using a finite element method (FEM). In the simulation, the triboelectric charge density on the PU surface 806 is set to 60 μC m$^{-2}$. FIGS. 26E-G respectively show potential distributions on the interdigitated electrodes 802 when the rod 804 is aligned with the electrode 802a, when the rod 804 is somewhere between the electrode 802a and 802b, and when the rod 804 is aligned with the electrode 802b.

As illustrated in FIG. 26E, when the rod 804 is aligned with the electrode 802a, the electrode 802a has a maximum potential whereas the electrode 802b has a minimum potential, resulting in a maximum output open-circuit voltage ($V_{oc}$) as illustrated in FIG. 26H. This voltage then diminishes as the rod 804 starts to move. After the rod 804 rolls to a middle position between the electrode 802a and 802b as illustrated in FIG. 26F, $V_{oc}$ with an opposite polarity starts to build up until the rod 804 reaches the electrode 802b as illustrated in FIG. 26G. FIG. 26H clearly shows a continuous variation of $V_{oc}$ between a position where the rod 804 is above the electrode 802a (e.g., x=0) and a position where the rod 804 is above the electrode 802b (e.g., x=0.4 cm).

4.4 Output Performance

Under one wave impact, a single-layered TENG 800 with nine pairs of interdigitated electrodes may provide nine pulses of electric outputs. Each pulsed output voltage may be about 52 V. Each pulsed output current density may be about 13.8 mA m$^{-2}$.

FIGS. 28A-D illustrate output $V_{oc}$ and output $J_{sc}$ of the single-layered TENG 800 with nine pairs of interdigitated electrodes 802.

Figure 28A:
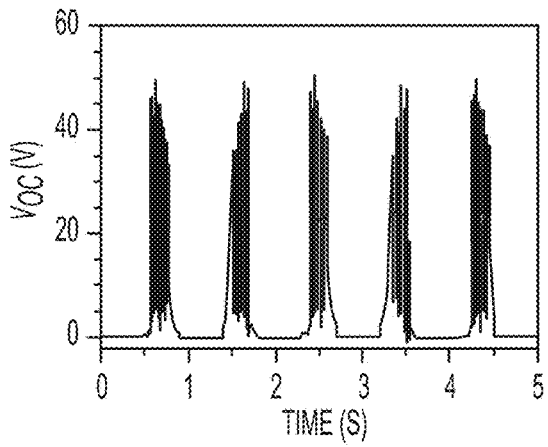
FIGS. 28A-D illustrate output performance characteristics of a single-layered triboelectric nanogenerator with nine pairs of interdigitated electrodes according to one aspect of the disclosed technology.
Figure 28B:
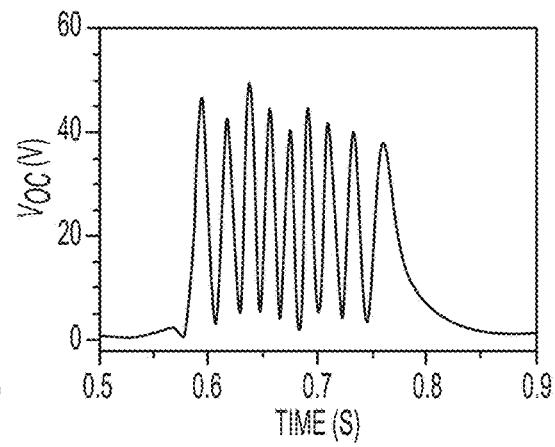

FIG. 28A shows that the single-layered TENG 800 with nine pairs of interdigitated electrodes 802 may achieve a $V_{oc}$ output of 52 V. $V_{oc}$ switches between zero and a maximum value based on displacements of the rod 804 relative to the interdigitated electrodes 802. For example, when the rod 804 is aligned with an interdigitated electrode, $V_{oc}$ reaches the maximum value. When the rod 804 is not aligned with any interdigitated electrode, $V_{oc}$ is approximately zero. FIG. 28B provides an enlarged view of the voltage output variation based on the movement of the rod 804. FIG. 28B clearly illustrates nine pulses of electric output. Each pulsed voltage output has an approximate value of 52 V.

Figure 28C:
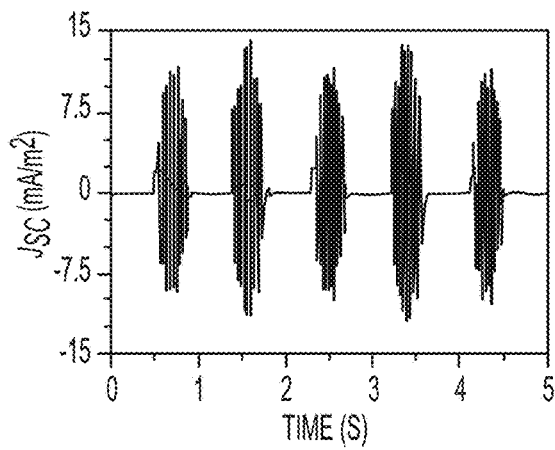
Figure 28D:
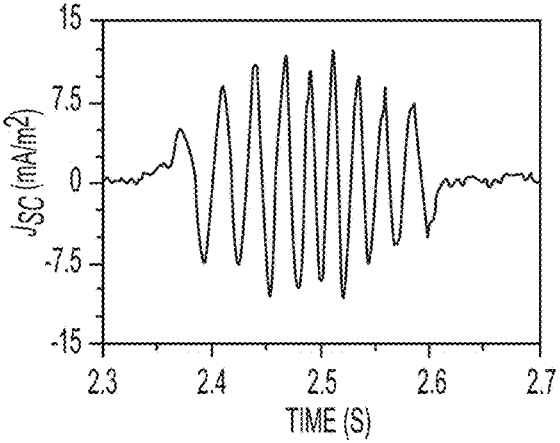

FIG. 28C illustrates short-circuit current density ($J_{sc}$) generated by the single-layered TENG 800. FIG. 28C also exhibits multiple peaks in reverse directions. There is no electric current when the rod 804 is aligned with any interdigitated electrode. A positive current is generated when the rod 804 moves from one interdigitated electrode, e.g., 802a, to its adjacent interdigitated electrode, e.g., 802b. A negative current is generated when the rod 804 returns, e.g., from the interdigitated electrode 802b to the interdigitated electrode 802a. FIG. 28D provides an enlarged view of variations of the short-circuit current density resulted from the movement of the rod 804. FIG. 28D clearly illustrates nine pulses of electric currents. $J_{sc}$ may have an average value about 13.8 mA$^{m-2}$.

The electric outputs of the TENG 800 may be measured by a programmable electrometer, e.g., Keithley Model 6514, and a low-noise current preamplifier, e.g., Stanford Research System Model SR570.

4.5 Parameter Effect on Output Performance

4.5.1 Number of Electrode Pairs

The outputs of the TENG 800 may depend on the number of pairs of interdigitated electrodes 802 deposited on the PMMA substrate 820. In one example, the TENG 800 may have one pair of interdigitated electrodes 802a-b as illustrated in FIGS. 26A-D. When the rod 804 rolls over one pair of interdigitated electrodes 802, the TENG 800 may generate one pulse of electric output. In another example, the TENG 800 may have numerous pairs of interdigitated electrodes. Multiple pulses of electric outputs may be generated when the rod 804 rolls over multiple pairs of interdigitated electrodes 802 that are covered by the PTFE film 808 as shown in FIG. 25A.

Figure 27:
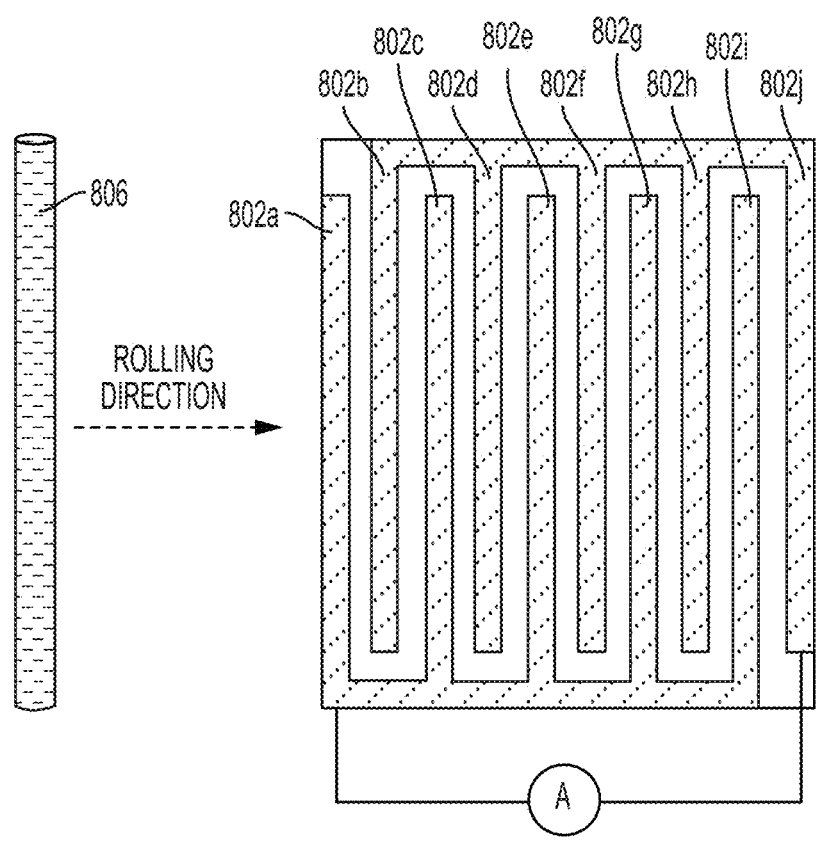
FIG. 27 provides a schematic diagram of a triboelectric nanogenerator with five pairs of interdigitated electrodes according to one aspect of the disclosed technology.

For instance, FIG. 27 illustrates five pairs of interdigitated electrodes 802a-b, 802c-d, 802e-f, 802g-h and 802i-j. The TENG in FIG. 27 may thus generate five pulses. In another example, when the TENG has nine pairs of interdigitated electrodes, nine pulses of electric outputs may be generated as illustrated in FIGS. 28B and 28D.

Figure 28E:
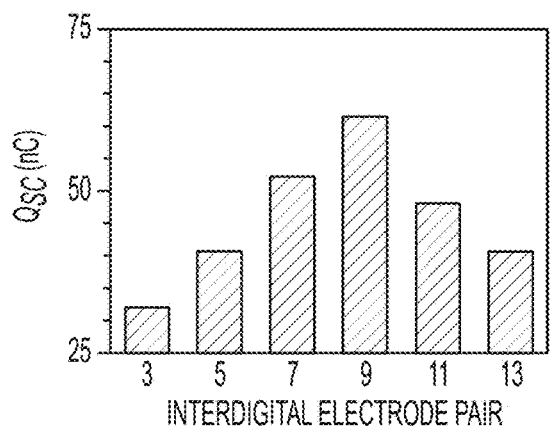
FIG. 28E illustrates changes in inductively transferred charges of a single-layered triboelectric nanogenerator as the number of interdigitated electrodes varies.

FIG. 28E illustrates how the number of pairs of interdigitated electrodes 802 affect inductively transferred charges of the single-layered TENG 800. In this experiment, different numbers of interdigitated electrodes 802 are tested on a PMMA substrate 820 of a fixed dimension, e.g., 7.5 cm×7.5 cm. As shown in FIG. 28E, the single layered-TENG 800 can provide more inductively transferred charges when the number of pairs of interdigitated electrodes 802 increases from 3 to 9.

However, for a given area, as the number of interdigitated electrodes 802 increases, each electrode width shrinks accordingly. The quantity of inductively transferred charges also decreases accordingly. As a result, as shown in FIG. 28E, as the number of pairs of interdigitated electrodes 802 increases from 9 to 13, the inductively transferred charges decrease accordingly.

4.5.2 Velocity

Figure 28F:
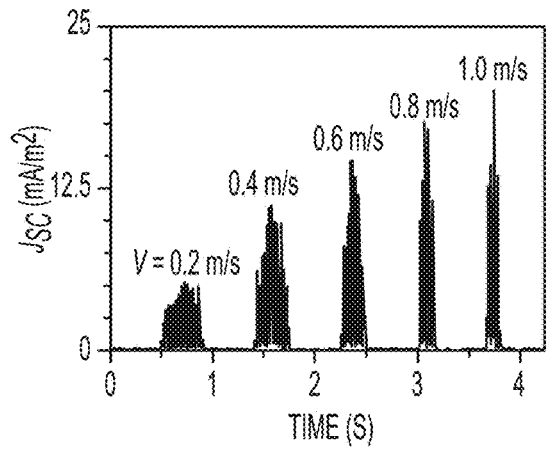
FIG. 28F illustrates changes in short-circuit current density $J_{sc}$ of a single-layered triboelectric nanogenerator as the moving speed of the rod varies.

The moving speed of the rod 804 may also affect the output performance of the TENG 800. The moving speed of the rod 804 may affect the transferring of inductive charges, which consequently affects the current output. For example, FIG. 28F illustrates the impact of the moving speed of the rod 804 on the rectified $J_{sc}$ of the single-layered TENG 800. In this example, a full-wave diode bridge is applied to rectify the output currents in the same direction. As shown in FIG. 28F, as the moving speed of the rod 804 increases from 0.2 m s$^{-1}$ to 1.0 m s$^{-1}$, $J_{sc}$ increases from 5.2 mA m$^{-2}$ to 21.8 mA m$^{-2}$.

4.5.3 Simulated Water Wave

Figure 29B:
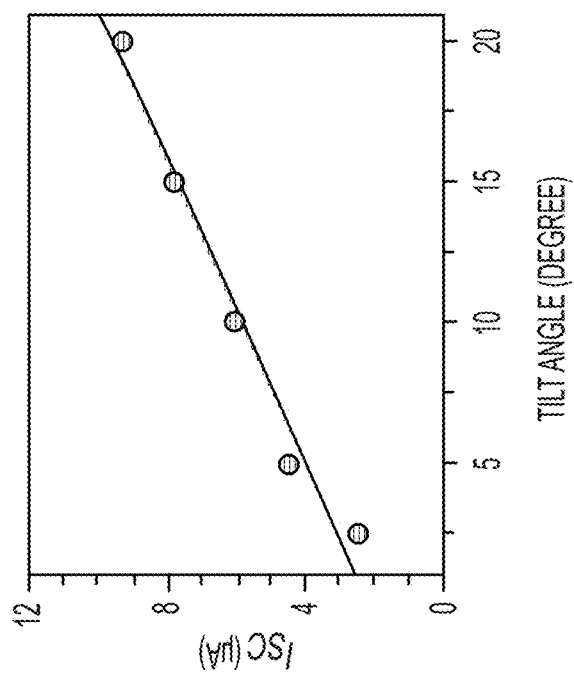
FIG. 29B illustrates the short-circuit current output $I_{sc}$ peak values of a single-layered triboelectric nanogenerator at different rocker tilt angles.
Figure 29A:
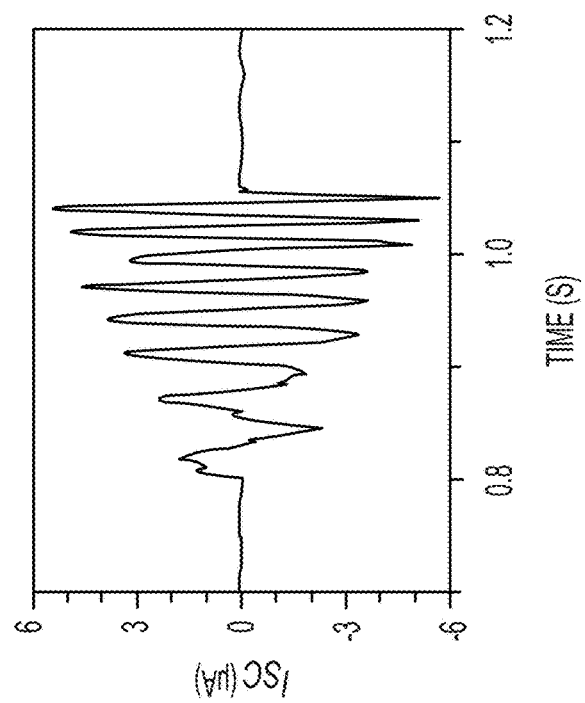
FIG. 29A provides an enlarged view of one cycle of the output $I_{sc}$ of a single-layered triboelectric nanogenerator.

FIG. 29A provides an enlarged view of one cycle of current $I_{sc}$ output by a single-layered TENG in a simulated environment. In one example, a laboratory platform rocker may be used to simulate a water-wave motion. The laboratory platform rocker may swing at a tilt angle of 10°. The current output generated by the rocker as illustrated in FIG. 29A is different from that generated by the linear motor as illustrated in FIG. 28D. This discrepancy may be explained as follows. When the TENG is driven by the rocker, the rod possesses a gravitational acceleration when rolling over the PTFE film covered interdigitated electrodes, which consequently results in a faster transfer speed of inductive charges, thus generating a higher and sharper current output.

4.5.4 Tilt Angles

As illustrated in FIG. 29B, tilt angles may affect the final output currents of the single-layered TENG. FIG. 29B illustrates how different rocker tilt angles affect the $8_{th}$ output $I_{sc}$ peak value in a single-layered TENG. As the tilt angle increases from 2.5° to 20°, the value of the final output current increases from 2.3 µA to 8.9 µA, which is about a 3.9-fold increase.

4.6 Advantage and Application

Using interdigitated electrodes 802 provides a more efficient solution for harvesting energy. Compared to existing technologies, the TENG 800 generates electric outputs by simply relying on a change of displacement of a triboelectrically charged object between interdigitated electrodes 802, which largely improves energy conversion efficiency.

Further, different from previous TENG designs, the use of a free rolling contact material can detect water wave and remove any need for an electric input. Accordingly, the TENG 800 may harvest hydropower or ocean wave energy. Since the TENG does not rely on any electric input, the TENG may be used as self-powered sensors for purposes, including for example, detecting ocean waves.

5. Multi-Layer Triboelectric Nanogenerator with Interdigitated Electrodes

Figure 30:
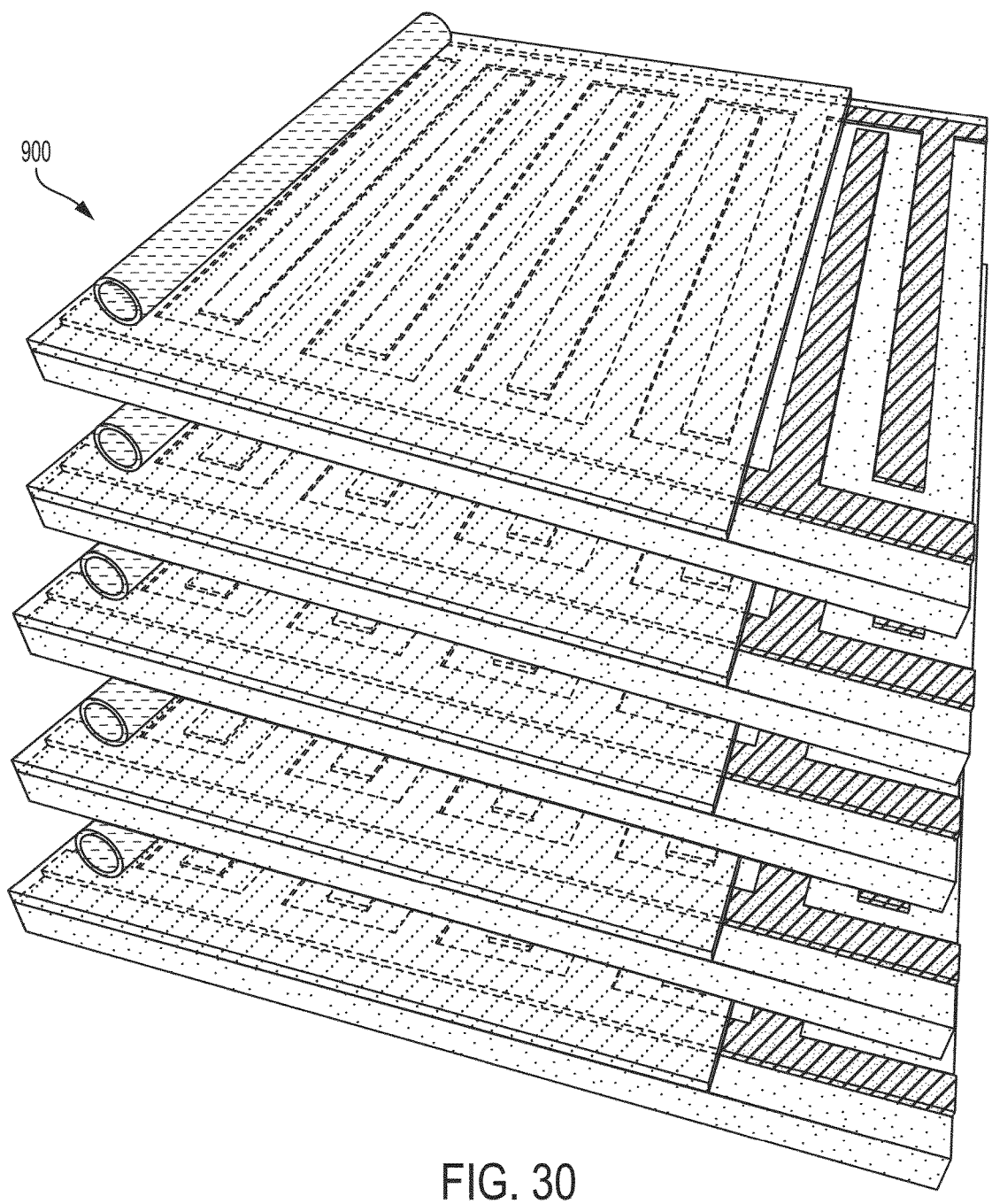
FIG. 30 illustrates a multi-layered triboelectric nanogenerator according to one aspect of the disclosed technology.

According to some aspects of the disclosed technology, multiple single-layered TENGs 800 may be assembled to form a multi-layered TENG 900, as shown in FIG. 30, to provide enhanced electric outputs under the same external force impact. The multi-layered TENG 900 may include a plurality of single-layered TENGs 800 assembled in a vertical direction.

5.1 Output Performance

Figure 31A:
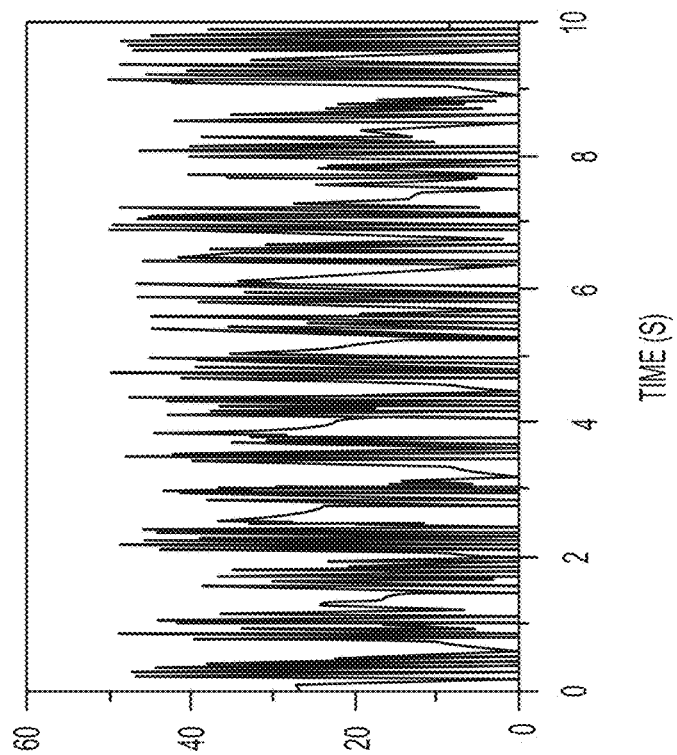
FIGS. 31A-B illustrate output performance characteristics of a five-layered triboelectric nanogenerator that draws energy from water waves according to one aspect of the disclosed technology.
Figure 31B:
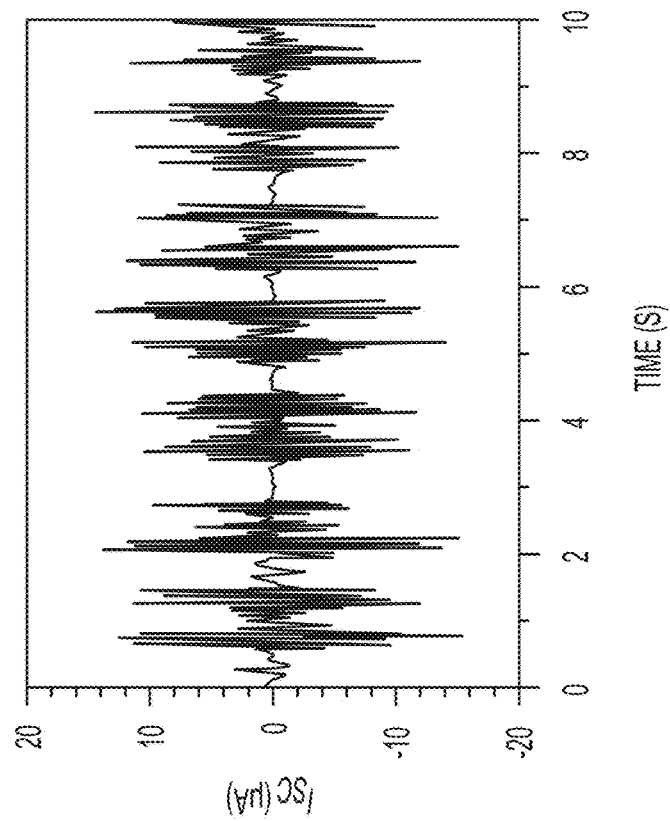

In one example, the multi-layered TENG 900 may include five layers. FIGS. 31A-B illustrate electric outputs generated by a five-layered TENG under a water-wave impact. During the experiment, polystyrene sheets and an aluminum tube are used to support and balance the five-layered TENG above water. A laboratory platform rocker, e.g., (260350, Boekel), may be used to simulate the water wave.

FIGS. 31A-B respectively illustrate variations of $V_{oc}$ and $I_{sc}$ output by the five-layered TENG when receiving the water-wave impact. FIG. 31A clearly shows that multiple outputs are generated by each water wave impact. $V_{oc}$ may achieve a maximum value of 50 V. FIG. 31B illustrates that $I_{sc}$ may have an average value about 13.5 µA.

Figure 31C:
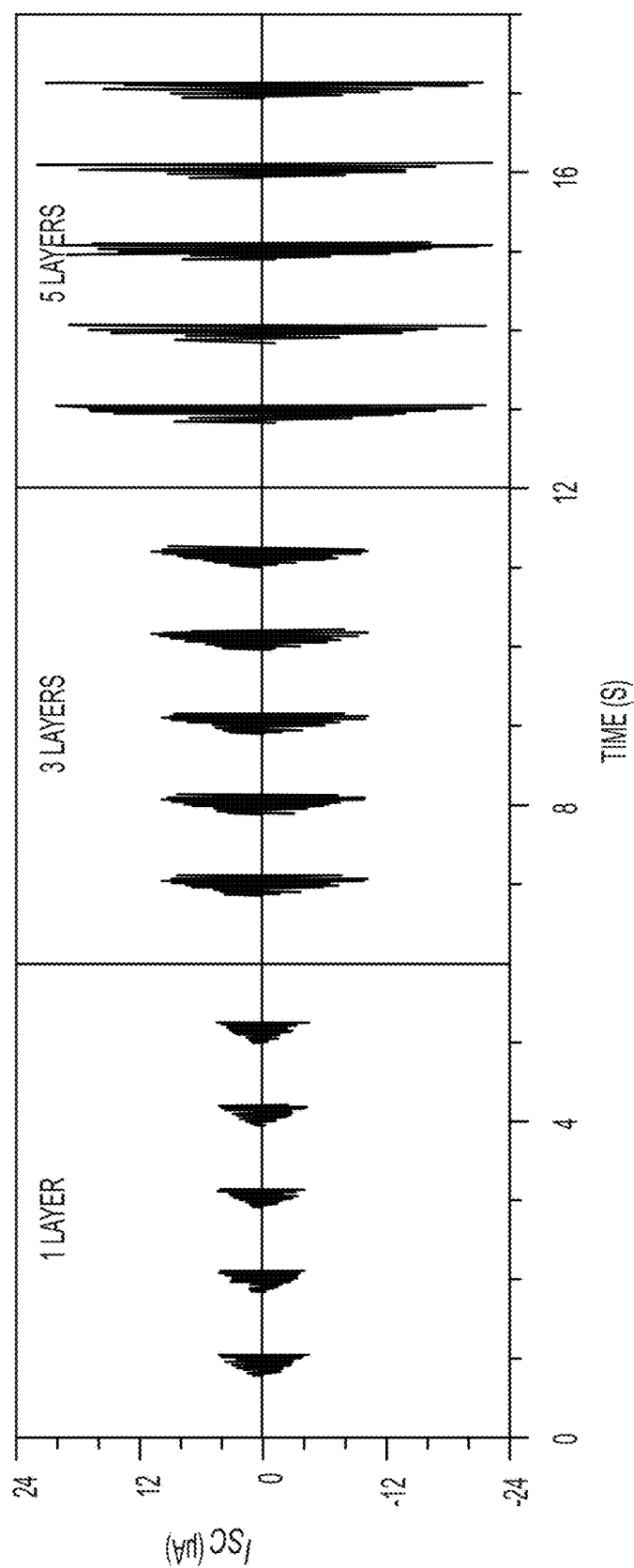
FIG. 31C illustrates a comparison of short-circuit current outputs $I_{sc}$ generated by triboelectric nanogenerators each having different numbers of layers.
Figure 31D:
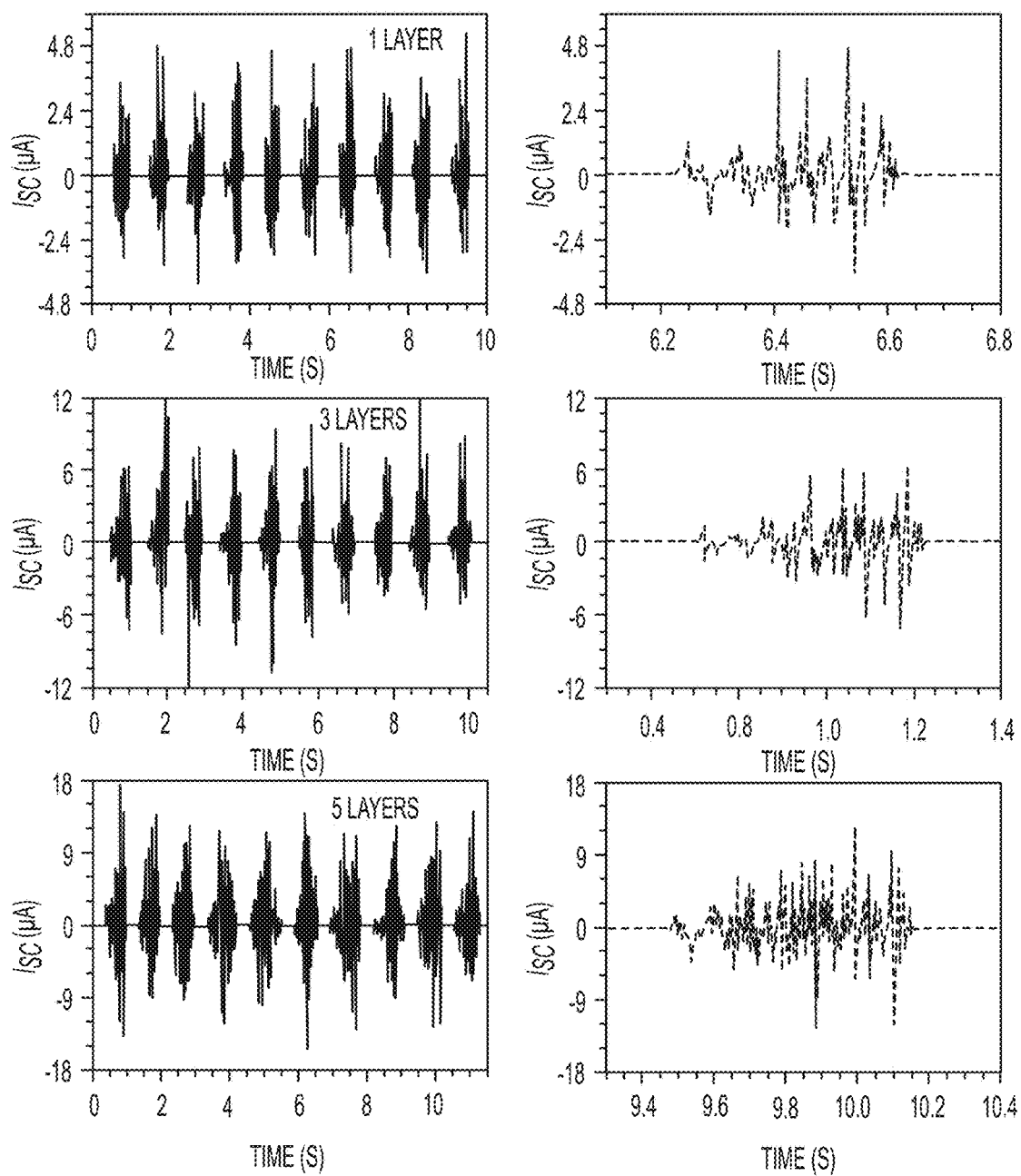
FIG. 31D illustrates output performance characteristics of triboelectric nanogenerators having different numbers of layers.
Figure 31F:
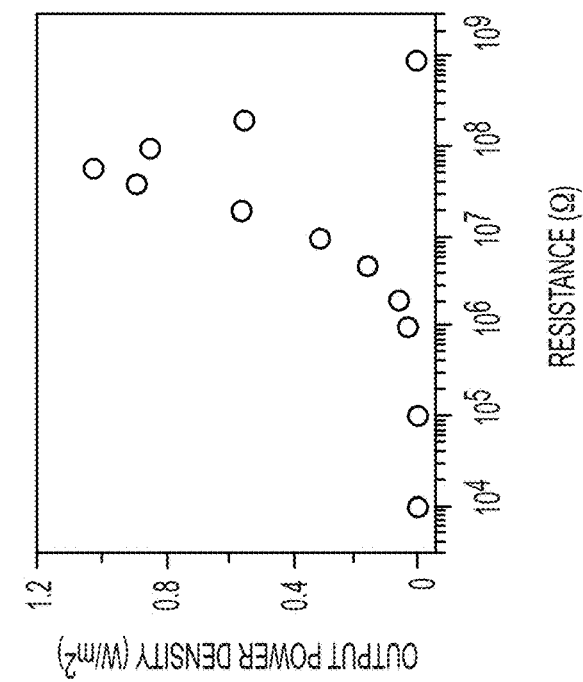
FIGS. 31E-F illustrate changes in output performance characteristics of a five-layered triboelectric nanogenerator as resistances of an external load vary.

According to FIG. 31F, a five-layered TENG may reach an instantaneous output power density of 1.1 W m$^{-2}$ under one water-wave impact.

5.2. Parameter Effect on Output Performance

5.2.1 Number of Layers

The more layers a TENG has, the higher its output is. FIG. 31C illustrates short-circuit current outputs $I_{sc}$ generated by a single-layered TENG 800, three-layered TENG, and five-layered TENG when a laboratory platform rocker swings at a tilt angle of 10°. As clearly shown in FIG. 31C, the electric output increases as the number of layers increases. For instance, as illustrated in FIG. 31C, the average $I_{sc}$ of a five-layered TENG is about 21.5 µA, which is about 4 times as much as that generated by the single-layered TENG, e.g., 5.3 µA.

FIG. 31D illustrates output performance characteristics of triboelectric generators with different numbers of layers.

5.2.2 Resistance

Figure 31E:
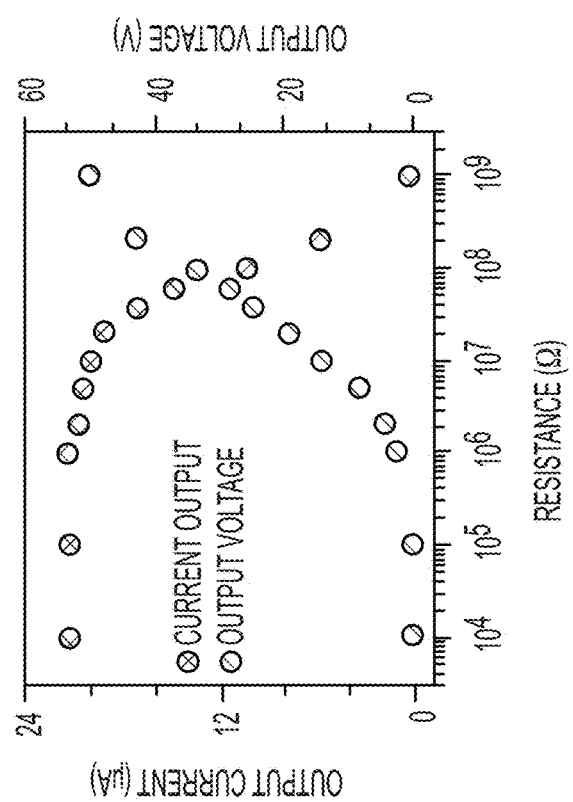

FIGS. 31E-F illustrate how a resistance of an external load impacts output current, output voltage, and output power density of a five-layered TENG. In the experiment, the resistance increases from 0.01 MΩ to 1 GΩ. As illustrated in FIG. 31E, when the resistance is below 1 MΩ, the output voltage is close to 0 and the output current has a marginal fluctuation. However, when the resistance increases from 1 MΩ to 1 GΩ, the output voltage from the load manifests a prominent increase, while the output current across the load manifests a prominent decrease. As a result, as illustrated in FIG. 31F, the instantaneous power density generated by the five-layered TENG remains small when the resistance is below 0.1 MΩ and climbs to a maximum value of 1.1 W m$^{-2}$ when the resistance is increased to 66 MΩ.

5.3 Application

Figure 31H:
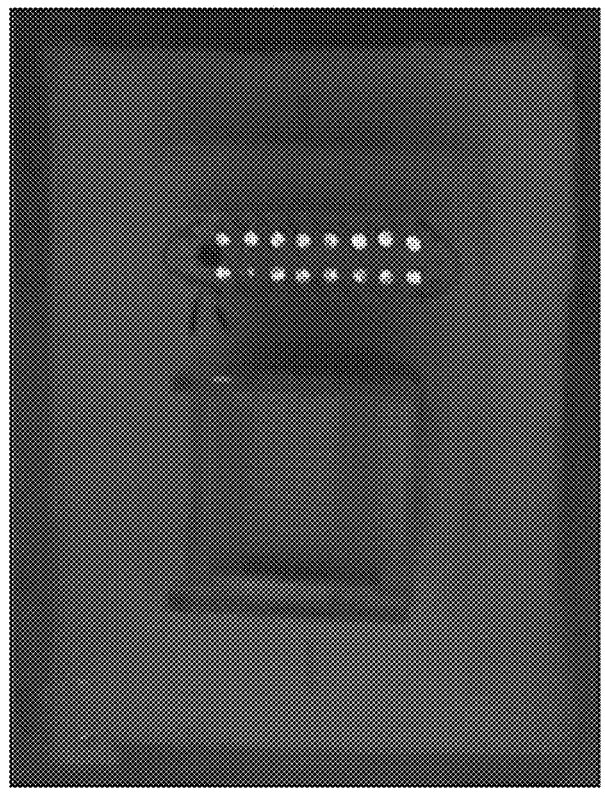
FIGS. 31G-H illustrate powering sixteen LEDs using a triboelectric nanogenerator according to one aspect of the disclosed technology.
Figure 31G:
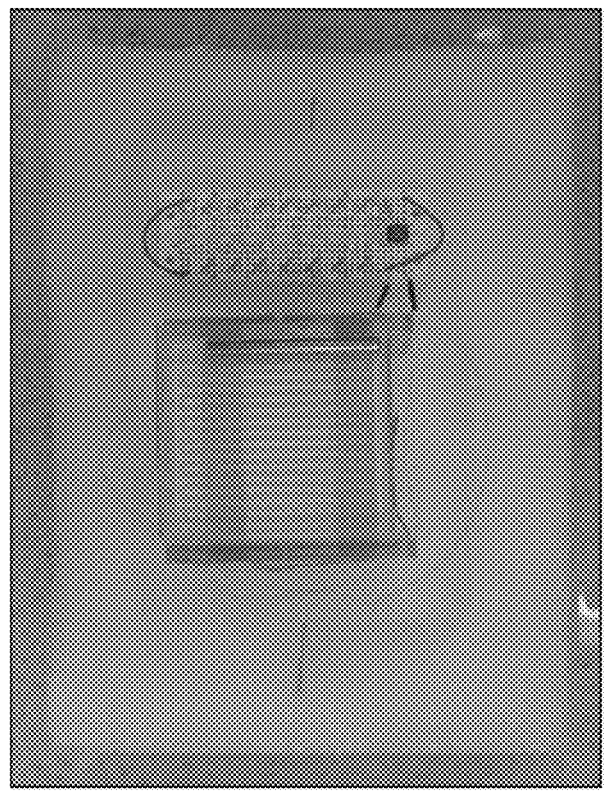

The multi-layered TENG with interdigitated electrodes may successfully harvest hydropower. A full-wave diode bridge may rectify the electric outputs in the same direction. For example, the multi-layered TENG may use the rectified electric outputs to power light emitting diodes (LEDs). As illustrated in FIGS. 31G-H, a five-layered TENG may be integrated with polystyrene sheets to power commercial LEDs. In the example illustrated in FIGS. 31G-H, commercial LEDs light up when the rod rolls over the PTFE film.

Figure 32A:
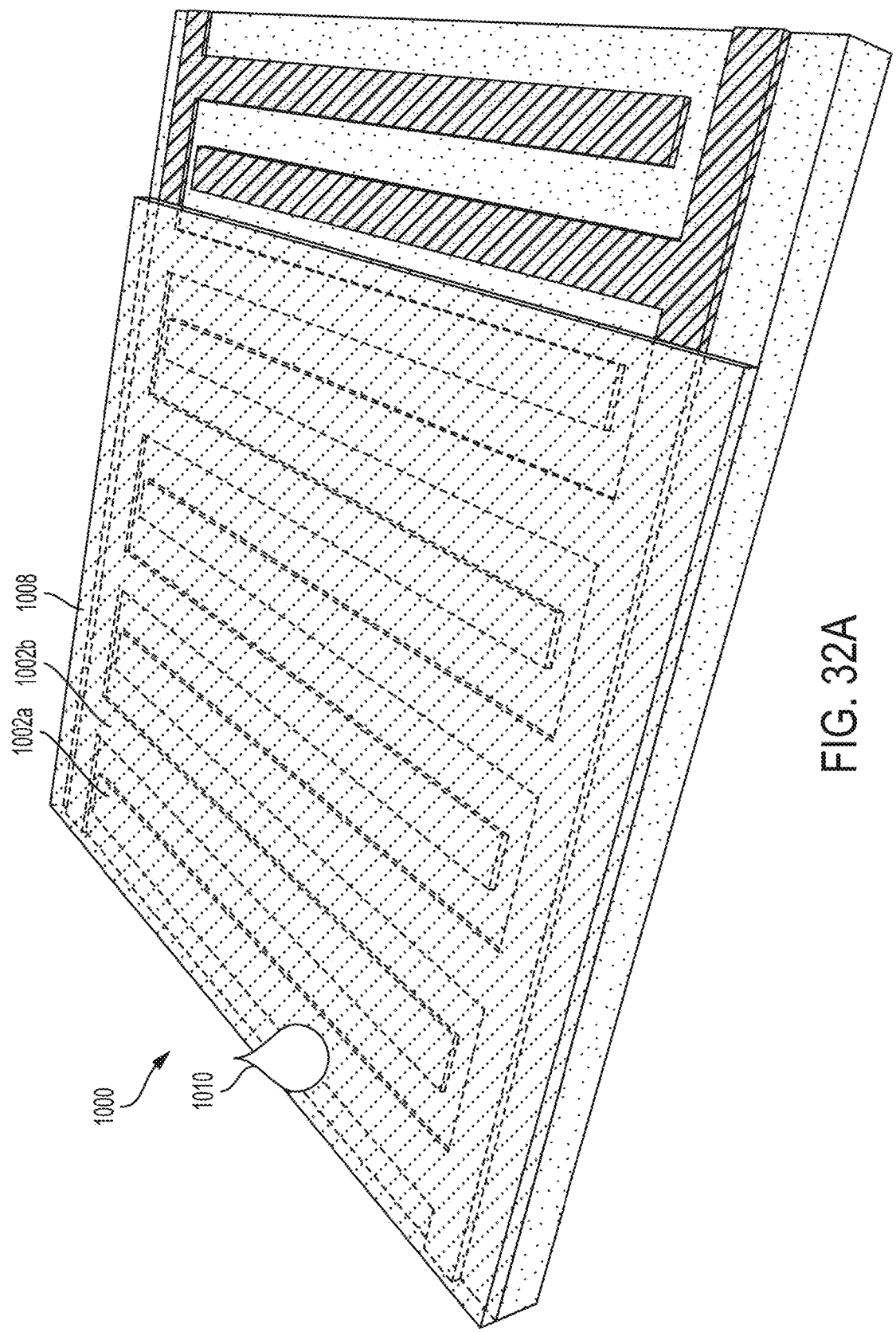
FIG. 32A illustrates an exemplary triboelectric nanogenerator for converting hydropower into electrical energy according to one aspect of the disclosed technology.

6. Triboelectric Nanogenerator with Interdigitated Electrodes without Rolling Rod According to some aspects of the disclosed technology, a TENG 1000 as illustrated in FIG. 32A may harvest energy from a water drop. The TENG 1000 may harvest raindrop energy based on water-solid contact electrification. Compared to the TENG 800, the TENG 1000 may omit the rod 804.

The TENG 1000 may include a pair of interdigitated electrodes 1002a-b and a member 1008 lying on top of the interdigitated electrodes 1002a-b. The member 1008 may generate triboelectric charges when contacted by water 1010. As water 1010 flows across the member 1008 from a position aligned with one electrode 1002a to a position aligned with the other electrode 1002b, a flow of electrons is generated between the interdigitated electrodes 1002a-b.

The member 1008 may have a triboelectric characteristic different from water. Examples of suitable materials for the member 1008 may include, but not limited to, anyone or a combination of the following materials: PET, PMMA, PDMS, PTFE, FEP, PVC, polyimide, metal and alloy, among many other possibilities.

The electrodes 1002a-b may include, but not limited to, anyone or a combination of the following materials: metal such as copper, gold, silver and aluminum, ITO and conductive polymer, among many other possibilities.

In one embodiment, the TENG 1000 may include interdigitated electrodes covered by a PTFE film 1008. If the TENG 1000 has nine pairs of interdigitated electrodes, nine pulses of electric outputs may be generated upon one water drop 1010.

In another embodiment, instead of having a nanostructured PTFE film, the TENG may have a commercial FEP film over the interdigitated electrodes. The FEP film has a hydrophobic surface. FIG. 32B illustrates output $I_{sc}$ when the TENG harvests energy from a water drop. In this experiment, untreated tap water is selected as the water source. A programmable syringe pump, e.g., (PHD 2000, Harvard Apparatus), controls the volume of each water drop. The volume of each water drop may be controlled at 30 μL. Each water drop may be controlled to fall from a height of 20 cm. FIG. 32B shows the output current of the TENG when receiving continuous water drops. As shown, the output current has an average value of 0.3 μA, and exhibits an AC behavior, with an equal number of electrons reversing flow directions in each cycle.

Figure 32C:
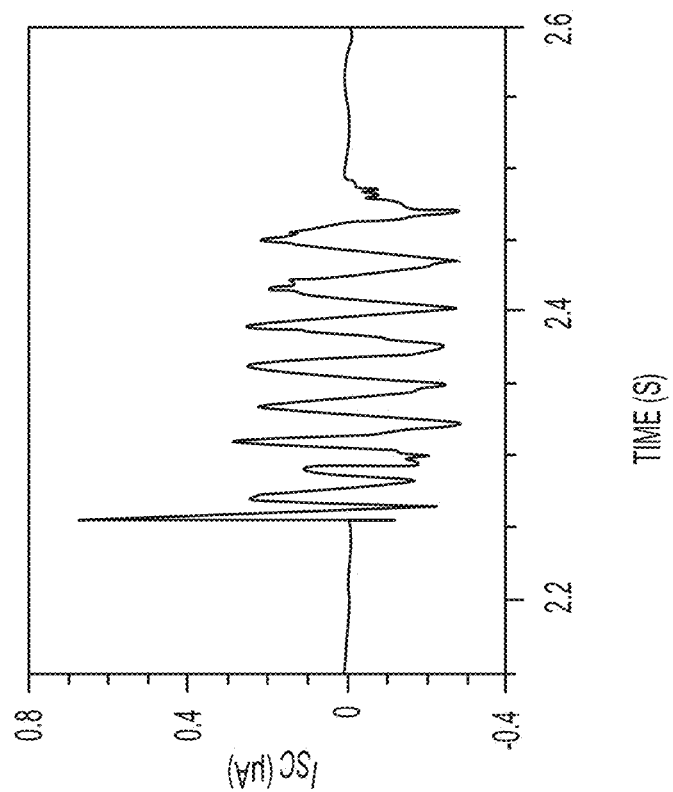
FIGS. 32B-C illustrate short-circuit current output $I_{sc}$ of a triboelectric nanogenerator that draws energy from water drops according to one aspect of the disclosed technology.
Figure 32B:
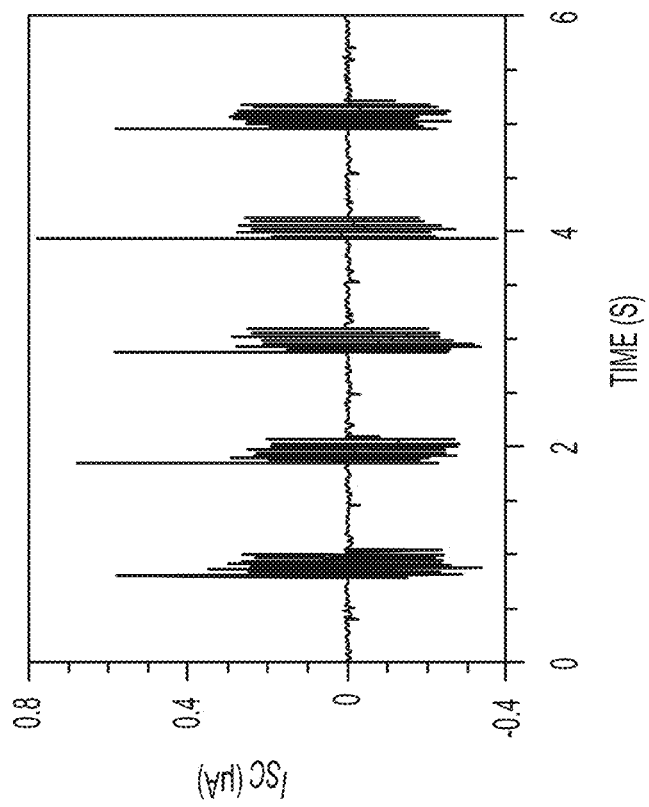

FIG. 32C provides an enlarged view of the output current $I_{sc}$ of the TENG when receiving one water drop. FIG. 32C clearly shows that multiple electric outputs, e.g., nine pulses of output currents, are generated by a single water drop. Since the falling water drop has a higher speed when passing through the first pair of interdigitated electrodes, a sharp current signal of a large magnitude is thus observed. As a result, as shown in FIG. 32C, the current generated by the first pair of interdigitated electrodes has a larger magnitude for a lesser period of time in comparison to that generated by other pairs of interdigitated electrodes.

Figure 32D:
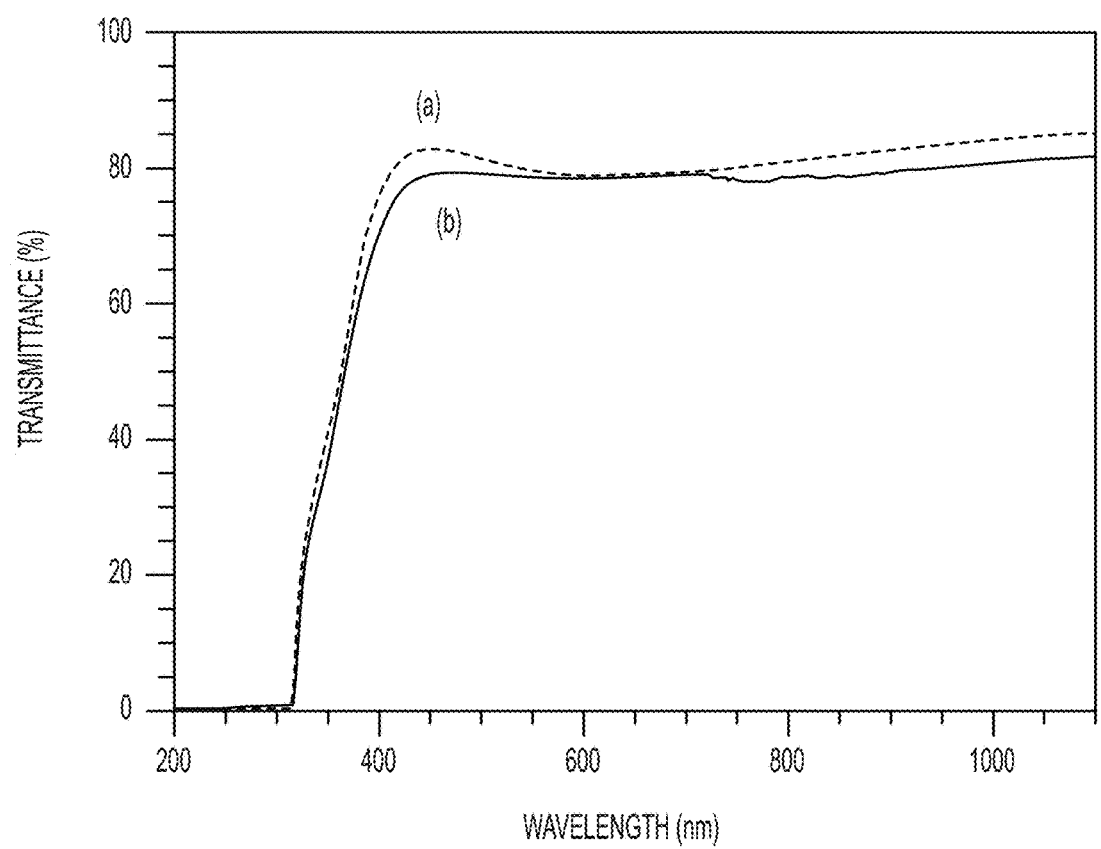
FIG. 32D illustrates transmittance spectra of indium tin oxide (ITO) interdigitated electrodes-deposited polyethylene terephthalate (PET) film before (a) and after (b) FEP film covering according to one aspect of the disclosed technology.

In another embodiment, the PMMA substrate and Al electrodes may be replaced by a PET film and ITO electrodes. As a result, the TENG may become highly transparent. FIG. 32D shows transmittance spectra of ITO interdigitated electrodes-deposited PET film before (a) and after (b) FEP film covering.

7. Summary

Various triboelectric nanogenerators based on rolling electrification are described herein. As described above, such triboelectric nanogenerators have a low frictional coefficient due to its rolling motions, thus experiencing less resistive forces and consuming less mechanical energy in comparison to existing energy harvest technologies. Further, the triboelectric nanogenerators described herein have high energy conversion efficiency, deliver superior output performance, and exhibit high robust characteristics.

The disclosed technology provides a green and sustainable solution for harvesting ambient mechanical energy, ambient rotational kinetic energy as well as ocean wave and raindrop energies. The triboelectric nanogereators described herein may be combined with a solar cell to form a new hybrid energy cell which can simultaneously or individually harvest solar and water wave energy in different weather conditions. Further, the present technology may be adapted to many applications, including but not limited to, self-powered electronics such as LEDs, self-powered sensors, driving portable electronics, charging energy storage units, and electrochemical applications. The present technology may easily allow energy harvesting on a large scope.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended. The term "exemplary" used herein does not mean best mode, but rather, example.

Accordingly, those skilled in the art will appreciate that the conception upon which the application and claims are based may be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A generator comprising:
    a first member; and
    a second member comprising a plurality of substantially spherical members, the second member in contact with the first member to generate triboelectric charges, the second member being rollable against the first member to generate a flow of electrons between two electrodes.

2. The generator of claim 1, wherein the first member defines a substantially planar configuration.

3. The generator of claim 1, wherein the first member defines a substantially cylindrical configuration.

4. The generator of claim 1, wherein the first member defines a substantially hollow cylindrical configuration.

5. The generator of claim 1, wherein the first member includes a material selected from the group consisting of polyethylene terephthalate, poly(methyl methacrylate), polydimethylsiloxan, polytetrafluoroethylene, fluorinated ethylene propylene, poly(vinyl chloride), polyimide, metal and alloy.

6. The generator of claim 1, wherein the first member includes a first layer and a second layer that are parallel to each other;
    wherein at least one of the first and second layers is laterally movable with respect to the other; and
    wherein the second member is disposed between the first and second layers.

7. The generator of claim 6, wherein the first layer is deposited with a first pair of electrodes, and the second layer is deposited with a second pair of electrodes.

8. The generator of claim 7, wherein the electrodes within each pair are electrically coupled to each other.

9. The generator of claim 7, wherein the first and second layers each define a first edge and a second edge;
    wherein the first pair of electrodes includes a first electrode adjacent to the first edge of the first layer and a second electrode adjacent to the second edge of the first layer;
    wherein the second pair of electrodes includes a third electrode adjacent to the first edge of the second layer and a fourth electrode adjacent to the second edge of the second layer;
    wherein the first electrode is electrically coupled to the fourth electrode; and wherein the second electrode is electrically coupled to the third electrode.

10. The generator of claim 1, wherein the electrodes include a material selected from the group consisting of metal, indium tin oxide and conductive polymer.

11. The generator of claim 1, wherein the electrodes are adjacent to the first member.

12. The generator of claim 1, wherein the second member exhibits a substantially cylindrical configuration.

13. The generator of claim 1, wherein the second member includes a material selected from the group consisting of polyurethane, polyoxydiphenylene-pyromellitimide, polydimethylsiloxan, conductive polymer, metal and alloy.

14. The generator of claim 1 further comprising nanostructures on at least one of the first and second members.

15. The generator of claim 1 further comprising a supporting member to support the plurality of substantially spherical members.

16. The generator of claim 15, wherein the supporting member includes a material selected from the group consisting of polyimide, polyethylene terephthalate, poly(methyl methacrylate), poly(4,4'-oxydiphenylene-pyromellitimide) and $SiO_2$.

17. The generator of claim 1, wherein the plurality of substantially spherical members are arranged in a fashion of parallel groups, each group forming a linear profile.

18. The generator of claim 1, wherein the plurality of substantially spherical members form into a plurality of groups, each group being supported by a supporting member.

19. The generator of claim 18, wherein each group containing a portion of the plurality of substantially spherical members exhibits a circular sector profile of a disk.

20. The generator of claim 1 further comprising a supporting member that supports the two electrodes.

21. The generator of claim 20, wherein the supporting member includes a material selected from the group consisting of polyimide, polyethylene terephthalate, poly(methyl methacrylate), poly(4,4'-oxydiphenylene-pyromellitimide) and $SiO_2$.

22. The generator of claim 1, wherein the second member is in contact with and rollable against the two electrodes.

23. The generator of claim 1, wherein the first member defines a substantially planar configuration and the second member defines a substantially cylindrical configuration.

24. The generator of claim 1, wherein the first member defines a substantially hollow cylindrical configuration and the second member defines a substantially cylindrical configuration.

25. The generator of claim 1, wherein the first member includes a fluorinated ethylene propylene film having a plurality of parallel, equidistant, identical metal gratings deposited thereon.

26. The generator of claim 1, wherein the first member is rotatable about a fixed axis.

27. The generator of claim 1 further comprising a supporting member disposed within a hollow defined by the first member.

28. The generator of claim 1, wherein the second member generates the flow of electrons between the two electrodes when the second member rolls from a first position aligned with one of the electrodes to a position aligned with the other electrode.

29. The generator of claim 1, wherein the two electrodes are complementary grating electrodes.

30. The generator of claim 1, wherein the two electrodes are complementary to form a disk profile.

31. The generator of claim 1, wherein the two electrodes are complementary to form a hollow cylindrical configuration.

32. The generator of claim 1, wherein the electrodes are interdigitated electrodes.

33. A generator comprising:
two electrodes; and
a member comprising a plurality of substantially spherical members, the member in contact with the two electrodes to generate triboelectric charges, the member being rollable against the electrodes to generate a flow of electrons between the two electrodes.

34. The generator of claim 33 further comprising a supporting member supporting the plurality of substantially spherical members.

35. The generator of claim 34, wherein the supporting member includes a material selected from the group consisting of polyimide, polyethylene terephthalate, poly(methyl methacrylate), poly(4,4'-oxydiphenylene-pyromellitimide) and $SiO_2$.

36. The generator of claim 33 further comprising a supporting member that supports the two electrodes.

37. The generator of claim 36, wherein the supporting member includes a material selected from the group consisting of polyimide, polyethylene terephthalate, PMMA, poly(4,4'-oxydiphenylene-pyromellitimide) and $SiO_2$.

38. The generator of claim 33, wherein the member includes a material selected from the group consisting of polyethylene terephthalate, poly(methyl methacrylate), polydimethylsiloxan, polytetrafluoroethylene, fluorinated ethylene propylene, poly(vinyl chloride), polyimide, metal and alloy.

39. The generator of claim 33, wherein the electrodes include includes a material selected from the group consisting of polyurethane, poly-oxydiphenylene-pyromellitimide, polydimethylsiloxan, conductive polymer, metal, alloy and indium tin oxide.

40. The generator of claim 33, wherein the two electrodes comprise a pair of interdigitated electrodes; and
wherein the member comprises:
a first member adjacent to the electrodes; and
a second member in contact with the first member.

41. The generator of claim 33, wherein the two electrodes comprise a pair of interdigitated electrodes;
wherein the member lies on top of the interdigitated electrodes, the member generating triboelectric charges when contacted by water; and
wherein the flow of electrons is generated between the interdigitated electrodes as water flows across the member from a position aligned with one electrode to a position aligned with the other electrode.

* * * * *